(12) United States Patent
Andrade et al.

(10) Patent No.: US 11,704,313 B1
(45) Date of Patent: Jul. 18, 2023

(54) PARALLEL BRANCH OPERATION USING INTERMEDIARY NODES

(71) Applicant: Splunk Inc., San Francisco, CA (US)

(72) Inventors: Asha Andrade, Saratoga, CA (US);
Tingting Bao, San Jose, CA (US);
Vanco Buca, San Jose, CA (US);
Weichao Duan, Cupertino, CA (US);
Anuradha Pariti, San Jose, CA (US);
Xiaowei Wang, Santa Clara, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 17/074,236

(22) Filed: Oct. 19, 2020

(51) Int. Cl.
*G06F 16/2453* (2019.01)

(52) U.S. Cl.
CPC .. *G06F 16/24535* (2019.01); *G06F 16/24532* (2019.01); *G06F 16/24537* (2019.01)

(58) Field of Classification Search
CPC ......... G06F 16/24535; G06F 16/24532; G06F 16/24537
See application file for complete search history.

(56) References Cited

U.S. PATENT DOCUMENTS

| | | |
|---|---|---|
| 5,187,750 A | 2/1993 | Behera |
| 5,623,652 A | 4/1997 | Vora et al. |
| 5,812,793 A | 9/1998 | Shakib et al. |
| 5,913,214 A | 6/1999 | Madnick et al. |
| 5,918,049 A | 6/1999 | Syväniemi |
| 5,941,969 A | 8/1999 | Ram et al. |

(Continued)

FOREIGN PATENT DOCUMENTS

| | | |
|---|---|---|
| CN | 103729447 A | 4/2014 |
| CN | 105893205 A | 8/2016 |

(Continued)

OTHER PUBLICATIONS

Beame et al., "Communication Steps for Parallel Query Processing", PODS '13: Proceedings of the 32nd ACM SIGMOD-SIGACT-SIGAI symposium on Principles of database systems. Jun. 2013, pp. 273-284 (Year: 2013).*

(Continued)

*Primary Examiner* — Mark D Featherstone
*Assistant Examiner* — Kweku William Halm
(74) *Attorney, Agent, or Firm* — Knobbe, Martens, Olson & Bear, LLP

(57) ABSTRACT

The disclosed implementations include a method performed by a data intake and query system. The method includes receiving a search query at a search head, the search query including a branching operation between sets of data, generating a first subquery and a second subquery corresponding to the sets of data for execution by a search node, generating instructions for an intermediary node to combine partial results of the first subquery and the second subquery and instructions to concurrently communicate the subqueries to a search node, and executing the query by providing the instructions for the intermediary node to the intermediary node and the subqueries to the search node, the intermediary node receiving sets of partial search results for the subqueries, performing at least a portion of the branching operation on the partial results, and communicating the combined results to another intermediary node or the search head.

20 Claims, 31 Drawing Sheets

(56) References Cited

U.S. PATENT DOCUMENTS

| | | | |
|---|---|---|---|
| 6,009,422 A | 12/1999 | Ciccarelli | |
| 6,081,883 A | 6/2000 | Popelka et al. | |
| 6,154,781 A | 11/2000 | Bolam et al. | |
| 6,185,666 B1 | 2/2001 | Murray et al. | |
| 6,205,441 B1 * | 3/2001 | Al-omari | G06F 16/24537 |
| | | | 707/999.005 |
| 6,282,537 B1 | 8/2001 | Madnick et al. | |
| 6,408,294 B1 | 6/2002 | Getchius et al. | |
| 6,430,553 B1 | 8/2002 | Ferret | |
| 6,463,454 B1 | 10/2002 | Lumelsky et al. | |
| 6,466,980 B1 | 10/2002 | Lumelsky et al. | |
| 6,490,585 B1 | 12/2002 | Hanson et al. | |
| 6,505,191 B1 | 1/2003 | Baclawski | |
| 6,578,131 B1 | 6/2003 | Larson et al. | |
| 6,786,418 B1 | 9/2004 | Francois | |
| 6,920,396 B1 | 7/2005 | Wallace et al. | |
| 7,007,275 B1 | 2/2006 | Hanson et al. | |
| 7,039,764 B1 | 5/2006 | Shetty et al. | |
| 7,233,939 B1 | 6/2007 | Ziauddin | |
| 7,249,192 B1 | 7/2007 | Brewer et al. | |
| 7,290,196 B1 | 10/2007 | Annayya et al. | |
| 7,370,068 B1 | 5/2008 | Pham et al. | |
| 7,505,985 B2 | 3/2009 | Kilroy | |
| 7,536,686 B2 | 5/2009 | Tan et al. | |
| 7,685,109 B1 | 3/2010 | Ransil et al. | |
| 7,685,281 B1 | 3/2010 | Saraiya et al. | |
| 7,689,553 B2 | 3/2010 | Zuzarte | |
| 7,689,633 B1 | 3/2010 | Li et al. | |
| 7,698,267 B2 | 4/2010 | Papakonstantinou et al. | |
| 7,702,610 B2 | 4/2010 | Zane et al. | |
| 7,769,722 B1 | 8/2010 | Bergant et al. | |
| 7,895,359 B2 | 2/2011 | Reed et al. | |
| 7,937,344 B2 | 5/2011 | Baum et al. | |
| 7,962,464 B1 | 6/2011 | Brette et al. | |
| 8,019,725 B1 | 9/2011 | Mulligan et al. | |
| 8,112,425 B2 | 2/2012 | Baum et al. | |
| 8,190,593 B1 | 5/2012 | Dean | |
| 8,195,922 B2 | 6/2012 | Chen et al. | |
| 8,412,696 B2 | 4/2013 | Zhang et al. | |
| 8,504,620 B2 | 8/2013 | Chi et al. | |
| 8,527,645 B1 | 9/2013 | Proffit et al. | |
| 8,589,375 B2 | 11/2013 | Zhang et al. | |
| 8,589,403 B2 | 11/2013 | Marquardt et al. | |
| 8,589,432 B2 | 11/2013 | Zhang et al. | |
| 8,601,112 B1 | 12/2013 | Nordstrom et al. | |
| 8,682,925 B1 | 3/2014 | Marquardt et al. | |
| 8,719,520 B1 | 5/2014 | Piszczek et al. | |
| 8,738,587 B1 | 5/2014 | Bitincka et al. | |
| 8,738,629 B1 | 5/2014 | Bitincka et al. | |
| 8,751,529 B2 | 6/2014 | Zhang et al. | |
| 8,761,077 B2 | 6/2014 | Kim et al. | |
| 8,762,367 B2 | 6/2014 | Burger et al. | |
| 8,769,493 B2 | 7/2014 | Arnold et al. | |
| 8,788,525 B2 | 7/2014 | Neels et al. | |
| 8,788,526 B2 | 7/2014 | Neels et al. | |
| 8,793,225 B1 | 7/2014 | Bitincka et al. | |
| 8,806,361 B1 | 8/2014 | Noel et al. | |
| 8,849,891 B1 | 9/2014 | Suchter et al. | |
| 8,874,755 B1 | 10/2014 | Deklich et al. | |
| 8,874,961 B2 | 10/2014 | Pillai et al. | |
| 8,924,476 B1 | 12/2014 | Granström et al. | |
| 8,935,257 B1 | 1/2015 | Vermuri et al. | |
| 8,935,302 B2 | 1/2015 | Flynn et al. | |
| 8,959,221 B2 | 2/2015 | Morgan | |
| 8,983,912 B1 | 3/2015 | Beedgen et al. | |
| 8,983,994 B2 | 3/2015 | Neels et al. | |
| 8,990,148 B1 | 3/2015 | Ziegler et al. | |
| 9,015,197 B2 | 4/2015 | Richards et al. | |
| 9,087,030 B2 | 7/2015 | Basile | |
| 9,087,090 B1 | 7/2015 | Cormier et al. | |
| 9,124,612 B2 | 9/2015 | Vasan et al. | |
| 9,128,636 B2 | 9/2015 | Arakawa | |
| 9,128,980 B2 | 9/2015 | Neels et al. | |
| 9,128,985 B2 | 9/2015 | Marquartd | |
| 9,130,971 B2 | 9/2015 | Vasan et al. | |
| 9,135,560 B1 | 9/2015 | Saurabh et al. | |
| 9,173,801 B2 | 11/2015 | Merza | |
| 9,185,007 B2 | 11/2015 | Fletcher et al. | |
| 9,215,240 B2 | 12/2015 | Merza et al. | |
| 9,244,999 B2 | 1/2016 | Jin et al. | |
| 9,248,068 B2 | 2/2016 | Merza | |
| 9,256,467 B1 | 2/2016 | Singh et al. | |
| 9,262,519 B1 | 2/2016 | Saurabh | |
| 9,286,413 B1 | 3/2016 | Coates et al. | |
| 9,292,620 B1 | 3/2016 | Hoover et al. | |
| 9,342,571 B1 | 5/2016 | Kurtic et al. | |
| 9,378,088 B1 | 6/2016 | Piszczek et al. | |
| 9,426,045 B2 | 8/2016 | Fletcher et al. | |
| 9,426,172 B2 | 8/2016 | Merza | |
| 9,432,396 B2 | 8/2016 | Merza | |
| 9,438,470 B2 | 9/2016 | Brady, Jr. et al. | |
| 9,438,515 B2 | 9/2016 | McCormick et al. | |
| 9,489,385 B1 | 11/2016 | Ladola | |
| 9,495,427 B2 | 11/2016 | Adabi et al. | |
| 9,514,146 B1 | 12/2016 | Wallace et al. | |
| 9,514,189 B2 | 12/2016 | Bitincka et al. | |
| 9,558,194 B1 | 1/2017 | Srivastav et al. | |
| 9,589,012 B2 | 3/2017 | Neels et al. | |
| 9,672,116 B1 | 6/2017 | Chopra et al. | |
| 9,672,274 B1 | 6/2017 | Goo | |
| 9,722,951 B2 | 8/2017 | Almadi | |
| 9,734,180 B1 | 8/2017 | Graham et al. | |
| 9,753,935 B1 | 9/2017 | Tobin et al. | |
| 9,779,015 B1 | 10/2017 | Oikarinen et al. | |
| 9,806,978 B2 | 10/2017 | McAlister et al. | |
| 9,838,292 B2 | 12/2017 | Polychronis | |
| 9,900,397 B1 | 2/2018 | Cope et al. | |
| 9,959,062 B1 | 5/2018 | Piszczek et al. | |
| 9,984,128 B2 | 5/2018 | Vasan et al. | |
| 9,990,386 B2 | 6/2018 | Marquardt et al. | |
| 9,992,741 B2 | 6/2018 | Trainin et al. | |
| 9,996,400 B2 | 6/2018 | Nakagawa et al. | |
| 10,025,795 B2 | 7/2018 | Fokoue-Nkoutche et al. | |
| 10,031,922 B2 | 7/2018 | Fokoue-Nkoutche et al. | |
| 10,037,341 B1 | 7/2018 | Bassov et al. | |
| 10,049,160 B2 | 8/2018 | Bitincka et al. | |
| 10,091,100 B1 | 10/2018 | Duerk | |
| 10,095,993 B1 | 10/2018 | Bar-Menachem et al. | |
| 10,127,258 B2 | 11/2018 | Lamas et al. | |
| 10,142,204 B2 | 11/2018 | Nickolov et al. | |
| 10,318,491 B1 | 6/2019 | Graham et al. | |
| 10,318,511 B2 | 6/2019 | De Smet et al. | |
| 10,320,638 B1 | 6/2019 | Lauinger et al. | |
| 10,353,965 B2 | 7/2019 | Pal et al. | |
| 10,437,653 B2 | 10/2019 | Cyr et al. | |
| 10,445,311 B1 | 10/2019 | Saurabh et al. | |
| 10,474,723 B2 | 11/2019 | Hodge et al. | |
| 10,528,599 B1 * | 1/2020 | Pandis | H04L 67/1097 |
| 10,534,794 B2 | 1/2020 | Dageville et al. | |
| 10,558,656 B2 | 2/2020 | Wells et al. | |
| 10,585,951 B2 | 3/2020 | Bhattacharjee et al. | |
| 10,592,561 B2 | 3/2020 | Bhattacharjee et al. | |
| 10,592,562 B2 | 3/2020 | Pal et al. | |
| 10,592,563 B2 | 3/2020 | Pal et al. | |
| 10,599,723 B2 | 3/2020 | Bhattacharjee et al. | |
| 10,599,724 B2 | 3/2020 | Pal et al. | |
| 10,606,856 B2 | 3/2020 | Bath et al. | |
| 10,657,146 B2 | 5/2020 | Bath et al. | |
| 10,726,009 B2 | 7/2020 | Pal et al. | |
| 10,769,148 B1 * | 9/2020 | Binkert | G06F 16/24542 |
| 10,776,355 B1 | 9/2020 | Batsakis et al. | |
| 10,776,374 B2 | 9/2020 | Valine et al. | |
| 10,795,884 B2 | 10/2020 | Bhattacharjee et al. | |
| 10,896,182 B2 | 1/2021 | Bhattacharjee et al. | |
| 10,956,415 B2 | 3/2021 | Pal et al. | |
| 10,977,260 B2 | 4/2021 | Pal et al. | |
| 10,984,044 B1 | 4/2021 | Batsakis et al. | |
| 10,999,164 B1 | 5/2021 | Sridhar et al. | |
| 11,003,714 B1 | 5/2021 | Batsakis et al. | |
| 11,010,435 B2 | 5/2021 | Pal et al. | |
| 11,023,463 B2 | 6/2021 | Pal et al. | |
| 11,023,539 B2 | 6/2021 | Pal et al. | |
| 11,080,345 B2 | 8/2021 | Pal et al. | |
| 11,106,734 B1 | 8/2021 | Batsakis et al. | |

(56) References Cited

U.S. PATENT DOCUMENTS

| | | |
|---|---|---|
| 11,126,632 B2 | 9/2021 | Pal et al. |
| 11,151,137 B2 | 10/2021 | Bhattacharjee et al. |
| 11,163,758 B2 | 11/2021 | James et al. |
| 11,176,208 B2 | 11/2021 | Pal et al. |
| 11,222,066 B1 | 1/2022 | Batsakis et al. |
| 11,232,100 B2 | 1/2022 | Bhattacharjee et al. |
| 11,238,112 B2 | 2/2022 | Hodge et al. |
| 11,243,963 B2 | 2/2022 | Pal et al. |
| 11,250,056 B1 | 2/2022 | Batsakis et al. |
| 11,269,939 B1 | 3/2022 | Sammer et al. |
| 11,281,706 B2 | 3/2022 | Pal et al. |
| 11,294,941 B1 | 4/2022 | Sammer et al. |
| 11,314,753 B2 | 4/2022 | Pal et al. |
| 11,321,321 B2 | 5/2022 | Bhattacharjee et al. |
| 11,334,543 B1 | 5/2022 | Anwar et al. |
| 11,341,131 B2 | 5/2022 | Pal et al. |
| 11,392,654 B2 | 7/2022 | Pal et al. |
| 11,416,528 B2 | 8/2022 | Pal et al. |
| 11,442,935 B2 | 9/2022 | Pal et al. |
| 11,461,334 B2 | 10/2022 | Bhattacharjee et al. |
| 11,494,380 B2 | 11/2022 | Rao et al. |
| 11,500,875 B2 | 11/2022 | Bhattacharjee et al. |
| 11,550,847 B1 | 1/2023 | Batsakis et al. |
| 11,562,023 B1 | 1/2023 | Batsakis et al. |
| 11,567,993 B1 | 1/2023 | Batsakis et al. |
| 2001/0016821 A1 | 8/2001 | DeBusk et al. |
| 2002/0070968 A1 | 6/2002 | Austin et al. |
| 2002/0112123 A1 | 8/2002 | Becker et al. |
| 2002/0138471 A1 | 9/2002 | Dutta et al. |
| 2003/0014403 A1 | 1/2003 | Chandrasekar et al. |
| 2003/0066033 A1 | 4/2003 | Direen, Jr. et al. |
| 2003/0106015 A1 | 6/2003 | Chu et al. |
| 2003/0120682 A1 | 6/2003 | Bestgen et al. |
| 2003/0130993 A1 | 7/2003 | Mendelevitch et al. |
| 2003/0154238 A1 | 8/2003 | Murphy et al. |
| 2003/0167270 A1 | 9/2003 | Werme et al. |
| 2003/0188198 A1 | 10/2003 | Holdsworth et al. |
| 2003/0229620 A1 | 12/2003 | Carlson et al. |
| 2004/0122845 A1 | 5/2004 | Lohman et al. |
| 2004/0117345 A1 | 6/2004 | Bamford et al. |
| 2004/0143604 A1 | 7/2004 | Glenner et al. |
| 2004/0230571 A1 | 11/2004 | Robertson |
| 2005/0022047 A1 | 1/2005 | Chandrasekaran |
| 2005/0027796 A1 | 2/2005 | San Andres et al. |
| 2005/0066027 A1 | 3/2005 | Hakiel et al. |
| 2005/0102325 A1 | 5/2005 | Gould et al. |
| 2005/0192937 A1 | 9/2005 | Barsness et al. |
| 2005/0289232 A1 | 12/2005 | Ebert |
| 2006/0026211 A1 | 2/2006 | Potteiger |
| 2006/0161560 A1 | 7/2006 | Khandelwal et al. |
| 2006/0173993 A1 | 8/2006 | Henseler et al. |
| 2006/0184998 A1 | 8/2006 | Smith et al. |
| 2006/0212607 A1 | 9/2006 | Riethmuller |
| 2006/0224587 A1 | 10/2006 | Zamir et al. |
| 2006/0224603 A1 | 10/2006 | Correll, Jr. |
| 2006/0248045 A1 | 11/2006 | Toledano et al. |
| 2006/0259460 A1 | 11/2006 | Zurek et al. |
| 2006/0271504 A1 | 11/2006 | Anderson et al. |
| 2007/0033155 A1 | 2/2007 | Landsman |
| 2007/0050328 A1 | 3/2007 | Li et al. |
| 2007/0100873 A1 | 5/2007 | Yako et al. |
| 2007/0143261 A1 | 6/2007 | Uppala |
| 2007/0156842 A1 | 7/2007 | Vermeulen et al. |
| 2007/0168336 A1 | 7/2007 | Ransil et al. |
| 2007/0168656 A1 | 7/2007 | Paganetti et al. |
| 2007/0198641 A1 | 8/2007 | Dorai et al. |
| 2007/0208669 A1 | 9/2007 | Rivette et al. |
| 2007/0283194 A1 | 12/2007 | Villella et al. |
| 2008/0010337 A1 | 1/2008 | Hayes et al. |
| 2008/0033927 A1 | 2/2008 | Richards et al. |
| 2008/0065591 A1 | 3/2008 | Guzenda |
| 2008/0071755 A1 | 3/2008 | Barsness et al. |
| 2008/0162592 A1 | 7/2008 | Huang et al. |
| 2008/0208844 A1 | 8/2008 | Jenkins |
| 2008/0215546 A1 | 9/2008 | Baum et al. |
| 2008/0275857 A1 | 11/2008 | Dertinger et al. |
| 2008/0294660 A1 | 11/2008 | Patterson et al. |
| 2008/0300835 A1 | 12/2008 | Hixon |
| 2009/0006148 A1 | 1/2009 | Bacalski et al. |
| 2009/0006527 A1 | 1/2009 | Gingell et al. |
| 2009/0007125 A1 | 1/2009 | Barsness et al. |
| 2009/0125526 A1 | 5/2009 | Neufeld |
| 2009/0129163 A1 | 5/2009 | Danilak |
| 2009/0132488 A1 | 5/2009 | Wehrmeister et al. |
| 2009/0183162 A1 | 7/2009 | Kindel et al. |
| 2009/0193042 A1 | 7/2009 | Hornibrook et al. |
| 2009/0204551 A1 | 8/2009 | Wang et al. |
| 2009/0216781 A1 | 8/2009 | Chauvet et al. |
| 2009/0234799 A1 | 9/2009 | Betawadkar-Norwood et al. |
| 2009/0248764 A1 | 10/2009 | Day et al. |
| 2009/0292810 A1 | 11/2009 | Hotta et al. |
| 2009/0327242 A1 | 12/2009 | Brown et al. |
| 2010/0005056 A1 | 1/2010 | Bayliss |
| 2010/0005134 A1 | 1/2010 | Zamir et al. |
| 2010/0005151 A1 | 1/2010 | Gokhale |
| 2010/0011031 A1 | 1/2010 | Huang et al. |
| 2010/0011252 A1 | 1/2010 | Rivoir |
| 2010/0106934 A1 | 4/2010 | Calder et al. |
| 2010/0125565 A1 | 5/2010 | Burger et al. |
| 2010/0153375 A1 | 6/2010 | Bilas et al. |
| 2010/0153431 A1 | 6/2010 | Burger |
| 2010/0199042 A1 | 8/2010 | Bates et al. |
| 2010/0229108 A1 | 9/2010 | Gerson et al. |
| 2010/0262740 A1 | 10/2010 | Borchers et al. |
| 2011/0055231 A1 | 3/2011 | Huck et al. |
| 2011/0060887 A1 | 3/2011 | Thatcher et al. |
| 2011/0078133 A1 | 3/2011 | Bordawekar et al. |
| 2011/0093491 A1 | 4/2011 | Zabback et al. |
| 2011/0099500 A1 | 4/2011 | Smith et al. |
| 2011/0125745 A1 | 5/2011 | Bright |
| 2011/0131200 A1 | 6/2011 | Zhou et al. |
| 2011/0173184 A1 | 7/2011 | Kelshikar et al. |
| 2011/0191373 A1 | 8/2011 | Botros et al. |
| 2011/0196804 A1 | 8/2011 | Sutter et al. |
| 2011/0213778 A1 | 9/2011 | Hess et al. |
| 2011/0213870 A1 | 9/2011 | Cai et al. |
| 2011/0231858 A1 | 9/2011 | Sammer et al. |
| 2011/0246294 A1 | 10/2011 | Robb et al. |
| 2011/0289163 A1 | 11/2011 | Edwards et al. |
| 2011/0295968 A1 | 12/2011 | Takaoka et al. |
| 2011/0320550 A1 | 12/2011 | Lawson et al. |
| 2012/0066205 A1 | 3/2012 | Chappell et al. |
| 2012/0078869 A1 | 3/2012 | Bellville et al. |
| 2012/0078881 A1 | 3/2012 | Crump et al. |
| 2012/0079004 A1 | 3/2012 | Herman |
| 2012/0130986 A1 | 5/2012 | Abdellatif et al. |
| 2012/0130988 A1 | 5/2012 | Nica et al. |
| 2012/0130997 A1 | 5/2012 | Risvik et al. |
| 2012/0143873 A1 | 6/2012 | Saadat |
| 2012/0150819 A1 | 6/2012 | Lindahl et al. |
| 2012/0173728 A1 | 7/2012 | Haskins et al. |
| 2012/0166440 A1 | 8/2012 | Shmuel et al. |
| 2012/0197856 A1 | 8/2012 | Banka et al. |
| 2012/0197934 A1 | 8/2012 | Zhang et al. |
| 2012/0226712 A1 | 9/2012 | Vermeulen et al. |
| 2012/0254269 A1 | 10/2012 | Carmichael |
| 2012/0278346 A1 | 11/2012 | Han et al. |
| 2012/0310916 A1 | 12/2012 | Abadi et al. |
| 2013/0018868 A1 | 1/2013 | Chi et al. |
| 2013/0060783 A1 | 3/2013 | Baum et al. |
| 2013/0066674 A1 | 3/2013 | Vasters |
| 2013/0084826 A1 | 4/2013 | Mo et al. |
| 2013/0086040 A1 | 4/2013 | Patadia et al. |
| 2013/0097139 A1 | 4/2013 | Thoresen et al. |
| 2013/0110828 A1 | 5/2013 | Meyerzon et al. |
| 2013/0132392 A1 | 5/2013 | Kenedy et al. |
| 2013/0138626 A1 | 5/2013 | Delafranier et al. |
| 2013/0159251 A1 | 6/2013 | Skrenta et al. |
| 2013/0166502 A1 | 6/2013 | Walkauskas |
| 2013/0173160 A1 | 7/2013 | Meisels et al. |
| 2013/0173662 A1 | 7/2013 | Kaplinger et al. |
| 2013/0198475 A1 | 8/2013 | Serlet et al. |
| 2013/0204991 A1 | 8/2013 | Skjolsvold et al. |
| 2013/0212165 A1 | 8/2013 | Vermeulen et al. |

(56) References Cited

U.S. PATENT DOCUMENTS

| | | |
|---|---|---|
| 2013/0226971 A1 | 8/2013 | Shoolman et al. |
| 2013/0238706 A1 | 9/2013 | Desai |
| 2013/0246373 A1 | 9/2013 | Hansma et al. |
| 2013/0246608 A1 | 9/2013 | Liu et al. |
| 2013/0254761 A1 | 9/2013 | Reddy et al. |
| 2013/0311488 A1 | 11/2013 | Erdogan et al. |
| 2013/0318236 A1 | 11/2013 | Coates et al. |
| 2013/0325850 A1 | 12/2013 | Redmond et al. |
| 2013/0339298 A1 | 12/2013 | Muller et al. |
| 2013/0339567 A1 | 12/2013 | Carpentier et al. |
| 2014/0067792 A1 | 3/2014 | Erdogan et al. |
| 2014/0068343 A1 | 3/2014 | Nakajima et al. |
| 2014/0074810 A1 | 3/2014 | Wang et al. |
| 2014/0089511 A1 | 3/2014 | McLean |
| 2014/0095470 A1 | 4/2014 | Chen et al. |
| 2014/0129515 A1 | 5/2014 | Venkatesan et al. |
| 2014/0149355 A1 | 5/2014 | Gupta et al. |
| 2014/0156642 A1 | 6/2014 | Johnson et al. |
| 2014/0180651 A1 | 6/2014 | Lysak et al. |
| 2014/0181373 A1 | 6/2014 | George et al. |
| 2014/0188841 A1 | 7/2014 | Sun et al. |
| 2014/0188885 A1 | 7/2014 | Kulkarni et al. |
| 2014/0189858 A1 | 7/2014 | Chen et al. |
| 2014/0195558 A1 | 7/2014 | Murthy et al. |
| 2014/0214799 A1 | 7/2014 | Li et al. |
| 2014/0236889 A1* | 8/2014 | Vasan .............. G06F 16/2272 707/610 |
| 2014/0236890 A1 | 8/2014 | Vasan et al. |
| 2014/0244585 A1 | 8/2014 | Sivasubramanian et al. |
| 2014/0258295 A1 | 9/2014 | Wang et al. |
| 2014/0278652 A1 | 9/2014 | Joyner et al. |
| 2014/0280021 A1 | 9/2014 | Singamshetty |
| 2014/0289414 A1 | 9/2014 | Chan et al. |
| 2014/0317084 A1 | 10/2014 | Chaudhry et al. |
| 2014/0324862 A1 | 10/2014 | Bingham et al. |
| 2014/0359598 A1 | 12/2014 | Oliver et al. |
| 2014/0380322 A1 | 12/2014 | Ailamaki et al. |
| 2015/0019537 A1 | 1/2015 | Neels et al. |
| 2015/0039757 A1 | 2/2015 | Petersen et al. |
| 2015/0049163 A1 | 2/2015 | Smurro |
| 2015/0058293 A1 | 2/2015 | Kobayashi et al. |
| 2015/0095570 A1 | 4/2015 | Lee |
| 2015/0100412 A1 | 4/2015 | Sterns et al. |
| 2015/0100616 A1 | 4/2015 | Imamura |
| 2015/0112966 A1 | 4/2015 | Tokuda et al. |
| 2015/0113162 A1 | 4/2015 | Chan et al. |
| 2015/0120684 A1 | 4/2015 | Bawaskar et al. |
| 2015/0134795 A1 | 5/2015 | Theimer et al. |
| 2015/0134796 A1 | 5/2015 | Theimer et al. |
| 2015/0149440 A1 | 5/2015 | Bornea et al. |
| 2015/0149501 A1 | 5/2015 | Prakash et al. |
| 2015/0149507 A1 | 5/2015 | Imaki |
| 2015/0149509 A1 | 5/2015 | Leu et al. |
| 2015/0149879 A1 | 5/2015 | Miller et al. |
| 2015/0161211 A1 | 6/2015 | Patel et al. |
| 2015/0161237 A1 | 6/2015 | Agarwal et al. |
| 2015/0161239 A1 | 6/2015 | Stepinski et al. |
| 2015/0169684 A1 | 6/2015 | Li et al. |
| 2015/0169686 A1 | 6/2015 | Eliás et al. |
| 2015/0169786 A1 | 6/2015 | Jerzak et al. |
| 2015/0172148 A1 | 6/2015 | Ishida et al. |
| 2015/0180891 A1 | 6/2015 | Seward et al. |
| 2015/0188969 A1 | 7/2015 | Boshev et al. |
| 2015/0189033 A1 | 7/2015 | Han et al. |
| 2015/0199267 A1 | 7/2015 | Oh et al. |
| 2015/0199347 A1 | 7/2015 | Shnitko et al. |
| 2015/0207857 A1 | 7/2015 | Horton |
| 2015/0213631 A1 | 7/2015 | Vander Broek |
| 2015/0227624 A1 | 8/2015 | Busch et al. |
| 2015/0234682 A1 | 8/2015 | Dageville et al. |
| 2015/0244795 A1 | 8/2015 | Cantwell et al. |
| 2015/0254245 A1 | 9/2015 | Marais et al. |
| 2015/0254346 A1 | 9/2015 | Chang et al. |
| 2015/0295796 A1 | 10/2015 | Hsiao et al. |
| 2015/0295848 A1 | 10/2015 | Vlachogiannis et al. |
| 2015/0304879 A1 | 10/2015 | daCosta |
| 2015/0319256 A1 | 11/2015 | Casey |
| 2015/0324433 A1 | 11/2015 | Duffy et al. |
| 2015/0339312 A1 | 11/2015 | Lin et al. |
| 2015/0339357 A1 | 11/2015 | Carasso et al. |
| 2015/0341212 A1 | 11/2015 | Hsiao et al. |
| 2015/0347443 A1 | 12/2015 | Reid et al. |
| 2015/0347993 A1 | 12/2015 | Redmond et al. |
| 2015/0356153 A1 | 12/2015 | Schoening |
| 2015/0358433 A1 | 12/2015 | Parthasarathy et al. |
| 2015/0381725 A1 | 12/2015 | Haapaoja et al. |
| 2016/0026438 A1 | 1/2016 | Wolfram |
| 2016/0026684 A1 | 1/2016 | Mukherjee et al. |
| 2016/0027041 A1 | 1/2016 | Zhong et al. |
| 2016/0042039 A1 | 2/2016 | Kaufmann et al. |
| 2016/0044108 A1 | 2/2016 | Vermeulen et al. |
| 2016/0048408 A1 | 2/2016 | Madhu et al. |
| 2016/0050129 A1 | 2/2016 | Hoyne |
| 2016/0050261 A1 | 2/2016 | McDaid et al. |
| 2016/0055184 A1 | 2/2016 | Fokoue-Nkoutche et al. |
| 2016/0063037 A1 | 3/2016 | Savkli |
| 2016/0063209 A1 | 3/2016 | Malaviya |
| 2016/0070750 A1 | 3/2016 | Beutlberger et al. |
| 2016/0085639 A1 | 3/2016 | Abouzour et al. |
| 2016/0085810 A1 | 3/2016 | de Castro Alves et al. |
| 2016/0087880 A1 | 3/2016 | Shalita et al. |
| 2016/0092493 A1 | 3/2016 | Ko et al. |
| 2016/0092541 A1 | 3/2016 | Liu et al. |
| 2016/0092570 A1 | 3/2016 | Ago et al. |
| 2016/0110109 A1 | 4/2016 | Cowling et al. |
| 2016/0117129 A1 | 4/2016 | Shrader et al. |
| 2016/0117373 A1 | 4/2016 | Dang et al. |
| 2016/0139849 A1 | 5/2016 | Chaw et al. |
| 2016/0140174 A1 | 5/2016 | Weyerhaeuser et al. |
| 2016/0150002 A1 | 5/2016 | Hildrum et al. |
| 2016/0156579 A1 | 6/2016 | Kaufmann |
| 2016/0162478 A1 | 6/2016 | Blassin et al. |
| 2016/0170987 A1 | 6/2016 | Kesselman |
| 2016/0180557 A1 | 6/2016 | Yousaf et al. |
| 2016/0188669 A1 | 6/2016 | Duffy et al. |
| 2016/0188742 A1 | 6/2016 | Ingvoldstad et al. |
| 2016/0203135 A1 | 7/2016 | Bhattacharjee et al. |
| 2016/0210340 A1 | 7/2016 | Cai et al. |
| 2016/0283511 A1 | 9/2016 | Fokoue-Nkoutche et al. |
| 2016/0283528 A1 | 9/2016 | Benke et al. |
| 2016/0286013 A1 | 9/2016 | Yu et al. |
| 2016/0291942 A1 | 10/2016 | Hutchison |
| 2016/0292166 A1 | 10/2016 | Russell |
| 2016/0306849 A1 | 10/2016 | Curino et al. |
| 2016/0316014 A1 | 10/2016 | Radu et al. |
| 2016/0335062 A1 | 11/2016 | Teodorescu et al. |
| 2016/0335352 A1 | 11/2016 | Teodorescu et al. |
| 2016/0343093 A1 | 11/2016 | Riland et al. |
| 2016/0357828 A1 | 12/2016 | Tobin et al. |
| 2016/0364093 A1 | 12/2016 | Denton et al. |
| 2016/0364424 A1 | 12/2016 | Chang et al. |
| 2016/0373521 A1 | 12/2016 | Washbrook et al. |
| 2017/0006135 A1 | 1/2017 | Siebel et al. |
| 2017/0010947 A1 | 1/2017 | Lu et al. |
| 2017/0012909 A1 | 1/2017 | Lieu |
| 2017/0024390 A1 | 1/2017 | Vuppala et al. |
| 2017/0024912 A1 | 1/2017 | de Castro Alves et al. |
| 2017/0026441 A1 | 1/2017 | Moudy et al. |
| 2017/0031599 A1 | 2/2017 | Bowman et al. |
| 2017/0031937 A1 | 2/2017 | Bowman et al. |
| 2017/0031988 A1 | 2/2017 | Sun et al. |
| 2017/0034023 A1 | 2/2017 | Nickolov et al. |
| 2017/0039239 A1 | 2/2017 | Saadat-Panah et al. |
| 2017/0046374 A1 | 2/2017 | Fletcher et al. |
| 2017/0046445 A1 | 2/2017 | Cormier et al. |
| 2017/0060903 A1 | 3/2017 | Botea et al. |
| 2017/0061286 A1 | 3/2017 | Kumar et al. |
| 2017/0097957 A1 | 4/2017 | Bourbonnais et al. |
| 2017/0103116 A1 | 4/2017 | Hu et al. |
| 2017/0116289 A1 | 4/2017 | Deshmukh et al. |
| 2017/0083588 A1 | 5/2017 | Lang et al. |
| 2017/0124151 A1 | 5/2017 | Ji et al. |
| 2017/0147224 A1 | 5/2017 | Kumar et al. |
| 2017/0147640 A1 | 5/2017 | Gaza et al. |

(56) References Cited

U.S. PATENT DOCUMENTS

| | | |
|---|---|---|
| 2017/0149624 A1 | 5/2017 | Chitti et al. |
| 2017/0149625 A1 | 5/2017 | Chitti et al. |
| 2017/0154057 A1 | 6/2017 | Wu et al. |
| 2017/0169336 A1 | 6/2017 | Singhal et al. |
| 2017/0170990 A1 | 6/2017 | Gaddehosur et al. |
| 2017/0178253 A1 | 6/2017 | Koufogiannakis et al. |
| 2017/0180289 A1 | 6/2017 | Chiappone et al. |
| 2017/0185574 A1 | 6/2017 | Fern et al. |
| 2017/0185648 A1 | 6/2017 | Kavulya et al. |
| 2017/0199910 A1 | 7/2017 | Konik et al. |
| 2017/0213257 A1 | 7/2017 | Murugesan et al. |
| 2017/0219357 A1 | 8/2017 | Pfeifle |
| 2017/0220685 A1 | 8/2017 | Yan et al. |
| 2017/0228257 A1 | 8/2017 | Gallagher |
| 2017/0228460 A1 | 8/2017 | Amel et al. |
| 2017/0242630 A1 | 8/2017 | Kephart et al. |
| 2017/0243132 A1 | 8/2017 | Sainani et al. |
| 2017/0255790 A1 | 9/2017 | Barrett et al. |
| 2017/0262551 A1 | 9/2017 | Cho et al. |
| 2017/0286507 A1 | 10/2017 | Hosogi et al. |
| 2017/0286518 A1 | 10/2017 | Horowitz et al. |
| 2017/0300536 A1 | 10/2017 | Gupta et al. |
| 2017/0300702 A1 | 10/2017 | Tegegne et al. |
| 2017/0329543 A1 | 11/2017 | Slater et al. |
| 2017/0373935 A1 | 12/2017 | Subramanian et al. |
| 2018/0004745 A1 | 1/2018 | Finkelstein et al. |
| 2018/0011655 A1 | 1/2018 | Gredler et al. |
| 2018/0032478 A1 | 2/2018 | Felderman et al. |
| 2018/0032570 A1 | 2/2018 | Miller et al. |
| 2018/0046503 A1 | 2/2018 | Feng et al. |
| 2018/0052765 A1 | 2/2018 | Imbierski |
| 2018/0060389 A1 | 3/2018 | Hwang |
| 2018/0060395 A1 | 3/2018 | Pathak et al. |
| 2018/0060399 A1 | 3/2018 | Lee et al. |
| 2018/0060586 A1 | 3/2018 | Xiao et al. |
| 2018/0075097 A1 | 3/2018 | Hwang |
| 2018/0081579 A1 | 3/2018 | Verrilli et al. |
| 2018/0089259 A1 | 3/2018 | James et al. |
| 2018/0089265 A1* | 3/2018 | Gerard .............. G06F 16/24545 |
| 2018/0089267 A1 | 3/2018 | Hatem et al. |
| 2018/0089272 A1 | 3/2018 | Bath et al. |
| 2018/0089276 A1 | 3/2018 | Victor et al. |
| 2018/0089278 A1 | 3/2018 | Bhattacharjee et al. |
| 2018/0089306 A1 | 3/2018 | Pal et al. |
| 2018/0089324 A1 | 3/2018 | Pal et al. |
| 2018/0113902 A1* | 4/2018 | Chen ................ G06F 16/24535 |
| 2018/0121426 A1 | 5/2018 | Barsness et al. |
| 2018/0123918 A1 | 5/2018 | Steinhauser et al. |
| 2018/0157711 A1 | 6/2018 | Lee |
| 2018/0159782 A1 | 6/2018 | Madan et al. |
| 2018/0165331 A1 | 6/2018 | Zhang et al. |
| 2018/0173753 A1 | 6/2018 | Pei et al. |
| 2018/0173759 A1 | 6/2018 | Barsness et al. |
| 2018/0218017 A1 | 8/2018 | Milrud |
| 2018/0218045 A1* | 8/2018 | Pal .......................... G06F 16/248 |
| 2018/0225095 A1 | 8/2018 | Kamalakantha et al. |
| 2018/0285417 A1 | 10/2018 | Lazovic et al. |
| 2018/0322017 A1 | 11/2018 | Maccanti et al. |
| 2018/0322168 A1 | 11/2018 | Levine et al. |
| 2018/0348715 A1 | 12/2018 | Bandaru et al. |
| 2018/0349095 A1 | 12/2018 | Wu et al. |
| 2018/0373756 A1 | 12/2018 | Madala |
| 2019/0065278 A1 | 2/2019 | Jeuk et al. |
| 2019/0095241 A1 | 3/2019 | Ago et al. |
| 2019/0098106 A1 | 3/2019 | Mungel et al. |
| 2019/0109848 A1 | 4/2019 | Clark et al. |
| 2019/0138639 A1 | 5/2019 | Pal et al. |
| 2019/0138641 A1 | 5/2019 | Pal et al. |
| 2019/0138642 A1 | 5/2019 | Pal et al. |
| 2019/0147084 A1 | 5/2019 | Pal et al. |
| 2019/0147092 A1* | 5/2019 | Pal ........................ H04L 67/125 |
| | | 707/713 |
| 2019/0229924 A1 | 7/2019 | Chhabra et al. |
| 2019/0258631 A1 | 8/2019 | Pal et al. |
| 2019/0258632 A1 | 8/2019 | Pal et al. |
| 2019/0258635 A1 | 8/2019 | Pal et al. |
| 2019/0258636 A1 | 8/2019 | Bhattacharjee et al. |
| 2019/0258637 A1 | 8/2019 | Bhattacharjee et al. |
| 2019/0272271 A1 | 9/2019 | Bhattacharjee et al. |
| 2019/0294344 A1 | 9/2019 | Hahn et al. |
| 2019/0310977 A1 | 10/2019 | Pal et al. |
| 2019/0349426 A1 | 11/2019 | Smith et al. |
| 2019/0379650 A1 | 12/2019 | Hale et al. |
| 2020/0050586 A1 | 2/2020 | Pal et al. |
| 2020/0050607 A1 | 2/2020 | Pal et al. |
| 2020/0050612 A1 | 2/2020 | Bhattacharjee et al. |
| 2020/0057818 A1 | 2/2020 | Kim |
| 2020/0065303 A1 | 2/2020 | Bhattacharjee et al. |
| 2020/0167395 A1 | 5/2020 | Pal et al. |
| 2020/0301941 A1 | 9/2020 | Wilson et al. |
| 2020/0327252 A1 | 10/2020 | McFall et al. |
| 2020/0354223 A1 | 11/2020 | Pal et al. |
| 2020/0364279 A1 | 11/2020 | Pal |
| 2021/0034625 A1* | 2/2021 | Shah ................. G06F 16/24542 |
| 2021/0049177 A1 | 2/2021 | Bhattacharjee |
| 2021/0117425 A1 | 4/2021 | Rao et al. |
| 2021/0294801 A1 | 9/2021 | Pal et al. |
| 2021/0303570 A1* | 9/2021 | Kondiles ............. G06F 16/2471 |
| 2022/0156335 A1 | 5/2022 | Bhattacharjee et al. |
| 2022/0261385 A1 | 8/2022 | Anwar et al. |
| 2022/0269727 A1 | 8/2022 | Batsakis et al. |
| 2022/0327125 A1 | 10/2022 | Pal et al. |
| 2022/0327149 A1 | 10/2022 | Pal et al. |
| 2022/0405331 A1 | 12/2022 | Pal et al. |

FOREIGN PATENT DOCUMENTS

| | | |
|---|---|---|
| CN | 107506447 A | 12/2017 |
| CN | 109299110 A | 2/2019 |
| CN | 109416643 A | 3/2019 |
| EP | 3 675 418 | 7/2020 |
| KR | 20200004835 | 1/2020 |
| WO | WO 2007/062429 | 5/2007 |
| WO | WO 2020/027867 | 2/2020 |
| WO | WO 2020/220216 | 11/2020 |

OTHER PUBLICATIONS

Beame et al., "Communication Steps for Parallel Query Processing", PODS '13: Proceedings of the 32nd ACM SIGMOD-SIGACT-SIGAI Symposium on Principles of Database Systems; Jun. 2013, pp. 273-284.
U.S. Appl. No. 15/967,570, filed Apr. 30, 2018, Sammer et al..
U.S. Appl. No. 15/967,595, filed Apr. 30, 2018, Batsakis et al..
U.S. Appl. No. 16/430,983, filed Jun. 4, 2019, Pal et al..
U.S. Appl. No. 17/074,236, filed Oct. 19, 2020, Andrada et al..
U.S. Appl. No. 17/233,193, filed Apr. 16, 2021, Batsakis et al..
U.S. Appl. No. 17/445,701, filed Aug. 23, 2021, Batsakis et al..
U.S. Appl. No. 17/589,712, filed Jan. 31, 2022, Batsakis et al..
U.S. Appl. No. 17/655,302, filed Mar. 17, 2022, Pal et al..
U.S. Appl. No. 17/658,792, filed Apr. 11, 2022, Pal et al..
U.S. Appl. No. 17/661,528, filed Apr. 29, 2022, Rao B..
U.S. Appl. No. 17/661,529, filed Apr. 29, 2022, Rao B..
U.S. Appl. No. 17/810,165, filed Jun. 30, 2022, Pal et al..
U.S. Appl. No. 17/816,254, filed Jul. 29, 2022, Arora et al..
U.S. Appl. No. 17/816,132, filed Jul. 29, 2022, Arora et al..
U.S. Appl. No. 15/967,567, filed Apr. 30, 2018, Batsakis et al..
U.S. Appl. No. 15/967,573, filed Apr. 30, 2018, Batsakis et al..
U.S. Appl. No. 15/967,574, filed Apr. 30, 2018, Sammer et al..
U.S. Appl. No. 15/967,581, filed Apr. 30, 2018, Sammer et al..
U.S. Appl. No. 15/967,582, filed Apr. 30, 2018, Batsakis et al..
U.S. Appl. No. 15/967,585, filed Apr. 30, 2018, Batsakis et al..
U.S. Appl. No. 15/967,586, filed Apr. 30, 2018, Batsakis et al..
U.S. Appl. No. 15/967,588, filed Apr. 30, 2018, Batsakis et al..
U.S. Appl. No. 16/000,664, filed Jun. 5, 2018, Batsakis et al..
U.S. Appl. No. 16/000,688, filed Jun. 5, 2019, Sammer et al..
U.S. Appl. No. 16/777,612, filed Jan. 30, 2020, Chawla et al..
Bakliwal S., "A Comprehensive Guide to Apache Flink Ecosystem Components," published Feb. 17, 2017.

(56) References Cited

OTHER PUBLICATIONS

Bitincka et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.
Carraso D., "Exploring Splunk," published by CITO Research, New York, NY, Apr. 2012.
Chen et al., "ParaLite: Supporting Collective Queries in Database System to Paralleize User-Defined Executable," 2012 12th IEEE/ACM International Symposium on Cluster, Clout and Grid Computing, IEEE Computer Society, pp. 474-481, May 2012.
Friedman et al., SQL/MapReduce: A Practical Approach to Self-Describing, Polymorphic, and Parallelizable Use-Defind Functions, Proc. VLDB Endow, 2 pages 1402-1413 August (Year: 2009).
Han et al., "Elastic Allocator: an Adaptive Task Scheduler for Streaming Query in the Cloud," IEEE Computer Society—2014, IEEE 8th International Symposium on Service Oriented System Engineering, pp. 284-289, 2014.
Hu et al., Dynamic Optimization of Subquery Processing in Grid Database, Third International Conference on Natural Communication, 6 pages, vol. 5, Nov. 2007.
Jayaram P., SQLShack: "SQL Union overview, usage, and examples," https://sqlshack.com/sql/sql-sub-queries.htm. 2021, in 13 pages.
Kafka + Flink: a Practical, How-To Guide (ververica.com), Sep. 2, 2015.
Keystone Real-time Stream Processing Platform, the Netflix Tech Blog, Sep. 10, 2018, retrieved from https://netflixtechblog.com/keystone-real-time-stream-processing-platform-a3ee651812a?gi=71cc12ef6b89.
Myers W., Skating Out the Graphics Display Pipeline, 1984; 6 pages.
Nadanam et al., "QoS Evaluation for Web Services in Cloud computing," IEEE, 2012, ICCCNT'12, Jul. 26-28, 2012, Coimbatore, India.
Netflix Keystone SPaaS: Real-time Stream Processing as a Service—ABD320—reinvent 2017 clip slide, retrieved from https://www.slideshare.net/AmazonWebServices/netflix-keystone-spaas-realtime-stream-processing-as-a-service-abd320-reinvent-2017.
Nguyen et al., "An IndexScheme for Similarity Search on Cloud Computing using MapReduce over Docker Container," IMCOM '16: Proceedings of the 10 International Conferenceon Ubiquitous Information Management and Communication Jan. 2016 Article No. 60 pp. 1-6 9year: 2016).
Pääkkönen et al., Reference Architecture and Classification of Technologies, Products and Services for Big Data Systems, Big Data Research vol. 2, Issue 4, Dec. 2015, pp. 166-186.

SLAML 10 Reports, Workshop on Managing Systems via Log Analysis and Machine Learning Techniques. ;login: Feb. 2011—Conference Reports—vol. 36, No. 1, pp. 104-110.
SPLUNK Enterprise Overview 8.0.0—splunk > turn data into doing—copyright 2020 Splunk Inc.—in 17 pages—Retrieved from Splunk Documentation <URL: https://docs.splunk.com/Documentation> on May 20, 2020.
SPLUNK Cloud User Manual 8.0.2004—splunk> turn data in doing—copyright 2020 Splunk Inc.—in 66 pages—Retrieved from Splunk Documentation <URL: https://docs.splunk.com/Documentation> on May 20, 2020.
SPLUNK Quick Reference Guide, updated 2019, available online at https://www.splunk.com/pdfs/solution-guides/splunk-quick-reference-guide.pdf, retrieved May 20, 2020.
"Subqueries with the INSERT Statement," https://www.tutorialspoint.com/sql/sql-sub-queries.htm. 4 pages.
Vaid K., Workshop on Managing Systems via log Analysis and Machine Learning Techniques (SLAML '10), ;login: vol. 36, No. 1, Oct. 3, 2010, Vancouver, BC, Canada.
Wu S., Building Stream Processing as a Service (SPaaS), retried from https://cdn.oreillystatic.com/en/assets/1/event/281/Building%20stream%20processing%20as%20a%20service%20at%20Netflix%20Presentation.pdf. Netflix Presentation Dec. 2017; 113 pages.
Yasu et al., Performance of Splunk for the TDAQ Information Service at the ATLAS Experiment, 2014 19th IEEE-NPSS Real Time Conference, 6 pages, May 2014.
Dayal U., "Of Nests and Trees: a Unified Approach to Processing Queries That Contain Nested Subqueries, Aggregates, and Quantifiers." Proceedings of the 13th Int'l Conference on Very Large Data Bases [VLDB], Brighton, 1987, pp. 197-208.
Gotz et al., "A methodology for interactive mining and visual analysis of clinical event patterns using electronic health record data". Journal Biomed Info. Apr. 1, 2014;48: 148-159.
Huang et al., "Query-aware Locality-sensitive Hashing for Approximate Nearest Neighbor Search", in Proceedings of the VLDB Endowment. Sep. 1, 2015;9(1):1-2 in 12 pages.
Kuo et al., "Query Expansion for Hash-based Image Object Retrieval". In Proceedings of the 17th ACM international conference on Multimedia Oct. 19, 2009 (pp. 65-74).
Limsopatham et al., "Learning to Combine Representations for Medical Records Search". SIGIR'13, Jul. 28-Aug. 1, 2013, ACM 2013; pp. 833-836.
Wongsuphasawat et al., "Querying event sequences by exact match or similarity search: Design and empirical evaluation". Interacting with Computers. Mar. 1, 2012;24(2): 55-68.
Zhu et al., "Combining Multi-level Evidence for Medical Record Retrieval". SHB'12, Oct. 29, 2012, ACM 2012; pp. 49-56.
U.S. Appl. No. 18/051,470, filed Oct. 31, 2022, Bhattacharjee et al..
U.S. Appl. No. 18/051,481, filed Oct. 31, 2022, Rao et al..

\* cited by examiner

*FIG. 8A*

| Data Summary | | | |
|---|---|---|---|
| Hosts (5) | Sources (8) | Sourcetypes (3) | x |
| filter | | | |
| Host ⇕ | | Count ⇕ | Last Update ⇕ |
| mailsv | ⑴ ∨ | 9,829 | 4/29/14 1:32:47.000 PM |
| vendor_sales | ⑴ ∨ | 30,244 | 4/29/14 1:32:46.000 PM |
| www1 | ⑴ ∨ | 24,221 | 4/29/14 1:32:44.000 PM |
| www2 | ⑴ ∨ | 22,595 | 4/29/14 1:32:47.000 PM |
| www3 | ⑴ ∨ | 22,975 | 4/29/14 1:32:45.000 PM |

INCIDENT REVIEW DASHBOARD 164

Incident Review | Actions ∨

Status:  Urgency: high  Owner:  Title:
Security domain:  Governance: pci  Search:

INCIDENT ATTRIBUTES FIELDS 166

🔍

✓ 225 matching events

☒ Hide ⊖ Zoom out ⊕ Zoom to selection [ ] Deselect   ⓘ  💾 Save ∨ | 🗋 Create ∨

120
60

[24 hour window ∨]
Last 15 minutes
Last 60 minutes
Last 4 hours
Last 24 hours
Last 7 days
Last 30 days
Last year
Real-time
Other
All time
Custom time Linear scale ∨ 1 bar = 1 hour

TIMELINE 170

120
60

4:00 AM                          6:00 AM                          8:00 AM
Sun Aug 26 2012

TIME RANGE FIELD 168

225 events in a 24 hour window (real-time) (from 11:29:20 AM August 25 to 11:29:20 AM August 26, 2012) | Edit selected events | Edit all 225 matching events Select all | Unselect all prev [1] 2 3 4 5 6 7 8 9 10 next>

EVENTS LIST 172

| Select | Options | Time | Security Domain | Title | Urgency | Status | Owner | |
|---|---|---|---|---|---|---|---|---|
| ☐ | ▷ | 8/26/12 11:11:03.000 AM | Access ∨ | Insecure Or Cleartext Authentication Detected | ⓘ High ∨ | New ∨ | unassigned ∨ | view details |
| ☐ | ▷ | 8/26/12 11:10:07.000 AM | Access ∨ | Insecure Or Cleartext Authentication Detected | ⓘ High ∨ | New ∨ | unassigned ∨ | view details |
| ☐ | ▷ | 8/26/12 11:00:39.000 AM | Access ∨ | Account (blinebry) Deleted On (PROD-POS-001) | ⓘ High ∨ | New ∨ | unassigned ∨ | view details |
| ☐ | ▷ | 8/26/12 11:00:39.000 AM | Access ∨ | Account (beu) Deleted On (COREDEV-006) | ⓘ High ∨ | New ∨ | unassigned ∨ | view details |
| ☐ | ▷ | 8/26/12 11:00:39.000 AM | Access ∨ | Account (combs) Deleted On (HOST-005) | ⓘ High ∨ | New ∨ | unassigned ∨ | view details |
| ☐ | ▷ | 8/26/12 11:00:39.000 AM | Access ∨ | Account (wisner) Deleted On (BUSDEV-005) | ⓘ High ∨ | New ∨ | unassigned ∨ | view details |

*FIG. 11B*

New Pivot 1,966 events (before 9/22/13 5:19:02.000 PM)

Highest 10 product name by price

| Filters | | | | Save As... ⌄ | Clear |
|---|---|---|---|---|---|
| All time | ⌀ | ≡ Highest 10 produ... | ⌀ | Complete | |

Split Rows — 128

| ≡ product name | ⌀ | ≡ price | ⌀ |

Split Columns — 130

| + |

Column Values — 132

| Count of Success... | ⌀ | ≡ Sum of price | ⌀ | + |

Documentation ⌘

Successful_purchases ⌄

| product name ⇅ | price ⇅ | Count of Successful purchases ⇅ | Sum of price ⇅ |
|---|---|---|---|
| Dream Crusher | 39.99 | 227 | 9077.73 |
| Manganiello Bros. | 39.99 | 199 | 7958.01 |
| Orvil the Wolverine | 39.99 | 169 | 6758.31 |
| World of Cheese | 24.99 | 267 | 6672.33 |
| Mediocre Kingdoms | 24.99 | 250 | 6247.50 |
| SIM Cubicle | 19.99 | 233 | 4657.67 |
| Final Sequel | 24.99 | 181 | 4523.19 |
| Benign Space Debris | 24.99 | 135 | 3373.65 |
| Curling 2014 | 19.99 | 126 | 2518.74 |
| Holy Blade of Gouda | 5.99 | 179 | 1072.21 |

134 ← Count of Successful purchases
136 ← Sum of price
126 (pivot) 138

*FIG. 16*

New Pivot 1,775,004 of 1,775,004 events matched

Filters: All time

Split Rows: ≡ component

Split Columns: ≡ group

Column Values: ≡ Count of Event O...

Save As... ∨ | Clear | Acceleration ∨

— 140

Documentation

| component ≑ | NULL ≑ | conf ≑ | deploy_connections ≑ | deploy_server ≑ | map ≑ | mpool ≑ | per_host_thruput ≑ | per_index_thruput ≑ | per_source_thruput ≑ | per_source_type_thruput ≑ | pipeline ≑ | queue ≑ | realtime_search_data |
|---|---|---|---|---|---|---|---|---|---|---|---|---|---|
| BucketMover | 4 | 0 | 0 | 0 | 0 | 0 | 0 | 0 | 0 | 0 | 0 | 0 | 0 |
| DatabaseDirectoryManager | 4 | 0 | 0 | 0 | 0 | 0 | 0 | 0 | 0 | 0 | 0 | 0 | 0 |
| DateParserVerbose | 562 | 0 | 0 | 0 | 0 | 0 | 0 | 0 | 0 | 0 | 0 | 0 | 0 |
| DiskMon | 3 | 0 | 0 | 0 | 0 | 0 | 0 | 0 | 0 | 0 | 0 | 0 | 0 |
| IndexConfig | 1 | 0 | 0 | 0 | 0 | 0 | 0 | 0 | 0 | 0 | 0 | 0 | 0 |
| LicenceUsage | 2872 | 0 | 0 | 0 | 0 | 0 | 0 | 0 | 0 | 0 | 0 | 0 | 0 |
| Metrics | 0 | 1 | 972 | 2916 | 972 | 972 | 4621 | 2843 | 9314 | 9306 | 18797 | 12636 | 972 |
| OneShotWriter | 12226 | 0 | 0 | 0 | 0 | 0 | 0 | 0 | 0 | 0 | 0 | 0 | 0 |
| TailingProcessor | 2 | 0 | 0 | 0 | 0 | 0 | 0 | 0 | 0 | 0 | 0 | 0 | 0 |
| WatchedFile | 18 | 0 | 0 | 0 | 0 | 0 | 0 | 0 | 0 | 0 | 0 | 0 | 0 |
| cached | 5 | 0 | 0 | 0 | 0 | 0 | 0 | 0 | 0 | 0 | 0 | 0 | 0 |
| decorators | 2 | 0 | 0 | 0 | 0 | 0 | 0 | 0 | 0 | 0 | 0 | 0 | 0 |
| utils | 1 | 0 | 0 | 0 | 0 | 0 | 0 | 0 | 0 | 0 | 0 | 0 | 0 |
| view | 6 | 0 | 0 | 0 | 0 | 0 | 0 | 0 | 0 | 0 | 0 | 0 | 0 |

20 per page ∨   Format ∨

PARALLEL BRANCH OPERATION USING INTERMEDIARY NODES

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

An information technology ("IT") system may include a framework for processing large volumes of data and may store the large volumes of data across a number of computing nodes ("nodes"). The nodes may be logical or physical nodes. In an example, a node may receive a search query from a user to retrieve certain data stored in the nodes. A processing system can process the search query by searching the nodes simultaneously for partial search results. The processing system can collect and combine the partial search results to produce final search results. To "combine" partial search results may refer to grouping, sorting, or transforming the search results or deriving data from the partial search results. For example, common "map-reduce" techniques include separate map and reduce operations to obtain data from nodes and combine the retrieved data, respectively, to generate final results. In such systems, fewer nodes can perform the reduce operations compared to the number of nodes that perform the map operations. For example, under the direction of a single node, other nodes can perform map operations on locally stored data, and write outputs to a temporary storage. The outputs may be distributed among the nodes, and subsequently received by the single node. Then, in the reduce operation, the single node can combine the outputs to generate final search results.

These existing techniques have limited efficiency and scalability because the nodes performing the combining operations can reach and exceed capacity rapidly as the number of nodes being searched increases. While the search operations can be performed by other nodes, the node performing the combine operation can exceed a computational capacity. As a result, obtaining search results from large volumes of data across numerous nodes can fail. Additionally, these techniques are performed in a linear fashion (e.g., common "map-reduce" techniques often include a mapping of the data and subsequently a reduction of the data). Such a linear execution can lead to extended search times. Although search limits could be implemented to reduce the search times and the computations being performed by the node performing the reduce operation, it also gives rise to technical challenges to search and analyze the data. Such search limits can dramatically reduce the quality of the search results as the search results may not be powerful or thorough.

BRIEF DESCRIPTION OF THE DRAWINGS

One or more implementations of the present disclosure are illustrated by way of example and not limitation in the figures of the accompanying drawings, in which like references indicate similar elements.

FIG. 8A illustrates a search screen according to same implementations of the present disclosure;

FIG. 8B illustrates a data summary dialog that enables a user to select various data sources according to same implementations of the present disclosure;

FIG. 9A illustrates a user interface screen for an example data model-driven report generation interface according to same implementations of the present disclosure;

FIG. 11B illustrates an incident review dashboard according to same implementations of the present disclosure;

FIG. 16 illustrates a user interface screen for an example data model-driven report generation interface according to same implementations of the present disclosure;

FIG. 17 illustrates example visualizations generated by a reporting application according to same implementations of the present disclosure;

DETAILED DESCRIPTION

Figure 1:
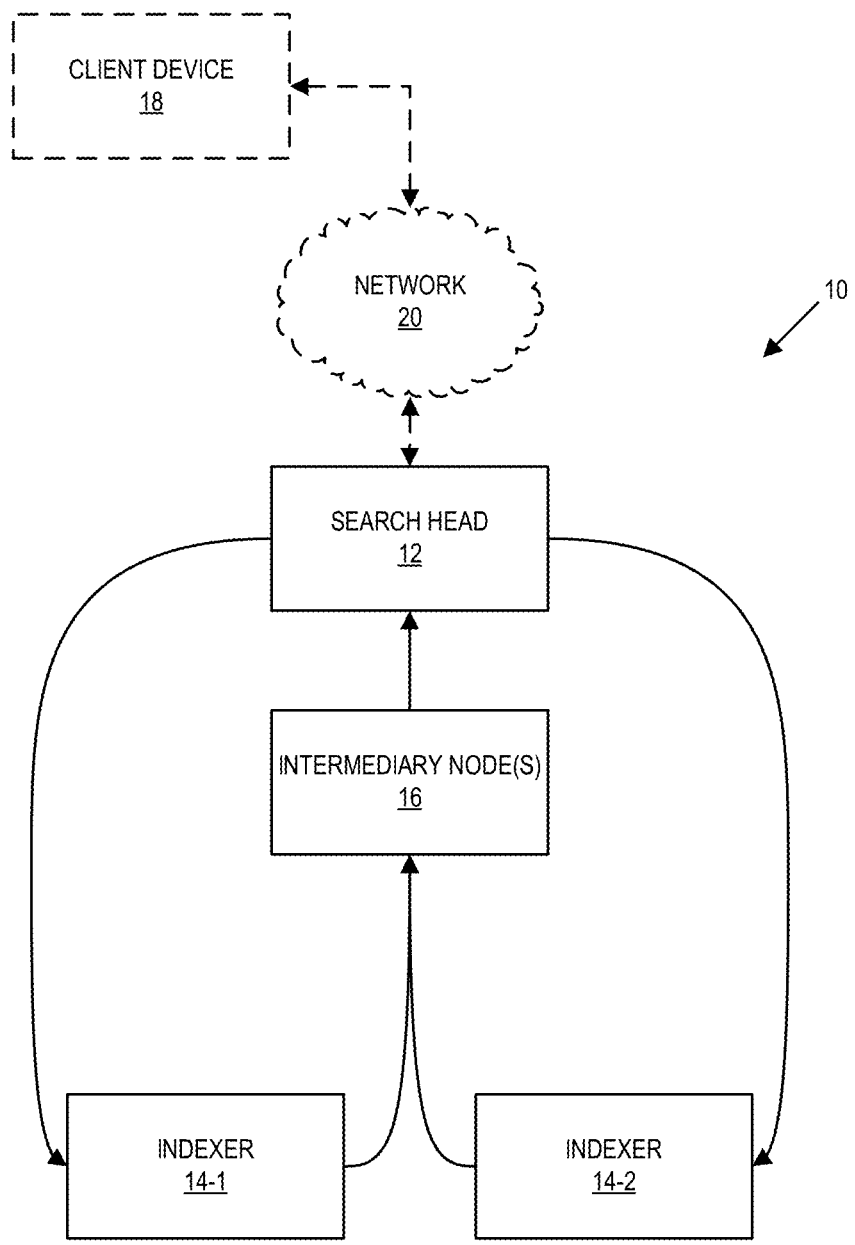
FIG. 1 is a high-level system diagram in which an implementation may be implemented.

Embodiments are described herein according to the following outline:

1.0. General Overview
2.0. Operating Environment
   2.1. Host Devices
   2.2. Client Devices
   2.3. Client Device Applications
   2.4. Data Server System
   2.5. Data Ingestion
      2.5.1 Input
      2.5.2 Parsing
      2.5.3 Indexing
   2.6 Query Processing
   2.7 Field Extraction
   2.8 Example Search Screen
   2.9 Data Models
   2.10 Acceleration Technique
      2.10.1 Aggregation Technique
      2.10.2 Keyword Index
      2.10.3 High Performance Analytics Store
      2.10.4 Accelerating Report Generation
   2.11 Security Features
   2.12 Data Center Monitoring
   2.13 Cloud-Based System Overview
   2.14 Searching Externally Archived Data
      2.14.1 ERP Process Features
      2.14.2 IT Service Monitoring
3.0. Multi-Phased Data Execution Architecture
   3.1. Intake System
      3.1.1 Forwarder
      3.1.2 Data Retrieval Subsystem
      3.1.3 Ingestion Buffer
      3.1.4 Streaming Data Processors
   3.2. Parallel Branching Operations
   3.3 Multi-Phased Data Execution Previews
4.0. Computing System Architecture The ensuing description provides examples only and is not intended to limit the scope, applicability, or configuration of the disclosure. Rather, the ensuing description of examples will provide those skilled in the art with an enabling description for implementing a preferred implementation. It is understood that various changes can be made in the function and arrangement of elements without departing from the spirit and scope as set forth in the appended claims.

In this description, references to "an implementation," "one implementation," or the like mean that the particular feature, function, structure, or characteristic being described is included in at least one implementation of the technique introduced herein. Occurrences of such phrases in this specification do not necessarily refer to the same implementation. On the other hand, the implementations referred to are also not necessarily mutually exclusive.

Information technology (IT) systems can generate and maintain relatively large datasets distributed across numerous nodes. In response to a search query for data stored on the nodes, a system can perform a search operation to retrieve partial search results from one or more nodes. The partial search results can be combined to produce final search results for the search query. For example, "map-reduce" techniques involve map operations performed to search for locally stored partial search results. A node can collect the partial search results and perform reduce operations to combine the partial search results, to produce final search results.

In some cases, IT systems use a single node for search management functions to direct search requests to a set of peer nodes that perform map operations, and then the single node can perform reduce operations to merge the partial search results and produce final search results back to the user. Although using fewer nodes or even a single node to direct search processing can improve management functionality, requiring the single node to perform reduce operations limits the overall scalability of the system because the capacity of the single node to perform reduce operations can be readily exceeded as more peer nodes are searched.

For example, a data intake and query system such as the SPLUNK® ENTERPRISE system can provide real-time operational intelligence that enables organizations to collect, index, and search data from various distributed sources. The data intake and query system can include peer search nodes (e.g., indexers) that index data obtained from various sources. A search node may be responsible for storing and searching local data in response to search requests. Although a search node can perform searches across its own data, in larger deployments, a search head can handle search management and coordinate searches across multiple search nodes. In a distributed search environment, the search head can handle search management functions, directing search requests to a set of peer search nodes and then merging the results back to the user.

By distributing data among peer search nodes, the search nodes can search and analyze data for a query in parallel. Further, a search node can perform a first search for a query, and, after the performance of the first search, perform a second search for the query. For example, using map-reduce techniques, the search nodes can return multiple sets of partial search results to a search head that performs a branching operation (e.g., a join operation), received as part of the search query, on the partial search results to produce final search results. Although implementing map-reduce techniques can efficiently find the search results requested for a search query, the search head can become a bottleneck as the search head has to perform the branching operation on the partial search results. Further, the search nodes can become a bottleneck as the search nodes linearly produce sets of partial results. For example, a search node may produce a first set of partial results and, subsequently, a second set of partial results. Thus, the computations executed by both the search node and search head may lead to serious drawbacks due to the linear execution of the map reduce model.

The disclosed techniques overcome these drawbacks. Specifically, the disclosed techniques minimize or eliminate the risk of bottlenecks at the search head through the use of a "shuffle" functionality that uses intermediary nodes (e.g., reducers) which can be nodes (e.g., logical nodes or physical hardware servers) used to perform at least a portion of the branching operation included in the search query. For example, the intermediary nodes may join the partial results of a first subquery and the partial results of a second subquery prior to sending results to the search head. The search head can collect further combined search results from multiple intermediary nodes and complete the branching operation (e.g., join the further combined search results). The branching operation may include any operation that is used to combine, group, join, sort, etc. multiple sets of data.

The search head can define a search process used to execute the search query that includes a branching operation to combine multiple sets of subquery search results. The search process coordinates providing the multiple subqueries to the search nodes (e.g., indexers) and at least a portion of the branching operation to the intermediary nodes (e.g., reducers). In some cases, the search nodes can concurrently obtain first partial search results for the first subquery and second partial search results for the second subquery. For example, a search head can provide the first subquery and the second subquery to the search node and the search node may concurrently execute both subqueries. In other implementations, the search nodes can execute the first subquery to generate the first partial search results and subsequently execute the second subquery to generate the second partial search results. This multi-phased data execution process may be generated based on policies, the scope and contents of the search query, and/or various other factors. The multi-phased data execution process can coordinate map operations of the search nodes, parallel reduce operations (e.g., at least a portion of the branching operation) of the intermediary nodes, and further reduce operations (e.g., at least another portion of the branching operation) of the search head.

Hence, a multi-phased data execution of a search query including a branching operation to combine multiple sets of data includes three layers of phases. A first set of phases may encompass performing multiple map operations by peer search nodes to concurrently obtain sets of partial search results for multiple subqueries. A second set of phases may encompass performing at least a portion of the branching operation by intermediary nodes on the sets of partial search results of the first phase. Lastly, a third set of phases may encompass performing a final portion of the branching operation by the search head based on the combined partial search results of the second set of phases. Embodiments of the multi-phased data execution may include more or fewer phases. For example, some implementations may not include a final reduce operation if the intermediary nodes performed the branching operation necessary to produce final search results.

In some examples, multiple levels of intermediary nodes are used. For example, the search head or the peer search node can specify a particular key associated with particular partial search results. Sets of particular partial search results may be sent from the peer search nodes to an intermediary node associated with that particular key. The intermediary node performs at least a portion of the branching operation on the sets of partial search results associated with a key for search nodes encompassed by the search operation. The intermediary node then sends its combined partial search results to another intermediary node for further reduction, and/or then ultimately to the search head to fully combine the partial search results. The use of this linear arrangement of phases allows the search head to offload processing of the branching operation onto intermediary nodes such that the search head could run at or below capacity to avoid bottlenecks, regardless of the number of peer search nodes implemented by the data index and query system.

The disclosed implementations also include a preview visualization that is generated based on a portion of the combined results of the intermediary nodes. For example, the intermediary nodes can send a portion of its combined results out of band to the search head before the search head collects the combined partial search results of the intermediary nodes. The preview visualization can be rendered on a display as feedback indicative of a status of the query processing by the data intake and query system.

FIG. 1 is a high-level system diagram in which an implementation may be implemented. A data intake and query system generally includes a search head 12 that can perform search operations applied to the indexers 14. In particular, the indexers 14 parse and index data during a "data intake" phase. The search head 12 can then query the indexers 14 for their data during a subsequent "query" phase. Each indexer 14 may be responsible for storing and searching a subset of the data (e.g., the indexer may be a search node that searches a particular subset of data) contained in a corresponding data store. By distributing data among the indexers 14, the indexers 14 can analyze data for a query in parallel. For example, using map-reduce techniques, the indexers 14 can return partial responses for a subset of data to the search head 12 that combines the results to produce an answer for the query. Further, the indexers 14 can concurrently perform a first subquery and a second subquery in parallel. By concurrently performing a first subquery and a second subquery, the indexer is able to concurrently provide multiple sets of search results.

The search head 12 can become a bottleneck if it has to perform a branching operation, as part of the search query to be performed by the search head 12, on numerous partial search results and/or search numerous indexers. For example, high cardinality search queries create bottlenecks because the indexers 14 would send an overwhelming amount of search results to the search head 12. To overcome these drawbacks, the disclosed implementations use one or more intermediary nodes 16 to perform at least a portion of the branching operation to minimize or eliminate the risk of bottlenecks at the search head 12 by reducing the amount of the branching operation that is performed at the search head 12 and allowing at least a portion of the branching operation to be performed in parallel by the intermediary nodes 16. The search head 12 then receives partial search results that have already been at least partially combined by the intermediary nodes 16. The search head 12 may then complete the performance of the branching operation on the combined partial search results to produce final search results.

For example, the system 10 may include some intermediary nodes 16 that perform at least a portion of the branching operation of the search query to generate combined partial search results based on the multiple sets of partial search results provided from indexers 14, and other intermediary nodes 16 that combine other partial search results from other indexers 14 or the same indexers 14. The intermediary node 16 can send combined partial search results to the search head 12, which can complete the performance of the branching operation to further combine the combined partial search results in order to produce final search results for a search query.

The system 10 can include a client device 18 running client applications that can access the search head 12 or any other components of the system 10. For example, the client device 18 may include a user interface ("UI") rendered on a display device that provides an interactive platform to submit search queries and receive final search results from the system 10 over a network 20.

These techniques are beneficial in data intake and query systems that store large volumes of data across numerous nodes. In an effort to reduce the amount of data stored by the nodes, some systems pre-process raw data based on anticipated data analysis needs, store the pre-processed data, and discard any remaining raw data. However, discarding massive amounts of raw data can result in the loss of valuable insights that could have been obtained by searching the raw data.

Figure 2:
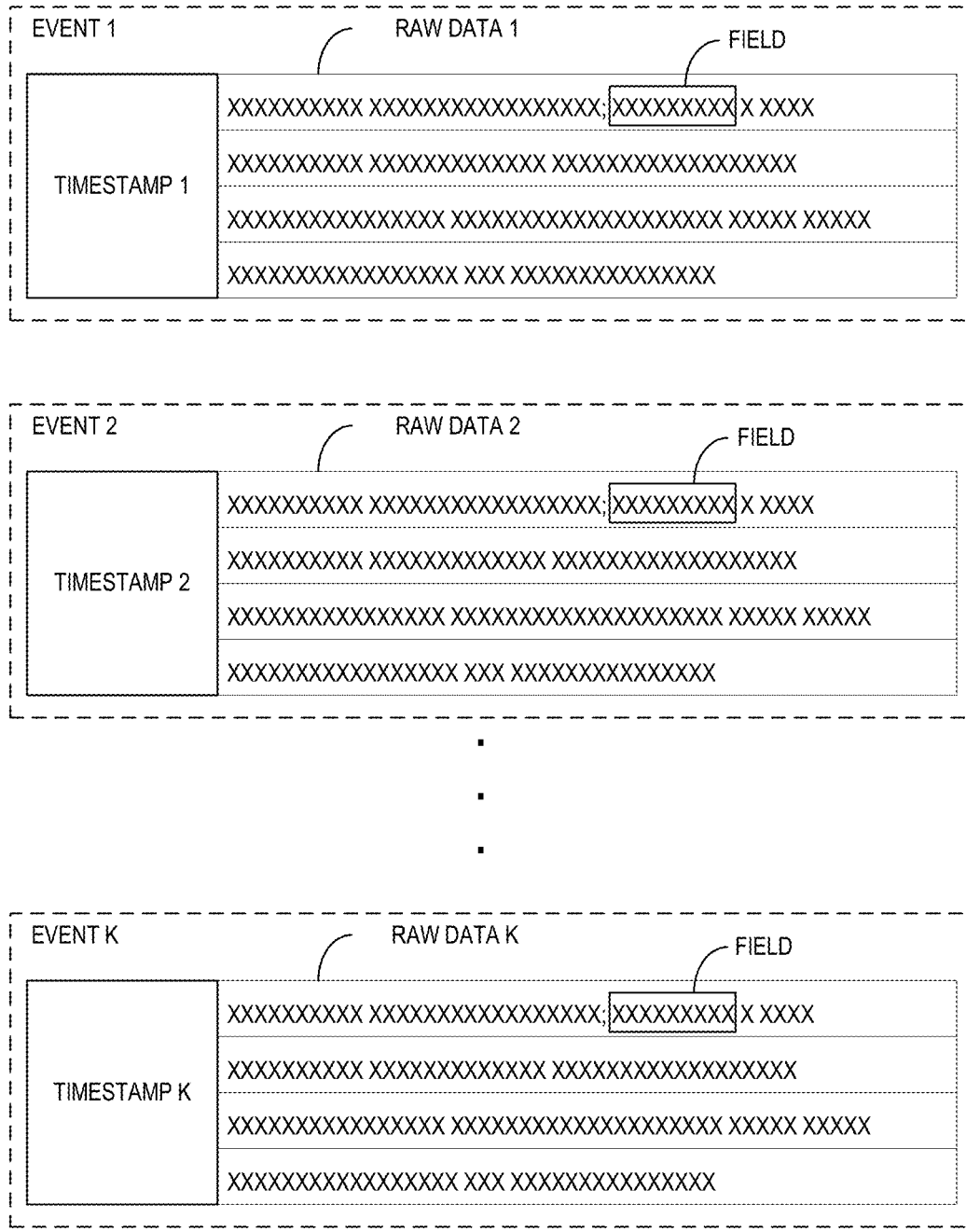
FIG. 2 is a block diagram illustrating a series of events including raw data according to same implementations of the present disclosure.

The disclosed system 10 can address some of these challenges by collecting and storing raw data as structured "events." FIG. 2 is a block diagram illustrating a series of events, including raw data, according to same implementations of the present disclosure. An event includes a portion of raw data and is associated with a specific point in time. For example, events may be derived from "time series data," where the time series data comprises a sequence of data points (e.g., performance measurements from a computer system) that are associated with successive points in time.

As shown, events 1 through K can be associated with a timestamp 1 through K that can be derived from the raw data in the respective event, determined through interpolation between temporally proximate events having known timestamps, or determined based on other configurable rules for associating timestamps with events. During operation of a data intake and query system, ingested raw data is divided into segments of raw data delineated by time segments (e.g., blocks of raw data, each block associated with a specific time frame). The segments of raw data are indexed as timestamped events, corresponding to their respective time segments as shown in FIG. 2. The system stores the timestamped events in a data store of an indexer 14.

In some instances, data systems can store raw data in a predefined format, where data items with specific data formats are stored at predefined locations in the data. For example, the raw data may include data stored as fields. In other instances, raw data may not have a predefined format; that is, the data is not at fixed, predefined locations, but the data does have repeatable patterns and is not random. This means that some raw data can comprise various data items of different data types that may be stored at different locations within the raw data. As shown in FIG. 2, each event 1 through K includes a field that is nine characters in length beginning after a semicolon on a first line of the raw data. In certain implementations, these fields can be queried to extract their contents.

In some examples, systems can store raw data as events that are indexed by timestamps but are also associated with predetermined data items. This structure is essentially a modification of database systems to predetermine data items for subsequent searches. These systems can be modified to retain the remaining raw data for subsequent re-processing for other predetermined data items.

Specifically, the raw data can be divided into segments and indexed by timestamps. The predetermined data items can be associated with the events indexed by timestamps. The events can be searched for the predetermined data items during search time; the events can be re-processed later in time to re-index the raw data, and generate events with new predetermined data items. As such, the system 10 can store data in a variety of pre-processed data and raw data in a variety of structures.

Thus, the disclosed techniques can benefit any data intake and query systems that store structured, semi-structured, and/or unstructured data and, in particular, when this data is stored in large volumes across numerous nodes, which tends to be the case when storing raw or minimally processed data. However, the system 10 is merely a non-limiting example of one arrangement including a distribution of components used to generate, process, store, and/or search structured, semi-structured raw, and/or unstructured raw data. In any configuration, the search head 12 can offload operations (e.g., portions of the branching operation) to the intermediary nodes 16, which reduces the risk of bottlenecks by the search head 12 to improve the overall operations of the system 10.

1.0. GENERAL OVERVIEW

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of being limited to searching on a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events." An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time, it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.) and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data." In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values produced are semantically-related (such as an internet protocol ("IP") address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters forms a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values or for a group of common field values (e.g., central processing unit ("CPU") metric from different sources Amazon Web Services, Google Cloud Platform, Linux operating system ("OS")) in the events, when the events are being created, indexed, or stored, or possibly at a later time. Alternatively, a user may manually define extraction rules for fields or a group of fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learning valuable insights about the raw data.

In some examples, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a common information model ("CIM") across the disparate data sources (further discussed with respect to FIG. 7).

2.0. OPERATING ENVIRONMENT

Figure 3:
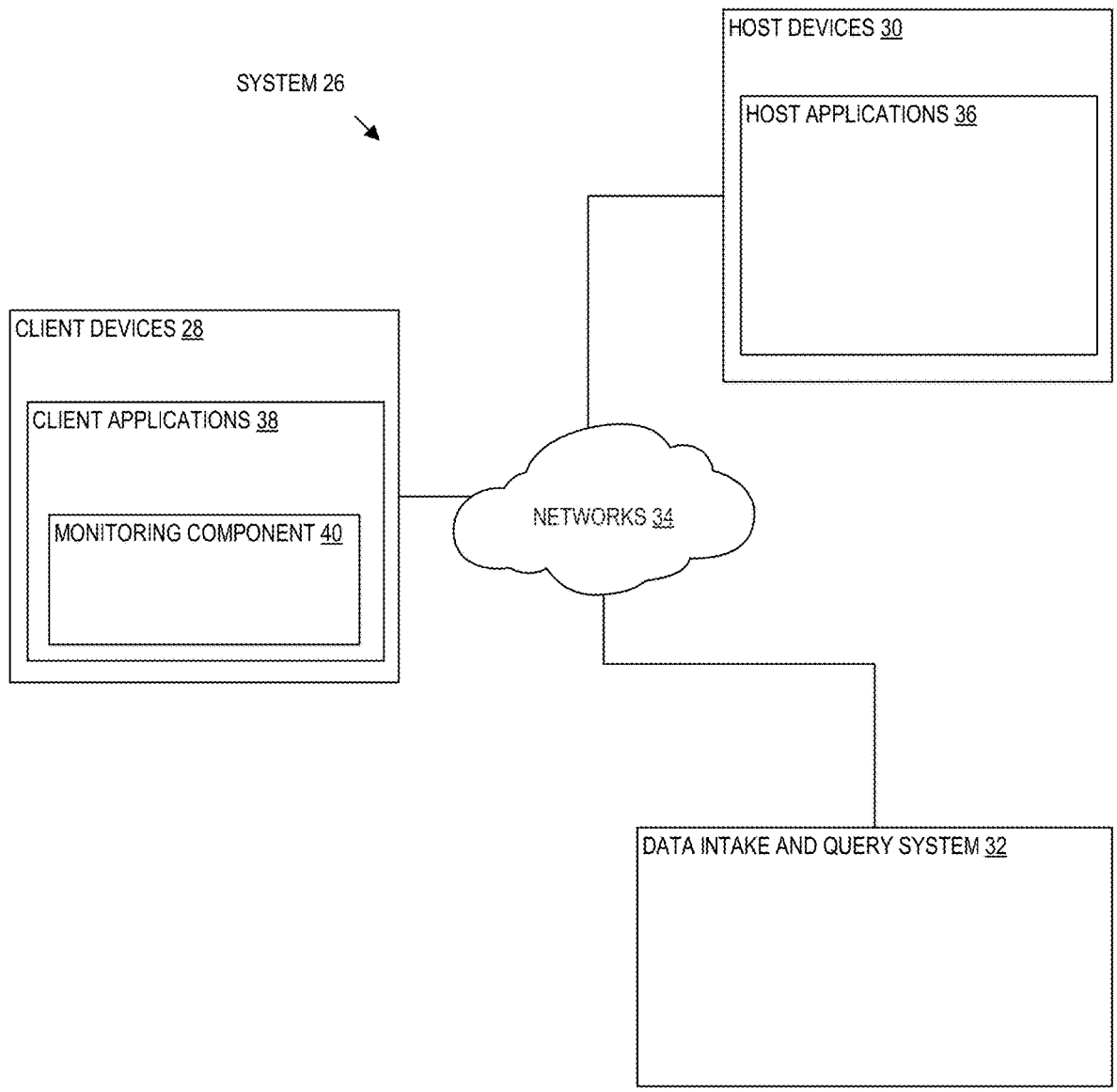
FIG. 3 illustrates a networked computer environment in which an implementation may be implemented.

FIG. 3 illustrates a networked computer system 26 in which an implementation may be implemented. Those skilled in the art would understand that FIG. 3 represents one example of a networked computer system and other implementations may use different arrangements.

The networked computer system 26 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an implementation, one or more client devices 28 are coupled to one or more host devices 30 and a data intake and query system 32 (also referred to as "system 32") via one or more networks 34. In some examples, the data intake and query system 32 is similar or the same as the data intake and query system of FIG. 1. Networks 34 broadly represent one or more of a local area network ("LAN"), a wide area network ("WAN"), a cellular network (e.g., long term evolution ("LTE"), high-speed packet access ("HSPA"), 3G, and other cellular technologies), and/or networks using any of wired, wireless, terrestrial microwave, or satellite links, and may include the public Internet.

2.1. Host Devices

In the illustrated implementation, a system 26 includes one or more host devices 30. Host devices 30 may broadly include any number of computers, virtual machine instances, and/or data centers that are configured to host or execute one or more instances of host applications 36. In general, a host device 30 may be involved, directly or indirectly, in processing requests received from client devices 28. Each host device 30 may comprise, for example, one or more of a network device, a web server, an application server, a database server, etc. A collection of host devices 30 may be configured to implement a network-based service. For example, a provider of a network-based service may configure one or more host devices 30 and host applications 36 (e.g., one or more web servers, application servers, database servers, etc.) to collectively implement the network-based application.

In general, client devices 28 communicate with one or more host applications 36 to exchange information. The communication between a client device 28 and a host application 36 may, for example, be based on the Hypertext Transfer Protocol ("HTTP") or any other network protocol. Content delivered from the host application 36 to a client device 28 may include, for example, hypertext markup language ("HTML") documents, media content, etc. The communication between a client device 28 and host application 36 may include sending various requests and receiving data packets. For example, in general, a client device 28 or application running on a client device may initiate communication with a host application 36 by making a request for a specific resource (e.g., based on an HTTP request), and the application server may respond with the requested content stored in one or more response packets.

In the illustrated implementation, one or more of host applications 36 may generate various types of performance data during operation, including event logs, network data, sensor data, and other types of machine-generated data. For example, a host application 36 comprising a web server may generate one or more web server logs in which details of interactions between the web server and any number of client devices 28 is recorded. As another example, a host device 30 comprising a router may generate one or more router logs that record information related to network traffic managed by the router. As yet another example, a host application 36 comprising a database server may generate one or more logs that record information related to requests sent from other host applications 36 (e.g., web servers or application servers) for data managed by the database server.

2.2. Client Devices

Client devices 28 of FIG. 3 represent any computing device capable of interacting with one or more host devices 30 via a network (connected or wireless) 34. Examples of client devices 28 may include, without limitation, smart phones, tablet computers, handheld computers, wearable devices, laptop computers, desktop computers, servers, portable media players, gaming devices, and so forth. In general, a client device 28 can provide access to different content, for instance, content provided by one or more host devices 30, etc. Each client device 28 may comprise one or more client applications 38, described in more detail in a separate section hereinafter.

2.3. Client Device Applications

In an implementation, the client device 28 may host or execute one or more client applications 38 that are capable of interacting with one or more host devices 30 via one or more networks 34. For instance, a client application 38 may be or comprise a web browser that a user may use to navigate to one or more websites or other resources provided by one or more host devices 30. As another example, a client application 38 may comprise a mobile application or "app." For example, an operator of a network-based service hosted by one or more host devices 30 may make available one or more mobile apps that enable users of client devices 28 to access various resources of the network-based service. As yet another example, client applications 38 may include background processes that perform various operations without direct interaction from a user. A client application 38 may include a "plug-in" or "extension" to another application, such as a web browser plug-in or extension.

In an implementation, a client application 38 may include a monitoring component 40. At a high level, the monitoring component 40 comprises a software component or other logic that facilitates generating performance data related to a client device's operating state, including monitoring network traffic sent and received from the client device and collecting other device and/or application-specific information. Monitoring component 40 may be an integrated component of a client application 38, a plug-in, an extension, or any other type of add-on component. Monitoring component 40 may also be a stand-alone process.

In one implementation, a monitoring component 40 may be created when a client application 38 is developed, for example, by an application developer using a software development kit ("SDK"). The SDK may include custom monitoring code that can be incorporated into the code implementing a client application 38. When the code is converted to an executable application, the custom code implementing the monitoring functionality can become part of the application itself.

In some cases, an SDK or other code for implementing the monitoring functionality may be offered by a provider of a data intake and query system, such as a system 32. In such cases, the provider of the system 32 can implement the custom code so that performance data generated by the monitoring functionality is sent to the system 32 to facilitate analysis of the performance data by a developer of the client application or other users.

In an implementation, the custom monitoring code may be incorporated into the code of a client application 38 in a number of different ways, such as the insertion of one or more lines in the client application code that call or otherwise invoke the monitoring component 40. As such, a developer of a client application 38 can add one or more lines of code into the client application 38 to trigger the monitoring component 40 at desired points during execution of the application. Code that triggers the monitoring component may be referred to as a monitor trigger. For instance, a monitor trigger may be included at or near the beginning of the executable code of the client application 38 such that the monitoring component 40 is initiated or triggered as the application is launched, or included at other points in the code that correspond to various actions of the client application, such as sending a network request or displaying a particular interface.

In an implementation, the monitoring component 40 may monitor one or more aspects of network traffic sent and/or received by a client application 38. For example, the monitoring component 40 may be configured to monitor data packets transmitted to and/or from one or more host applications 36. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 38 or set of applications.

In an implementation, network performance data refers to any type of data that indicates information about the network and/or network performance. Network performance data may include, for instance, a uniform resource locator ("URL") requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 32 for analysis.

Upon developing a client application 38 that incorporates a monitoring component 40, the client application 38 can be distributed to client devices 28. Applications generally can be distributed to client devices 28 in any manner, or they can be pre-loaded. In some cases, the application may be distributed to a client device 28 via an application marketplace or other application distribution system. For instance, an application marketplace or other application distribution system might distribute the application to a client device based on a request from the client device to download the application.

In an implementation, the monitoring component 40 may also monitor and collect performance data related to one or more aspects of the operational state of a client application 38 and/or client device 28. For example, a monitoring component 40 may be configured to collect device performance information by monitoring one or more client device operations, or by making calls to an operating system and/or one or more other applications executing on a client device 28 for performance information. Device performance information may include, for instance, a current wireless signal strength of the device, a current connection type and network carrier, current memory performance information, a geographic location of the device, a device orientation, and any other information related to the operational state of the client device.

In an implementation, the monitoring component 40 may also monitor and collect other device profile information including, for example, a type of client device, a manufacturer and model of the device, versions of various software applications installed on the device, and so forth.

In general, a monitoring component 40 may be configured to generate performance data in response to a monitor trigger in the code of a client application 38 or other triggering application event, as described above, and to store the performance data in one or more data records. Each data record, for example, may include a collection of field-value pairs, the field-value pairs storing a particular item of performance data in association with a field for the item. For example, a data record generated by a monitoring component 40 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 4:
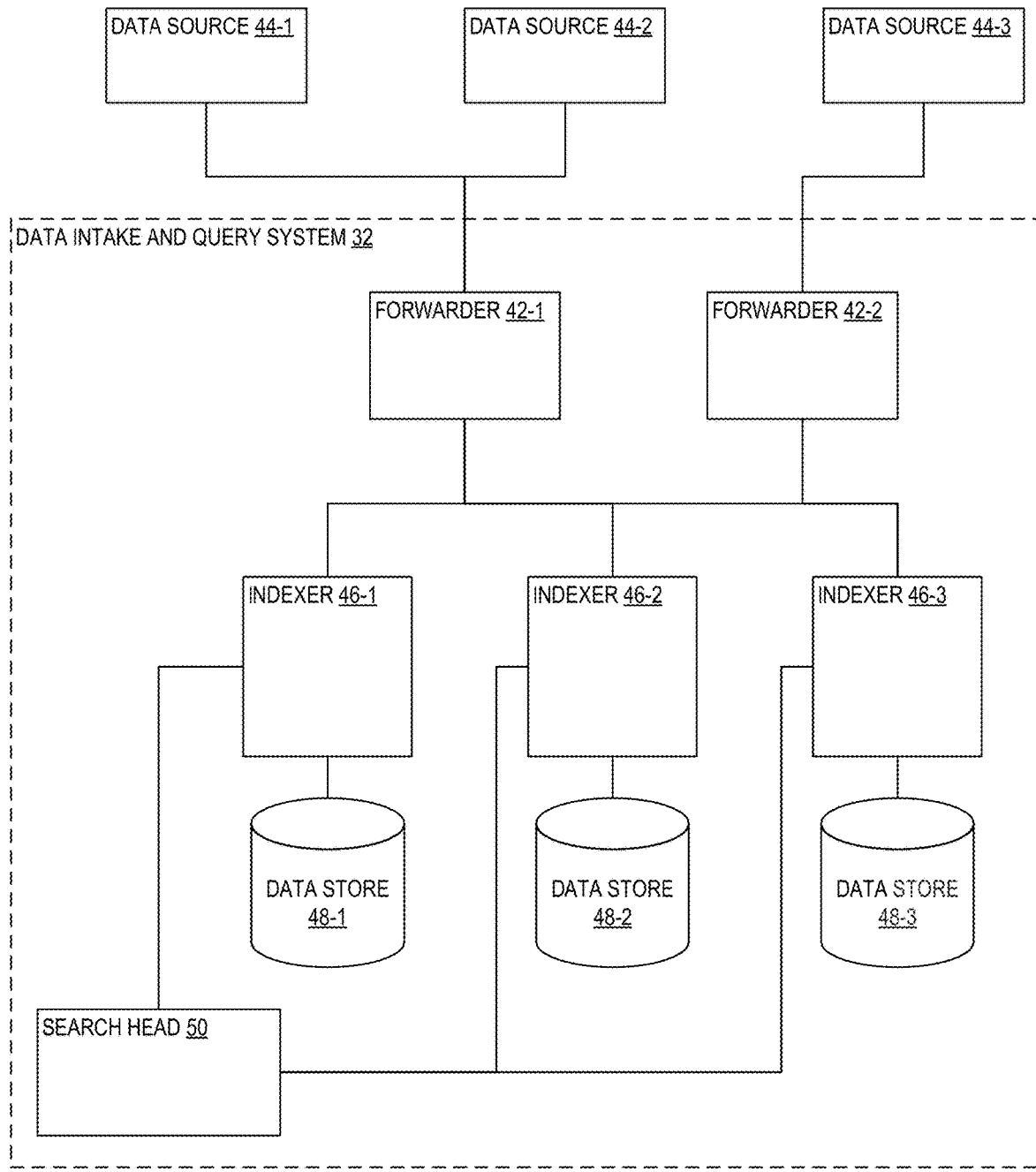
FIG. 4 illustrates a block diagram of an example data intake and query system in which an implementation may be implemented.

FIG. 4 depicts a block diagram of an example data intake and query system 32, similar to the SPLUNK® ENTERPRISE system. System 32 includes one or more forwarders 42 that receive data from a variety of input data sources 44, and one or more indexers 46 that process and store the data in one or more data stores 48. These forwarders and indexers can comprise separate computer systems, or may alternatively comprise separate processes executing on one or more computer systems.

Each data source 44 broadly represents a distinct source of data that can be consumed by a system 32. Examples of a data source 44 include, without limitation, data files, directories of files, data sent over a network, event logs, registries, etc.

During operation, the forwarders 42 identify which indexers 46 receive data collected from a data source 44 and forward the data to the appropriate indexers. Forwarders 42 can also perform operations on the data before forwarding, including removing extraneous data, detecting timestamps in the data, parsing data, indexing data, routing data based on criteria relating to the data being routed, and/or performing other data transformations.

In an implementation, a forwarder 42 may comprise a service accessible to client devices 28 and host devices 30 via a network 34. For example, one type of forwarder 42 may be capable of consuming vast amounts of real-time data from a potentially large number of client devices 28 and/or host devices 30. The forwarder 42 may, for example, comprise a computing device which implements multiple data pipelines or "queues" to handle forwarding of network data to indexers 46. A forwarder 42 may also perform many of the functions that are performed by an indexer. For example, a forwarder 42 may perform keyword extractions on raw data or parse raw data to create events. A forwarder 42 may generate time stamps for events. Additionally or alternatively, a forwarder 42 may perform routing of events to indexers. Data store 48 may contain events derived from machine data from a variety of sources pertaining to the same component in an IT environment, and this data may be produced by the machine in question or by other components in the IT environment.

2.5. Data Ingestion

Figure 5:
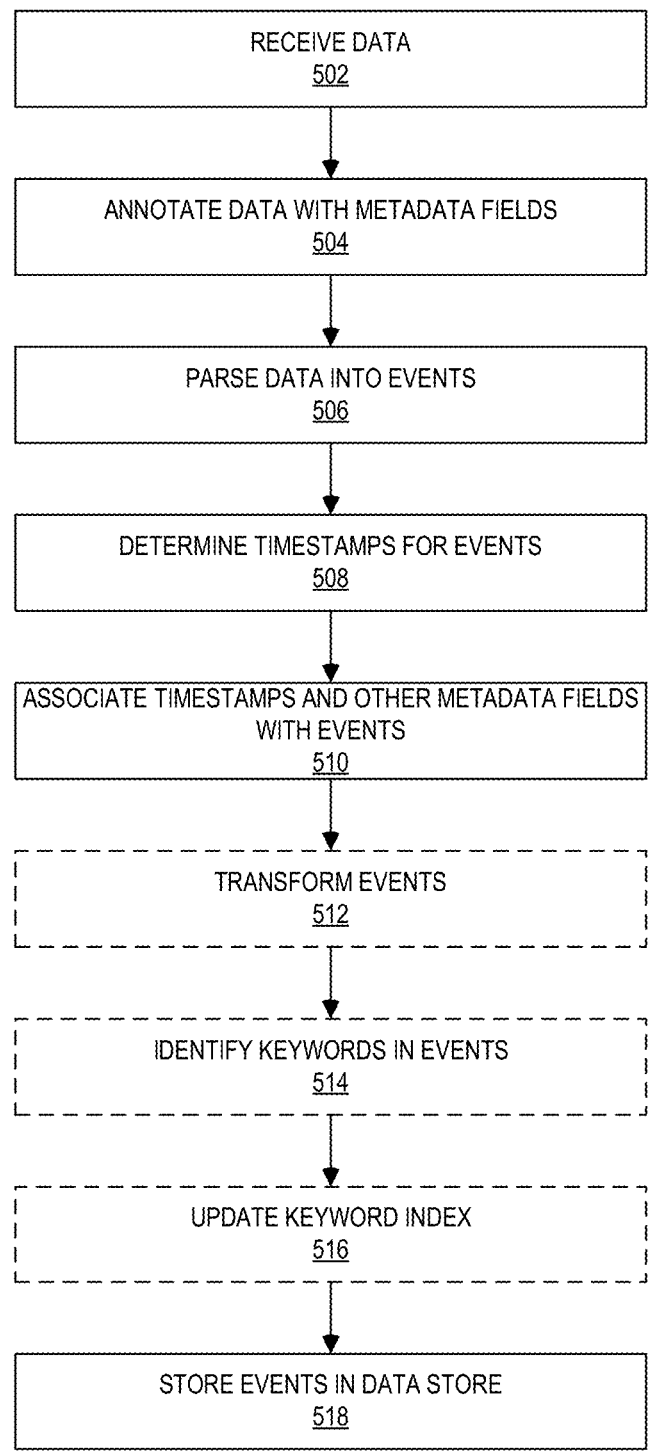
FIG. 5 is a flow diagram illustrating how search nodes process, index, and store data received from forwarders according to same implementations of the present disclosure.

FIG. 5 depicts a flow chart illustrating an example data flow performed by data intake and query system 32, in accordance with the disclosed implementations. The data flow illustrated in FIG. 5 is provided for illustrative purposes only; those skilled in the art would understand that one or more of the steps of the processes illustrated in FIG. 5 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At step 502, a forwarder receives data from an input source, such as a data source 44 shown in FIG. 2. A forwarder initially may receive the data as a raw data stream generated by the input source. For example, a forwarder may receive a data stream from a log file generated by an application server, from a stream of network data from a network device, or from any other source of data. In one implementation, a forwarder receives the raw data and may segment the data stream into "blocks," or "buckets," possibly of a uniform data size, to facilitate subsequent processing steps.

At step 504, a forwarder or other system component annotates one or more blocks generated from the raw data with one or more metadata fields. These metadata fields may, for example, provide information related to the data block as a whole and may apply to the events that is subsequently derived from the data in the data block. For example, the metadata fields may include separate fields specifying one or more of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an implementation, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an implementation, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an implementation, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At step 506, an indexer receives data blocks from a forwarder and parses the data to organize the data into events. In an implementation, to organize the data into events, an indexer may determine a source type associated with the data blocks (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At step 508, the indexer determines a timestamp for a particular event. Similar to the process for creating events, an indexer may again refer to a source type definition associated with the data to locate one or more properties that indicate instructions for determining a timestamp for the events. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or to use any other rules for determining timestamps.

At step 510, the indexer associates a particular event with one or more metadata fields including a field containing the timestamp (in some examples, a timestamp may be included in the metadata fields) determined for the event. These metadata fields may include a number of "default fields" that are associated with the events, and may also include one more custom fields as defined by a user. Similar to the metadata fields associated with the data blocks at step 504, the default metadata fields associated with the events may include a host, source, and source type field including or in addition to a field storing the timestamp.

At step 512, an indexer may optionally apply one or more transformations to data included in the events created at step 506. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At steps 514 and 516, an indexer can optionally generate a keyword index to facilitate fast keyword searching for event data. To build a keyword index, at step 514, the indexer identifies a set of keywords in the events. At step 516, the indexer includes the identified keywords in an index, which associates the stored keywords with reference pointers to events containing that keyword (or to locations within events where that keyword is located, other location identifiers, etc.). When an indexer subsequently receives a keyword-based query, the indexer can access the keyword index to quickly identify events containing the keyword.

In some examples, the keyword index may include entries for name-value pairs found in events, where a name-value pair can include a pair of keywords connected by a symbol, such as an equals sign or colon. This way, events containing these name-value pairs can be quickly located. In some examples, fields can automatically be generated for some or all of the name-value pairs at the time of indexing. For example, if the string "dest=10.0.1.2" is found in an event, a field named "dest" may be created for the event, and assigned a value of "10.0.1.2".

At step 518, the indexer stores the events with an associated timestamp in a data store 48. Timestamps enable a user to search for events based on a time range. In one implementation, the stored events are organized into "buckets," where each bucket stores events associated with a specific time range based on the timestamps associated with each event. This may improve time-based searching and allows for events with recent timestamps, which may have a higher likelihood of being accessed, to be stored in a faster memory to facilitate faster retrieval. For example, buckets containing the most recent events can be stored in flash memory rather than on a hard disk.

Each indexer 46 may be responsible for storing and searching a subset of the events contained in a corresponding data store 48. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

2.6. Query Processing

Figure 6:
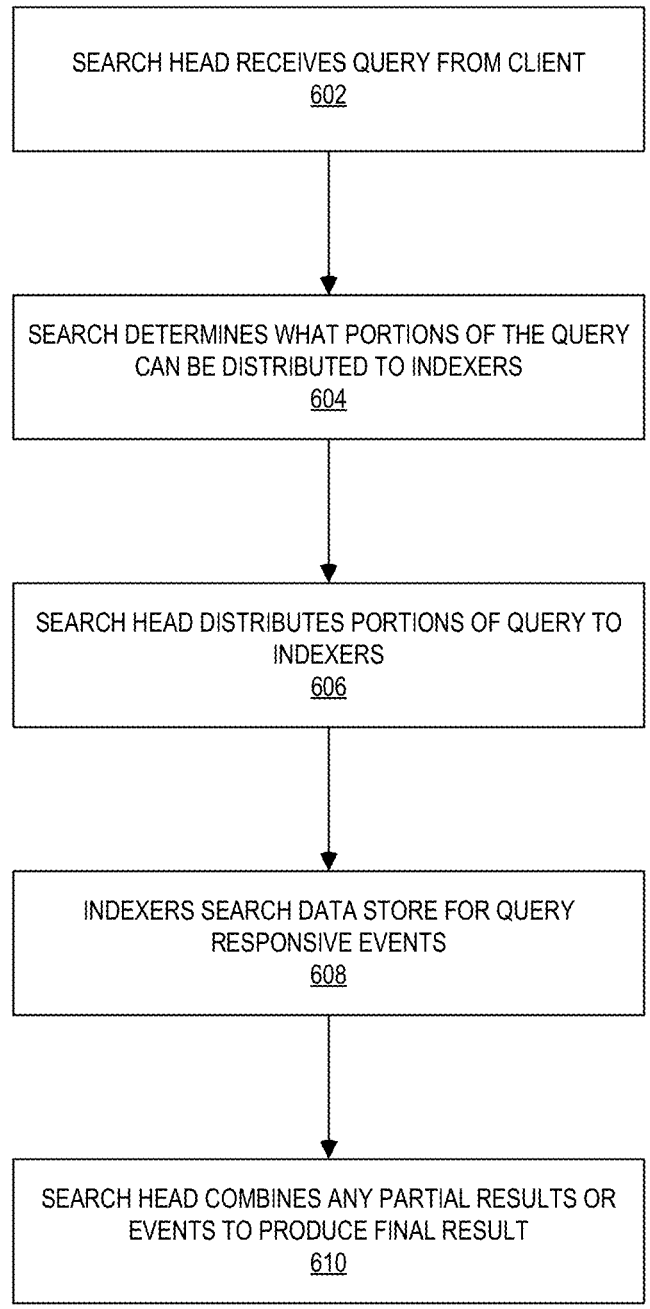
FIG. 6 is a flow diagram illustrating how a search head and search nodes perform a search query according to same implementations of the present disclosure.

FIG. 6 is a flow diagram that illustrates an example process that a search head and one or more indexers may perform during a search query. At step 602, a search head receives a search query from a client. At step 604, the search head analyzes the search query to determine what portion(s) of the query can be delegated to indexers and what portions of the query can be executed locally by the search head. At step 606, the search head distributes the determined portions of the query to the appropriate indexers. In an implementation, a search head cluster may take the place of an independent search head where a particular search head in the search head cluster coordinates with peer search heads in the search head cluster to schedule jobs, replicate search results, update configurations, fulfill search requests, etc. In an implementation, the search head (or each search head) communicates with a master node (also known as a cluster master, not shown in FIG.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At step 608, the indexers to which the query was distributed search data stores associated with them for events and/or aspects of events (such as performance metrics derived from the events, dimensions of the performance metrics, logs, etc.) that are responsive to the query. To determine which events (or aspects of an event) are responsive to the query, the indexer searches for machine data that match the criteria specified in the query. These criteria can include matching keywords or specific values for certain fields. The searching operations at step 608 may use the late-binding schema to extract values for specified fields from events at the time the query is processed. In an implementation, one or more rules for extracting field values may be specified as part of a source type definition. The indexers may then either send the relevant results back to the search head, or use the results to determine a partial result and send the partial result back to the search head.

At step 610, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 32 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready and then returns the complete set of results to the client. In another technique, certain results are stored as "search jobs," and the client may retrieve the results by referring to the search jobs.

The search head can also perform various operations to make the search more efficient. For example, before the search head begins execution of a query, the search head can determine a time range for the query and a set of common keywords that the matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 50 allows users to search and visualize event data extracted from raw machine data received from homogenous data sources. It also allows users to search and visualize event data extracted from raw machine data received from heterogeneous data sources. The search head 50 includes various mechanisms, which may additionally reside in an indexer 46, for processing a query. Splunk Processing Language ("SPL"), used in conjunction with the SPLUNK® ENTERPRISE system, can be utilized to make a query. SPL is a pipelined search language in which a set of inputs is operated on by a first command in a command line, and then a subsequent command following the pipe symbol "I" operates on the results produced by the first command, and so on, for additional commands. Other query languages, such as the Structured Query Language ("SQL"), can be used to create a query.

In response to receiving the search query, search head 50 uses extraction rules to extract values for the fields associated with a field or fields in the event data being searched. The search head 50 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 50 can apply the extraction rules to event data that it receives from indexers 46. Indexers 46 may apply the extraction rules to events in an associated data store 48. Extraction rules can be applied to the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 7:
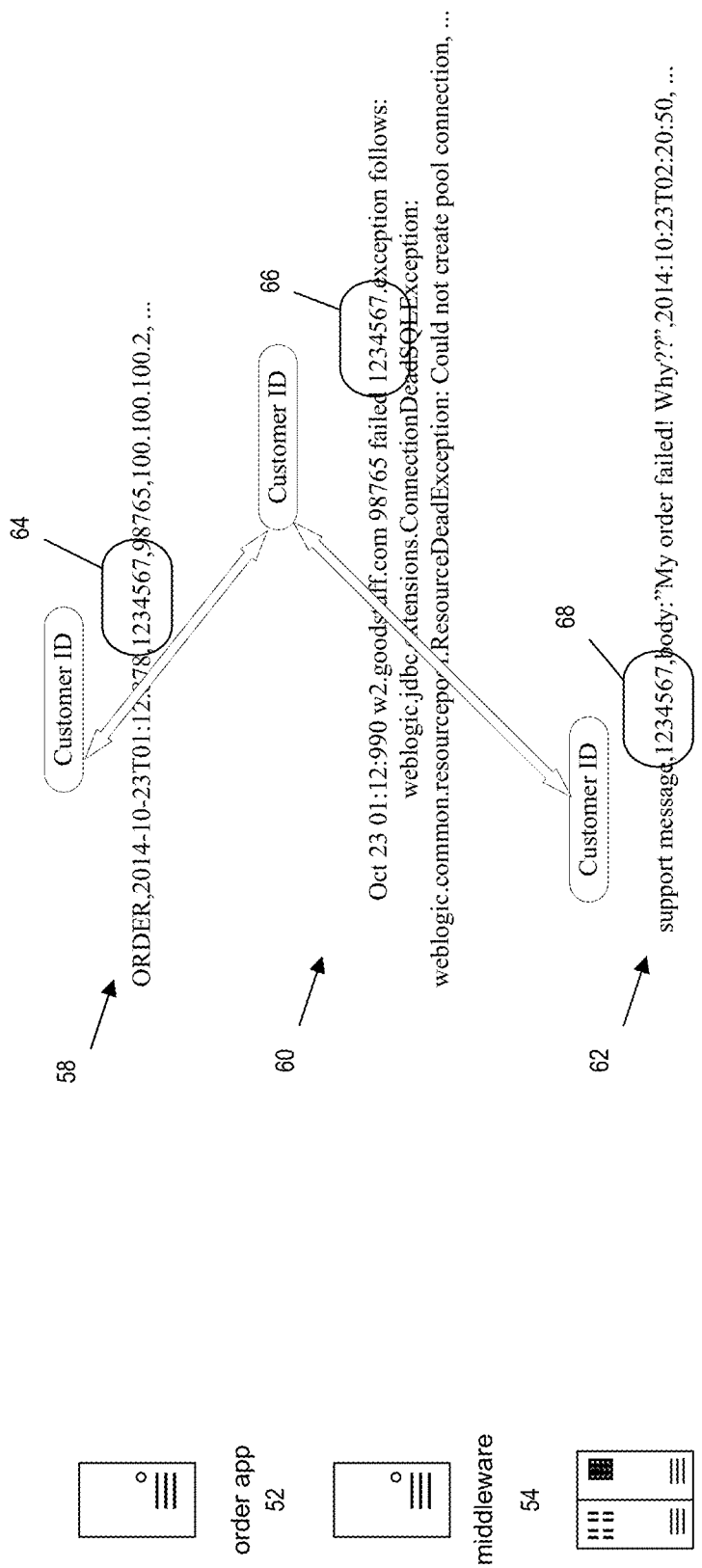
FIG. 7 illustrates a scenario where a common customer ID is found among log data received from three disparate sources according to same implementations of the present disclosure.

FIG. 7 illustrates an example of raw machine data received from disparate data sources. In this example, a user submits an order for merchandise using a vendor's shopping application program 52 running on the user's system. In this example, the order was not delivered to the vendor's server due to a resource exception at the destination server that is detected by the middleware code 54. The user then sends a message to the customer support 56 to complain about the order failing to complete. The three systems 52, 54, and 56 are disparate systems that do not have a common logging format. The order application 52 sends log data 58 to the SPLUNK® ENTERPRISE system in one format, the middleware code 54 sends error log data 60 in a second format, and the support server 56 sends log data 62 in a third format.

Using the log data received at one or more indexers 46 from the three systems, the vendor can uniquely obtain an insight into user activity, user experience, and system behavior. The search head 50 allows the vendor's administrator to search the log data from the three systems that one or more indexers 46 are responsible for searching, thereby obtaining correlated information, such as the order number and corresponding customer ID number of the person placing the order. The system also allows the administrator to see a visualization of related events via a user interface. The administrator can query the search head 50 for customer ID field value matches across the log data from the three systems that are stored at the one or more indexers 46. The customer ID field value exists in the data gathered from the three systems, but the customer ID field value may be located in different areas of the data given differences in the architecture of the systems—there is a semantic relationship between the customer ID field values generated by the three systems. The search head 50 requests event data from the one or more indexers 46 to gather relevant event data from the three systems. It then applies extraction rules to the event data in order to extract field values that it can correlate. The search head may apply a different extraction rule to different set of events from different systems when the event data format differs among systems. In this example, the user interface can display to the administrator the event data corresponding to the common customer ID field values 64, 66, and 68, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 8A:
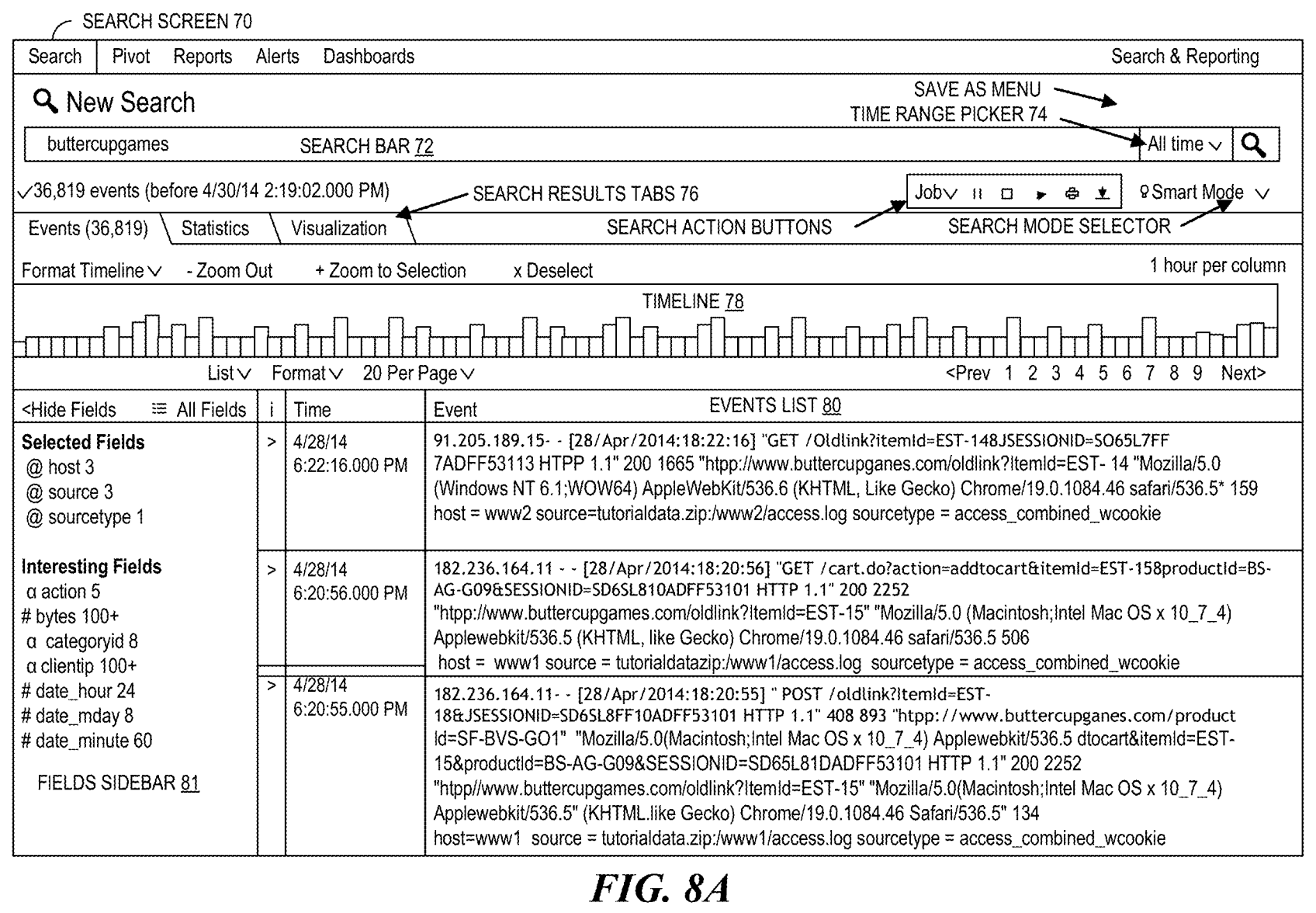

FIG. 8A illustrates an example search screen 70 in accordance with the disclosed implementations. Search screen 70 includes a search bar 72 that accepts user input in the form of a search string. It also includes a time range picker 74 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 8B that enables the user to select different sources for the event data, such as by selecting specific hosts and log files.

After the search is executed, the search screen 70 in FIG. 8A can display the results through search results tabs 76, wherein search results tabs 76 includes: an "events tab" that displays various information about events returned by the search; a "statistics tab" that displays statistics about the search results; and a "visualization tab" that displays various visualizations of the search results. The events tab illustrated in FIG. 8A displays a timeline graph 78 that graphically illustrates the number of events that occurred in one-hour intervals over the selected time range. It also displays an events list 80 that enables a user to view the raw data in the returned events. It additionally displays a fields sidebar 81 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent and specify a set of fields that are associated with the events. Thus, a user can retrieve and use the "e-mails sent" data model object to quickly search source data for events relating to sent e-mails, and the user may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in FIG.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the CIM or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset.

A data model can also include reports. One or more report formats can be associated with a particular data model and be made available to run against the data model. A user can use child objects to design reports with object datasets that already have extraneous data pre-filtered out. In an implementation, the data intake and query system 32 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Data visualizations also can be generated in a variety of formats, by reference to the data model. Reports, data visualizations, and data model objects can be saved and associated with the data model for future use. The data model object may be used to perform searches of other data.

FIGS. 14, 15, and 9A through 9D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 14:
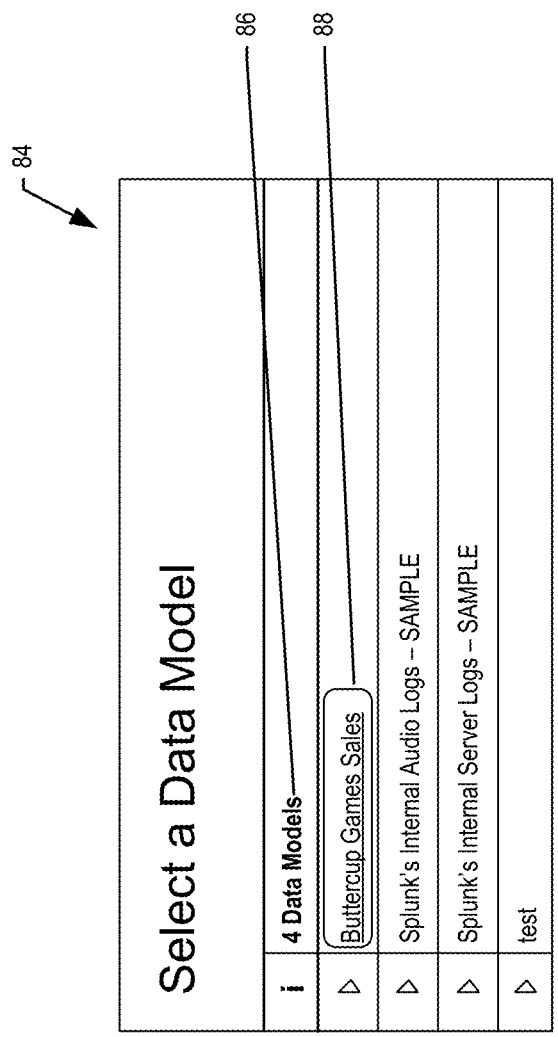
FIG. 14 illustrates a user interface screen for an example data model-driven report generation interface according to same implementations of the present disclosure.

The selection of a data model object for use in driving a report generation may be facilitated by a data model object selection interface. FIG. 14 illustrates an example interactive data model selection graphical user interface 84 of a report editor that displays a listing of available data models 86. The user may select one of the data models 88.

Figure 15:
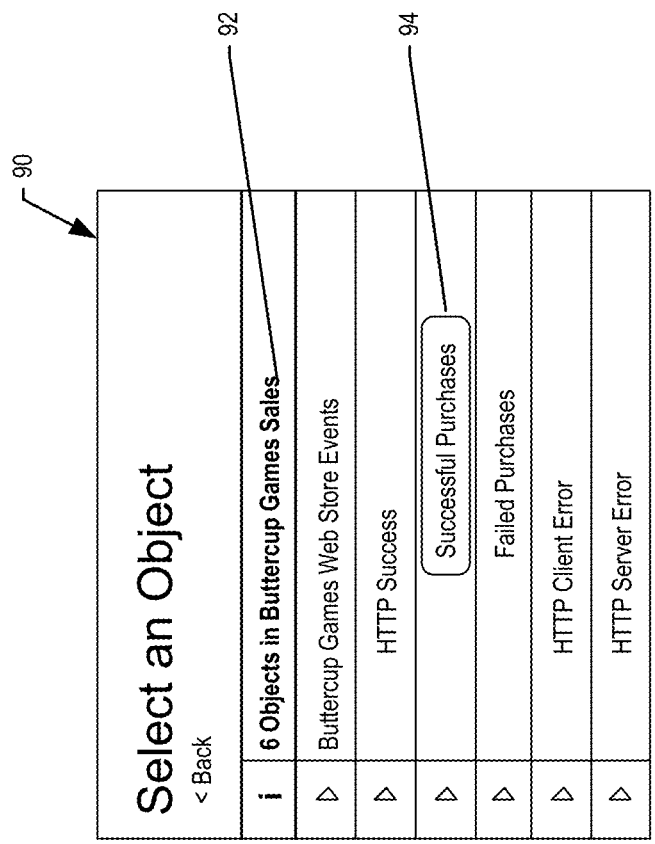
FIG. 15 illustrates a user interface screen for an example data model-driven report generation interface according to same implementations of the present disclosure.

FIG. 15 illustrates an example data model object selection graphical user interface 90 that displays available data objects 92 for the selected data object model 88. The user may select one of the displayed data model objects 94 for use in driving the report generation process.

Figure 9A:
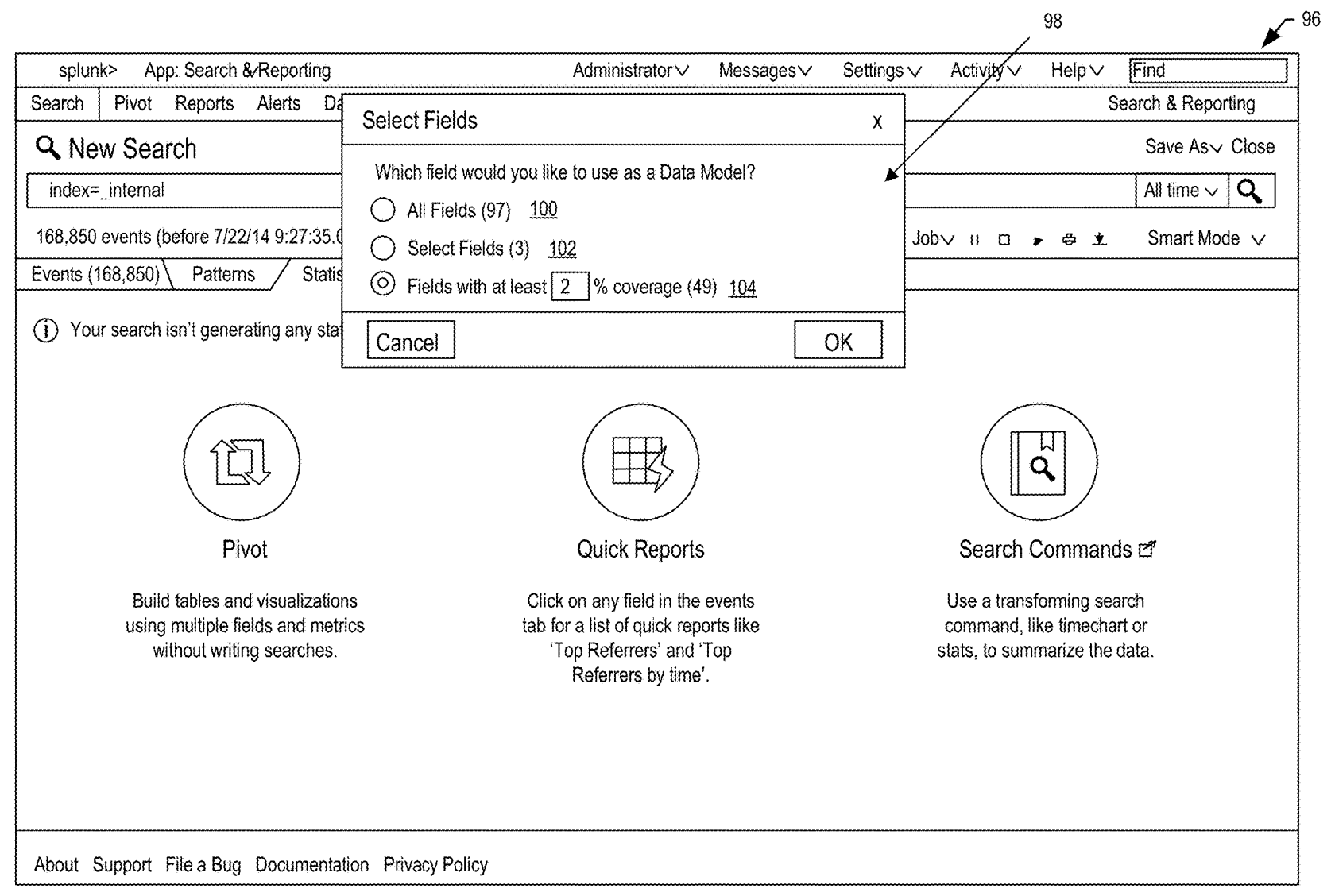

Once a data model object is selected by the user, a user interface screen 96 shown in FIG. 9A may display an interactive listing of automatic field identification options 98 based on the selected data model object. For example, a user may select one of the three illustrated options (e.g., the "All Fields" option 100, the "Selected Fields" option 102, or the "Coverage" option (e.g., fields with at least a specified % of coverage) 104). If the user selects the "All Fields" option 100, all of the fields identified from the events that were returned in response to an initial search query may be selected. That is, for example, all of the fields of the identified data model object fields may be selected. If the user selects the "Selected Fields" option 102, only the fields from the fields of the identified data model object fields that are selected by the user may be used. If the user selects the "Coverage" option 104, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to a particular selectable option may be displayed in association with the option. For example, "97" displayed next to the "All Fields" option 100 indicates that 97 fields will be selected if the "All Fields" option is selected. The "3" displayed next to the "Selected Fields" option 102 indicates that 3 of the 97 fields will be selected if the "Selected Fields" option is selected. The "49" displayed next to the "Coverage" option 104 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 9B:
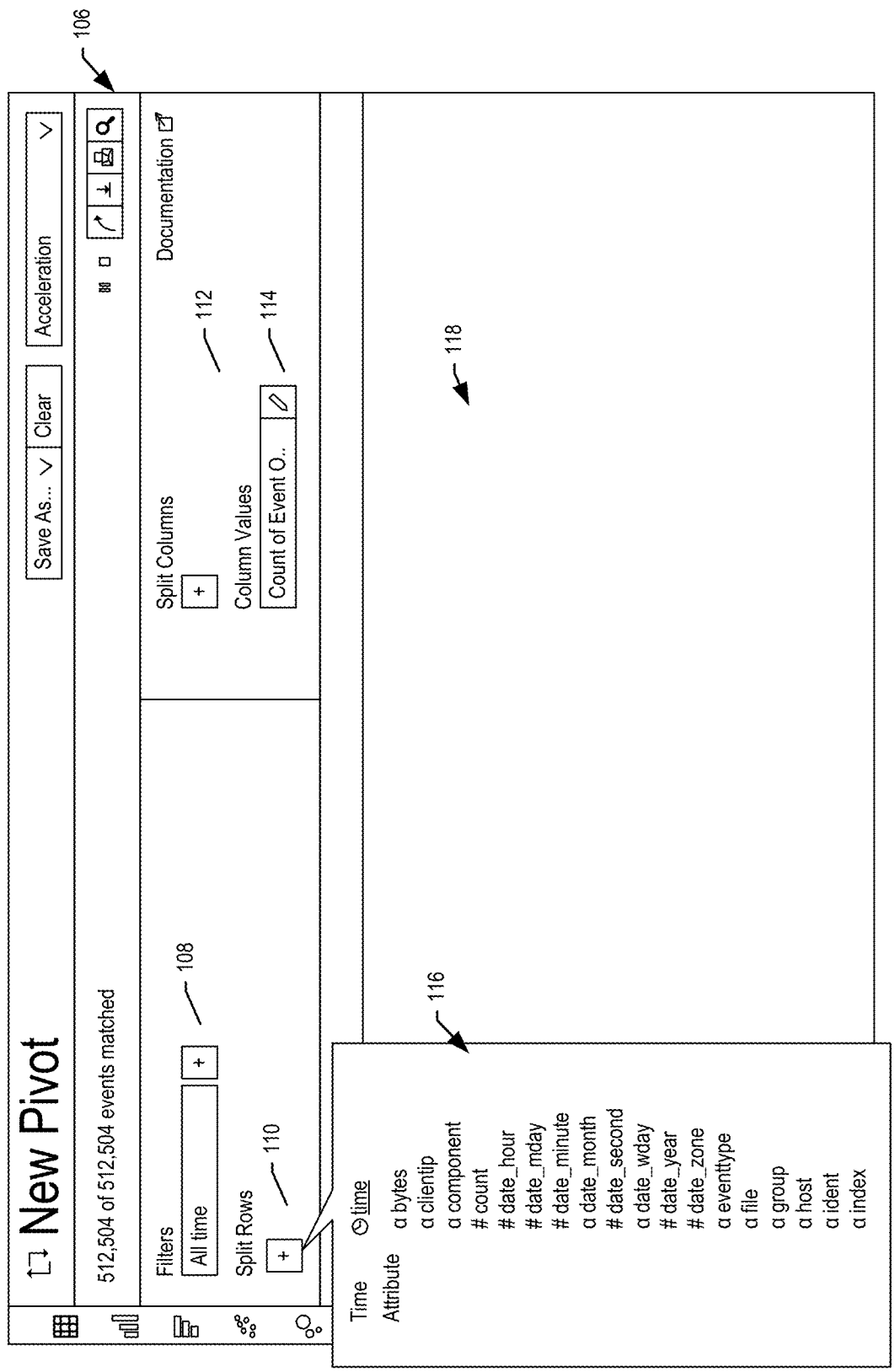
FIG. 9B illustrates a user interface screen for an example data model-driven report generation interface according to same implementations of the present disclosure.
Figure 9C:
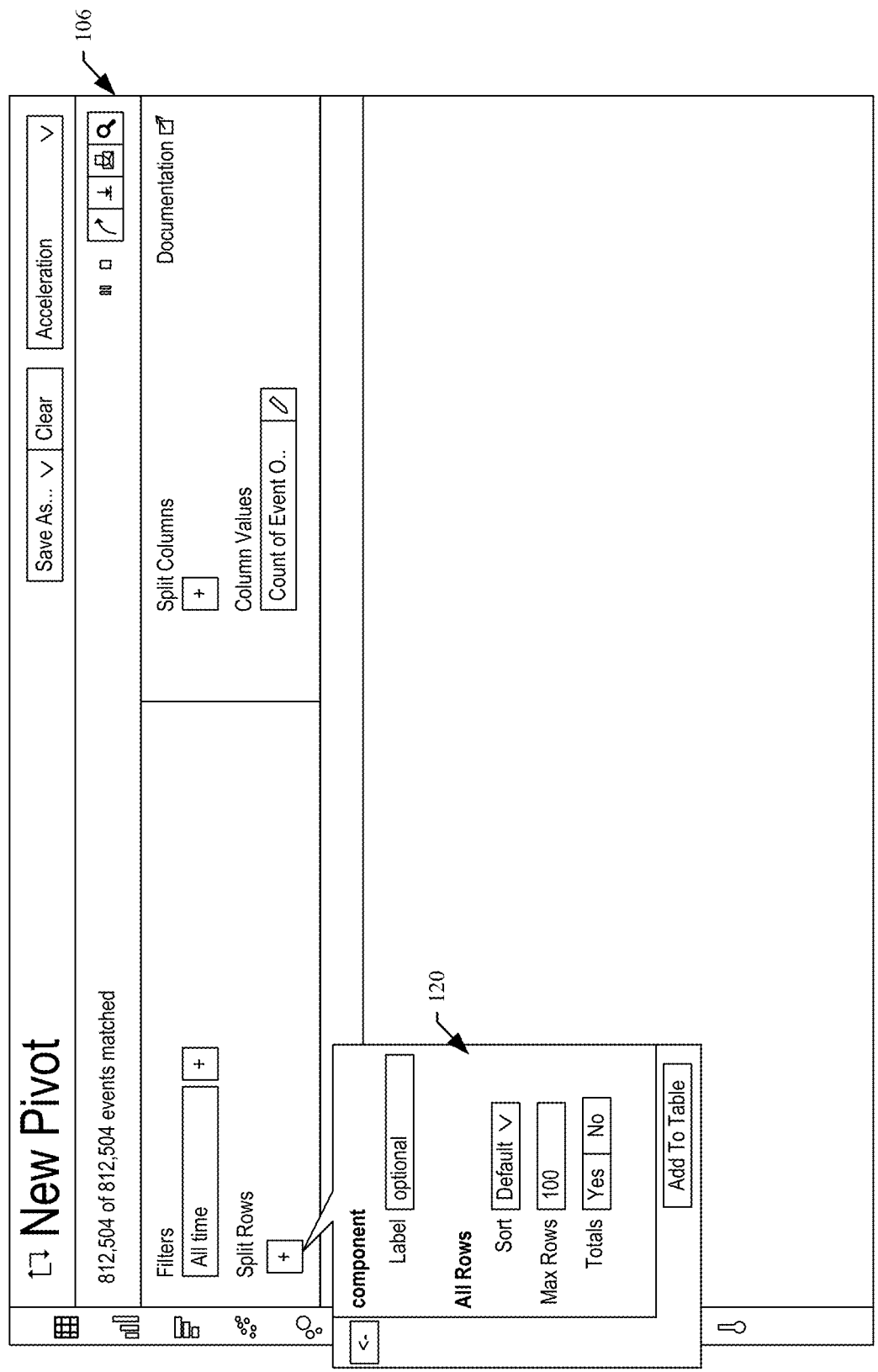
FIG. 9C illustrates a user interface screen for an example data model-driven report generation interface according to same implementations of the present disclosure.

FIG. 9B illustrates an example graphical user interface screen (also called the pivot interface) 106 displaying the reporting application's "Report Editor" page. The screen may display interactive elements for defining various elements of a report. For example, the page includes a "Filters" element 108, a "Split Rows" element 110, a "Split Columns" element 112, and a "Column Values" element 114. The page may include a list of search results 118. In this example, the Split Rows element 110 is expanded, revealing a listing of fields 116 that can be used to define additional criteria (e.g., reporting criteria). The listing of fields 116 may correspond to the selected fields (attributes). That is, the listing of fields 116 may list only the fields previously selected, either automatically and/or manually by a user. FIG. 9C illustrates a formatting dialogue 120 that may be displayed upon selecting a field from the listing of fields 116. The dialogue can be used to format the display of the results of the selection (e.g., label the column to be displayed as "component").

Figure 9D:
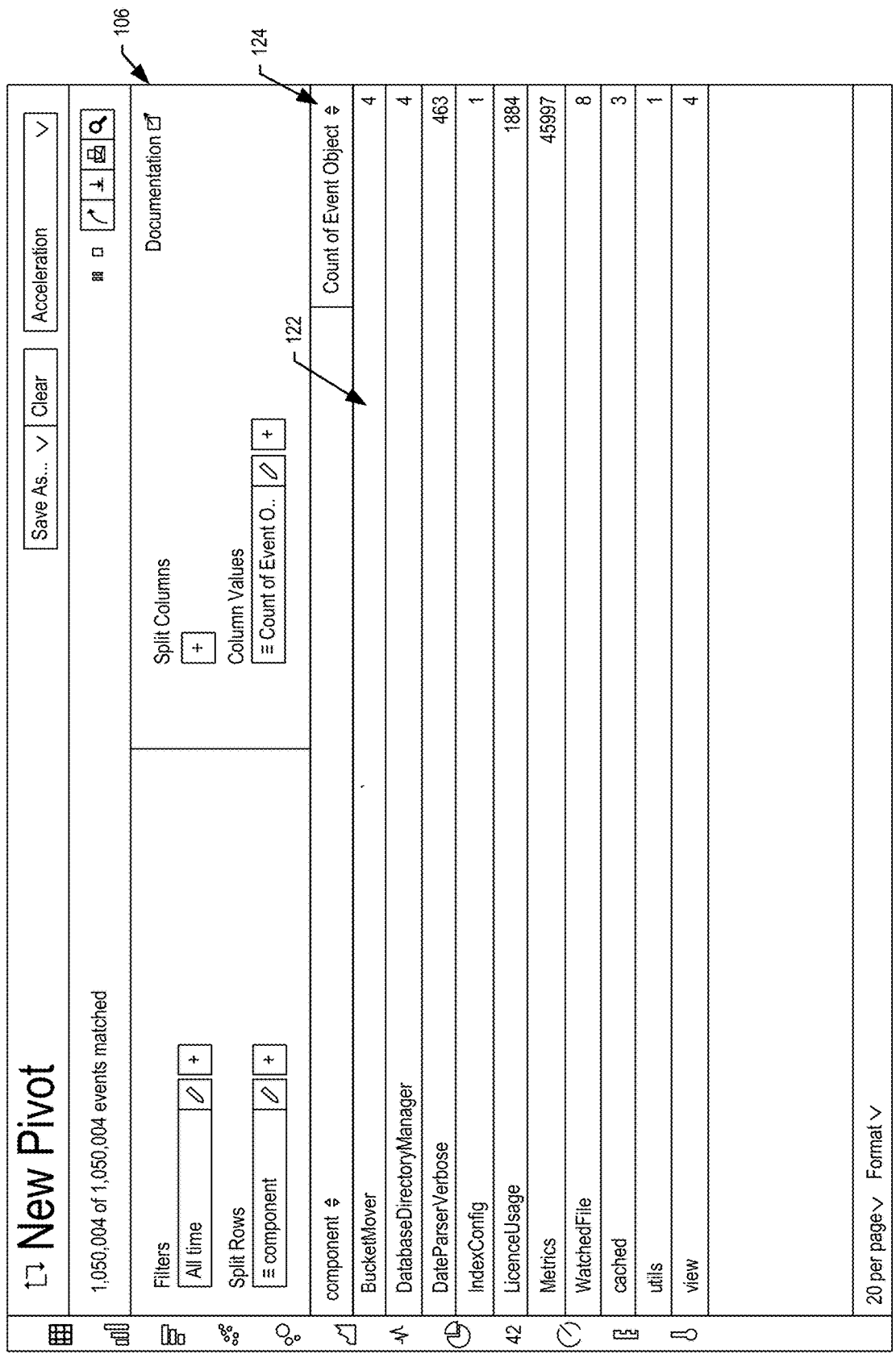
FIG. 9D illustrates a user interface screen for an example data model-driven report generation interface according to same implementations of the present disclosure.

FIG. 9D illustrates an example graphical user interface screen 106 including a table of results 122 based on the selected criteria including splitting the rows by the "component" field. A column 124 having an associated count for a particular component listed in the table may be displayed that indicates an aggregate count of the number of times that the particular field-value pair (e.g., the value in a row) occurs in the set of events responsive to the initial search query.

Figure 18:
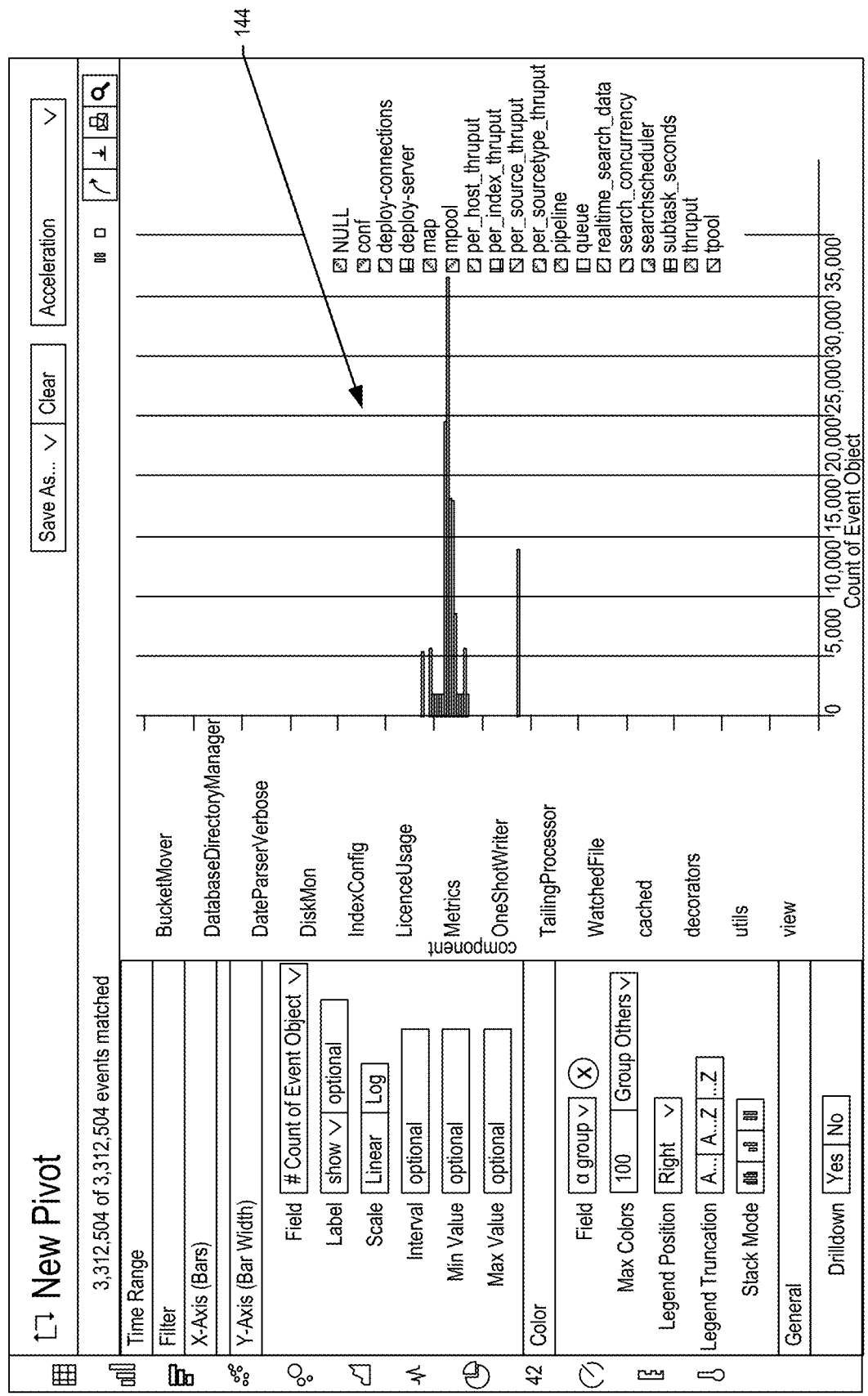
FIG. 18 illustrates example visualizations generated by a reporting application according to same implementations of the present disclosure.
Figure 19:
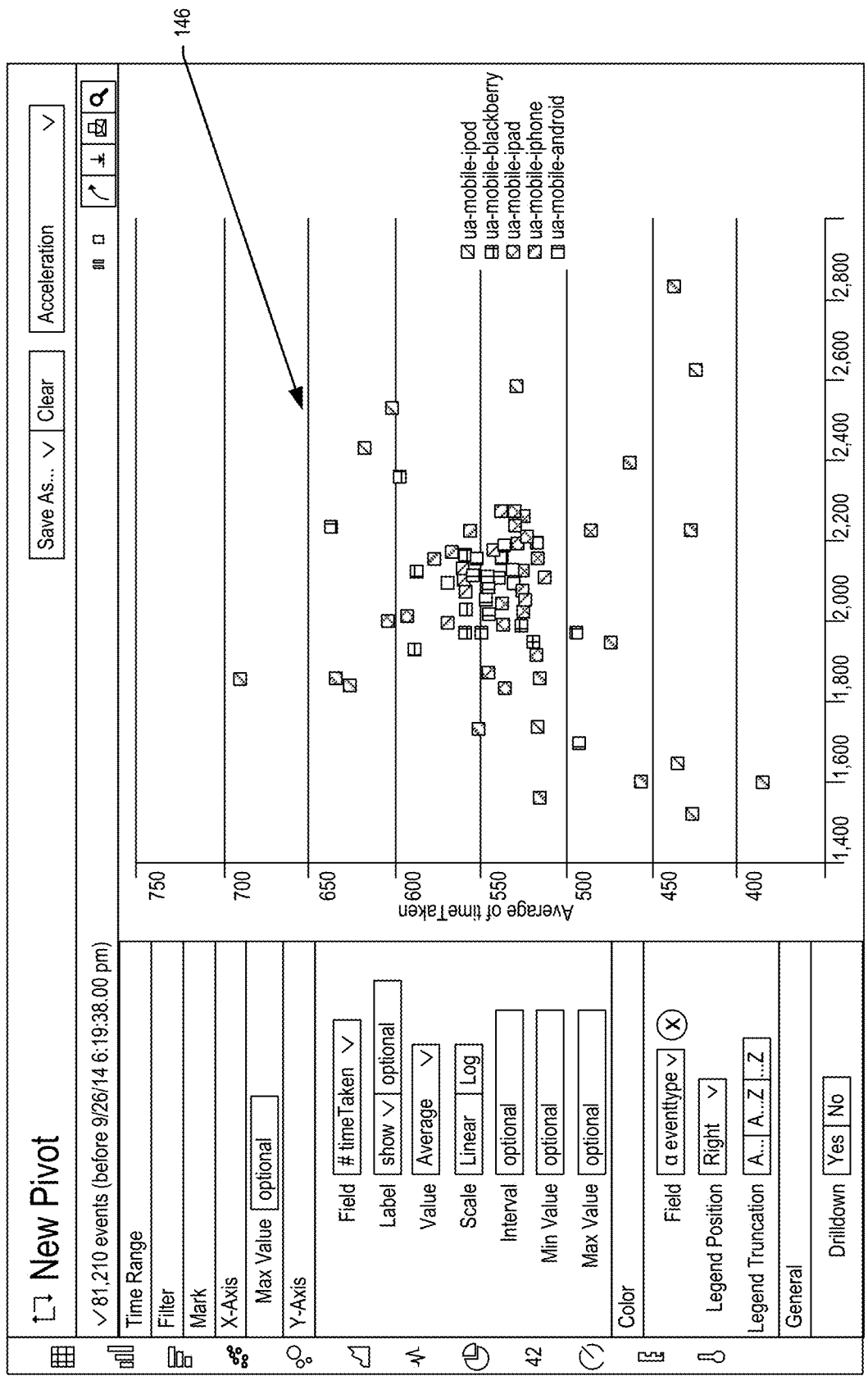
FIG. 19 illustrates example visualizations generated by a reporting application according to same implementations of the present disclosure.

FIG. 16 illustrates an example graphical user interface screen 126 that allows the user to filter search results and to perform statistical analysis on values extracted from specific fields in the set of events. In this example, the top ten product names ranked by price are selected as a filter 128 that causes the display of the ten most popular products sorted by price. Each row is displayed by product name and price 130. This results in the product displayed in a column labeled "product name" along with an associated price in a column labeled "price" 138. Statistical analysis of other fields in the events associated with the ten most popular products have been specified as column values 132. A count of the number of successful purchases for a particular product is displayed in column 134. This statistics may be produced by filtering the search results by the product name, finding occurrences of a successful purchase in a field within the events, and generating a total of the number of occurrences. A sum of the total sales is displayed in column 136, which is a result of the multiplication of the price and the number of successful purchases for a particular product The reporting application allows the user to create graphical visualizations of the statistics generated for a report. For example, FIG. 17 illustrates an example graphical user interface 140 that displays a set of components and associated statistics 142. The reporting application allows the user to select a visualization of the statistics in a graph (e.g., bar chart, scatter plot, area chart, line chart, pie chart, radial gauge, marker gauge, filler gauge, etc.). FIG. 18 illustrates an example of a bar chart visualization 144 of an aspect of the statistical data 142. FIG. 19 illustrates a scatter plot visualization 146 of an aspect of the statistical data 142.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index (e.g., lexicon); (3) using a high performance analytics store; and (4) accelerating the process of generating reports. These novel techniques are described in more detail below.

2.10.1. Aggregation Technique

Figure 10:
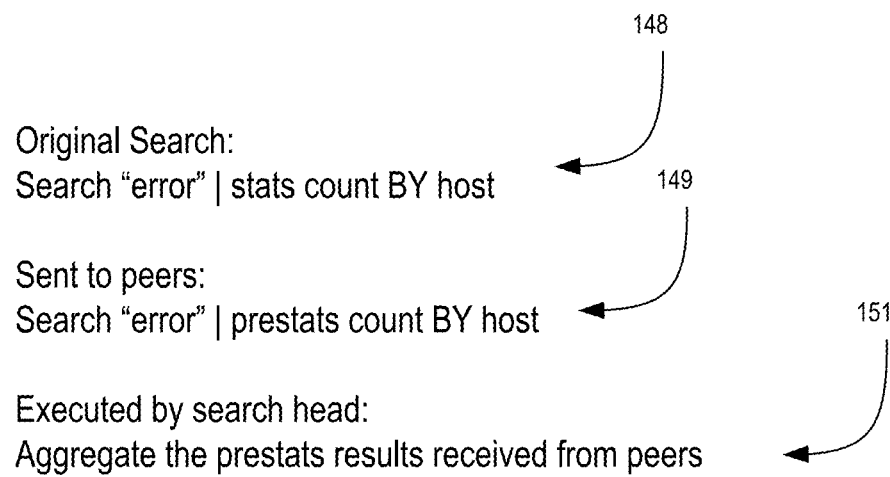
FIG. 10 illustrates an example search query received from a client and executed by search peers according to same implementations of the present disclosure.

To facilitate faster query processing, a query can be structured such that multiple indexers perform the query in parallel, while aggregation of search results from the multiple indexers is performed locally at the search head. For example, FIG. 10 illustrates how a search query 148 received from a client at a search head 50 can split into two phases, including: (1) subtasks 149 (e.g., data retrieval or simple filtering) that may be performed in parallel by indexers 46 for execution, and (2) a search results aggregation operation 151 to be executed by the search head when the results are ultimately collected from the indexers.

During operation, upon receiving search query 148, a search head 50 determines that a portion of the operations involved with the search query may be performed locally by the search head. The search head modifies search query 148 by substituting "stats" (create aggregate statistics over results sets received from the indexers at the search head) with "prestats" (create statistics by the indexer from local results set) to produce the search query, and then distributes the search query to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 6, or may alternatively distribute a modified version (e.g., a more restricted version) of the search query to the search peers. In this example, the indexers are responsible for producing the results and sending them to the search head. After the indexers return the results to the search head, the search head aggregates the received results to form a single search result set. By executing the query in this manner, the system effectively distributes the computational operations across the indexers while minimizing data transfers.

2.10.2. Keyword Index

As described above with reference to the flow charts in FIG. 5 and FIG. 6, data intake and query system 32 can construct and maintain one or more keyword indices (e.g., lexicons) to quickly identify events containing specific keywords. This technique can greatly speed up the processing of queries involving specific keywords. As mentioned above, to build a keyword index, an indexer first identifies a set of keywords. Then, the indexer includes the identified keywords in an index (e.g., a time-series index), which associates a stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some implementations of the system 32 create a high performance analytics store, which can be referred to as a "summarization table," that contains entries for specific field-value pairs. A summarization table may be populated in response to a search query applied to events. The system can then use the summarization table to accelerate subsequent queries related to the events subject to the original search query. As such, the system can accelerate the subsequent queries by using the data contained in the summarization table to return search results, while avoiding the additional processing to obtain the original search results. For example, the system 32 may receive a search query for events that have specified keywords. A summarization table produced in response to the search query can be used for perform subsequent statistical queries related to the events including the specified keywords.

The summarization tables can be populated at search time. The basis for the summarization tables are time-series index (tsidx) files that are populated at index time. The tsidx files are populated at index time to facilitate searching of events, as detailed above. Hence, the summarization tables built from the tsidx files can speed up certain types of queries. A tsidx file is a self-contained file populated with data extracted at index time from events. The tsidx file can associate field values (e.g., keywords) of events with location references to the events, which are stored in a companion journal file. For example, at index time, events can be processed to extract time values, metadata field values, user specified field values, other field values, etc. The system populates a tsidx file with the extracted time values and field values, and stores the actual events in a journal. The tsidx file is used to process a received search query having search criteria including the indexed events. The tsidx file then facilitates rapidly searching the events stored in the journal.

The structure and contents of a tsidx file facilitate searching data of events stored in a companion journal. In some examples, the structure of the tsidx file includes distinct sections. A section of the tsidx file includes an array of time values (e.g., timestamps) extracted from events. Another section includes event identifiers and information identifying the locations of respective events in the journal. Another section can include a lexicon (e.g., keyword index) of the field values extracted from the events. The lexicon may include field values identified at index time. The lexicon may also include user defined customized field values and/or combinations of field values identified at index time. The lexicon may also contain meta-field values such as a source, source type, or host values of the events. Another section of the tsidx file can include postings that map the field values in the lexicon to event identifiers.

The data entries of the sections can be structured to map data entries in one section to data entries in another section. In some examples, data entries contained in one section can be ordered in the same way as related data entries in another section. For example, the lexicon may include N entries in N rows. The posting map can also include N entries in N rows such that the kth entry in the lexicon matches the kth entry of the posting. In some examples, the data entries in sections can include explicit pointers to data entries in other sections of the tsidx file. For example, the lexicon can include N field value entries in N rows, and the postings map can include N event identifier entries in N rows. The event identifier can map to the event identifiers section including associated locations information to retrieve data from events stored in the journal. Thus, the structure of the tsidx file and the structure of its sections create paths that facilities searching events during search time.

During search time, a query may include criteria that specify field values (e.g., meta-field values) contained in the lexicon of the tsidx file. The lexicon is searched to identify the specified field values. The locations of the particular entries in the lexicon that contain the specified field values can be used to identify corresponding entries in the postings map, which can include references to event identifiers in the corresponding section of the tsidx file. Then, configuration files for the identified events can be retrieved and used to extract data from the events. For example, the configuration files may define extraction rules that are event source or source type specific, and those extraction rules can be used to extract data from the events.

For example, the search criteria of a search query may include IP addresses of events that include the value "94107" for a "ZIP code" field. The system can search the lexicon of the tsidx for the specified field value. The third entry of the lexicon may include a specified field value, and the corresponding third entry of the posting list may identify two events. The event identifiers in the third entry of the postings are used to identify the location information of the events including the value "94107" for the "ZIP code" field. The configuration files of identified events are retrieved, and their extraction rules are used to extract the IP addresses from the identified events. As such, the IP addresses or events that satisfy the search query can be retrieved using the tsidx file.

Thus, when the system 32 receives a search query, the system 32 will run scans on the tsidx files for the search criteria, and uses location references to retrieve events that satisfy the search criteria from the journal file. In some examples, a "bucket" or events includes its own tsidx file and companion journal. As such, processing a search query may include scanning the tsidx files of multiple buckets to obtain partial search results that are aggregated to obtain the search results that satisfy the search query. In some examples, to speed up searches, bloom filters can be used to narrow the set of tsidx files that the system 32 searches to obtain search results.

In some examples, the process for searching events detailed above is repeated for multiple search queries. Hence, even though the use of tsidx files enhances searching as all the events may not be searched, using the tsidx files for searching over events for certain queries can be inefficient. For example, a first query may specify keywords, and tsidx files can be used to retrieve events that contain those keywords. A second query may specify a statistical analysis to be performed of events that contain the keywords of the first query. As such, performing the second query would include at least the same steps performed for the first search query, and additional steps to complete the statistical analysis. Accordingly, performing the second subsequent query is inefficient because it fails to take advantage of the execution of the first query.

To speed up certain types of queries, some implementations of the system 32 create the summarization tables, which contain entries for specific field values. This optimization mechanism can be initiated automatically or manually by a user to create summarization tables on a per search, per bucket basis. For example, a user can set a data model to automatically generate and use summarization tables to perform the specialized searches. In another example, a user can submit a command through a user interface to accelerate query processing by using summarization tables. Then, upon receiving search queries, the system can generate and scan summarization tables to accelerate searches. For example, a user can add SPL commands to a search field causing a search to operate on the summarization table, and the results can be quickly obtained as configuration files, extraction rules, etc. may not be consulted.

At search time, summarization tables are generated based on the tsidx files. In particular, a summarization table is populated based on events retrieved during search time, in response to a search query. In some examples, the size of the summarization table may be derived based on the configuration files for events retrieved as search time. For example, the source type definition may have one or more configuration files that define the extraction rules that can be used to extract field values from events of that source type. In another example, the configuration files can define the extraction rules for a source or another meta field.

The configuration files for events retrieved at search time can be used to populate a summarization table by applying the extraction rules of the retrieved events to the retrieved events. For example, the system 32 would identify configuration files for the source types matching the retrieved events. The system can apply some or all the extraction rules to extract some or all the field values that are extractable based on the extraction rules defined by the configuration files. The summarization table can then be populated with the event data from the tsidx file retrieved during search time and other field values of those events identified from their configuration files.

In some examples, the resulting summarization table can have a columnar structure where data is stored in columns instead of rows. Specifically, each column may correspond to a field type of the events retrieved at search time. In some examples, where events identified at search time have different configuration files, the summarization table may include cells that are empty. Specifically, the retrieved events may be associated with different source types that have different configuration files defining different extraction rules. As a result, some cells of the summarization table are empty because the extraction rules used to extract data from some events may not be relevant to all events.

Thus, a summarization table includes the search results obtained by scanning a tsidx file and is enriched by the field values determined in accordance with the extraction rules of the configuration files for retrieved events. More specifically, the summarization table may contain multiple entries including specific values from specific fields of the event data. The extracted field values satisfy the search criteria of the query received by the system, and may also include other field values that do not satisfy the specific criteria but which were extracted from events including the field values that do satisfy the criteria. The summarization table may also include other data related to the query processed by the system. Thus, the field values of the summarization table form a lexicon of where at least some columns of the summarization table map to the row of the tsidx file. As such, the tsidx file from which the summarization table was derived can itself be derived from the summarization data.

In some examples, the summarization table may not include information indicative of the locations of events in the journal if the field values of those events are included in the summarization table. As a result, scanning the summarization table to obtain results may eliminate accessing events stored in the journal. As such, searches performed on data contained in the summarization table are accelerated because the configuration files for events may not be consulted and the events themselves may not be retrieved form the journal.

For example, a search query may have search criteria including IP addresses of events having value of "94107" for a "ZIP code" field of events. The system could automatically populate a summarization table with multiple entries including entries based on the events that include the specified field values. The summarization table is also enriched with other field values that could be extracted from the events based on their configuration files. Thus, the summarization table includes the search results and other field values that are not part of the search results. Moreover, the summarization table can be used to reconstruct the tsidx file itself from which the search results were obtained.

The disclosed implementations enable the system 32 to quickly process subsequent queries that can use the data contained in the summarization table rather than searching the events data over again via the tsidx file. Examples of the subsequent queries may involve statistical analysis of field values that are included in the summarization table. Thus, rather than performing another search and extraction process on the events, the system can use the summarization table to perform the additional statistical analysis.

The system 32 can use the summarization table to return results for a query rather than needing to perform extraction operations on events to both extract field values and perform a statistical analysis of the field values. For example, a user may seek to perform a statistical analysis of events that include particular values in particular fields. To this end, the system can evaluate entries in the summarization table to perform a statistical analysis on specific values in the specific fields without having to go through the individual events or perform data extractions at search time.

For example, the system may receive a query specifying criteria including a count of events that have the value "94107" in the "ZIP code" field. Without the summarization table, the system may search and extract the raw data of the events that satisfy the search criteria and perform a count of specified field values pairs as search results. However, the system 32 can instead evaluate entries in the summarization table to count instances of "94107" in the "ZIP code" field without having to go through the individual events or perform data extractions at search time. Thus, the disclosed implementations can speed up obtaining results for these types of queries.

In some examples, the system 32 can maintain a separate summarization table for each of the above-described time-specific buckets that stores events for a specific time range. A bucket-specific summarization table includes entries for specific field value combinations that occur in events in the specific bucket. In some examples, the system 32 can maintain a separate summarization table for each indexer. The indexer-specific summarization table includes entries for the events in a data store that are managed by the specific indexer. Indexer-specific summarization tables may also be bucket-specific. However, the disclosed implementations are not so limited. Instead, summarization tables can be defined based on any range or parameter used to limit a search operation.

In some examples, a summarization table can include references to events from which its field values were extracted. If the system needs to process events that have a specific field-value combination, the system can use the references in the summarization table entry to directly access the events from the journal. For example, when the summarization tables may not cover the events that are relevant to a subsequent query, the system can use the summarization tables to obtain partial results for the events that are covered by summarization tables, but may also have to search through other events that are not covered by the summarization tables to produce additional results. These additional results can then be combined with the partial results to produce a final set of results for the query.

2.10.4. Accelerating Report Generation

In some examples, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During a scheduled report update, the query engine determines whether intermediate summaries have been generated covering portions of the time period covered by the report update. If so, then the report is generated based on the information contained in the summaries. Also, if additional event data has been received and has not yet been summarized, and should be included in the complete report, the query can be run on this additional event data. Then, the results returned by this query on the additional event data, along with the partial results obtained from the intermediate summaries, can be combined to generate the updated report. This process is repeated when the report is updated or based at least in part on the report being updated. Alternatively, if the system stores events in buckets covering specific time ranges, then the summaries can be generated on a bucket-by-bucket basis. Note that producing intermediate summaries can save the work involved in re-running the query for previous time periods, so, advantageously, only the newer event data needs to be processed while generating an updated report.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management ("SIEM") systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may use original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. Security-related information can also include malware infection data and system configuration information, as well as access control information, such as login/logout information and access failure notifications. The security-related information can originate from various sources within a data center, such as hosts, virtual machines, storage devices, and sensors. The security-related information can also originate from various sources in a network, such as routers, switches, email servers, proxy servers, gateways, firewalls, and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and upon determining that one or more events satisfy the criteria, the application can indicate that the one or more events are notable. A user can alternatively select a pre-defined correlation search provided by the application. Note that correlation searches can be run continuously or at regular intervals (e.g., hourly, daily, weekly, etc.) to search for notable events. Upon detection, notable events can be stored in a dedicated "notable events index," which can be subsequently accessed to generate various visualizations containing security-related information. Also, alerts can be generated to notify system operators when important notable events are discovered.

Figure 11A:
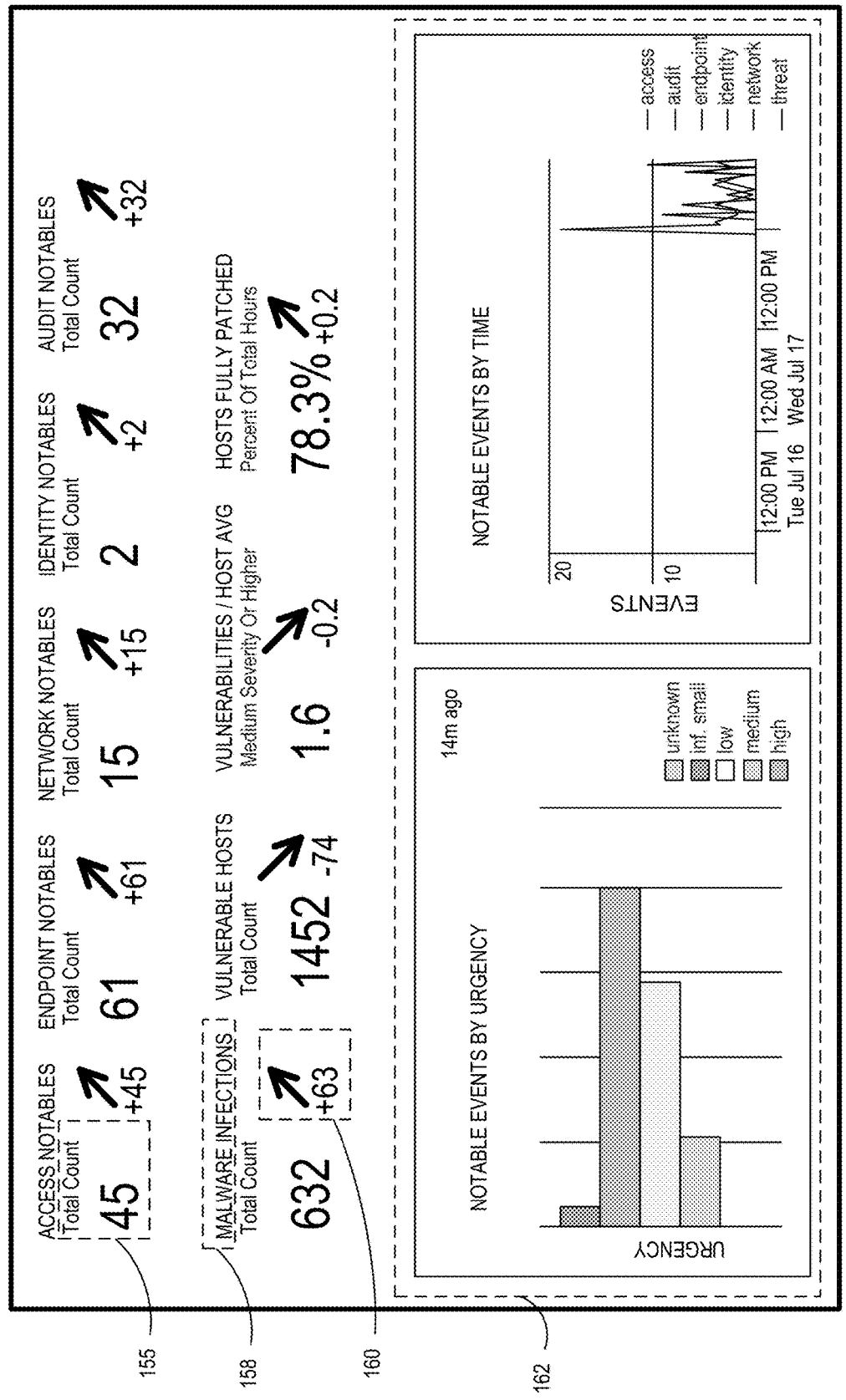
FIG. 11A illustrates a key indicators view according to same implementations of the present disclosure.

The SPLUNK® APP FOR ENTERPRISE SECURITY provides various visualizations to aid in discovering security threats, such as a "key indicators view" that enables a user to view security metrics, such as counts of different types of notable events. For example, FIG. 11A illustrates an example key indicators view 153 that comprises a dashboard, which can display a value 155, for various security-related metrics, such as malware infections 158. It can also display a change in a metric value 160, which indicates that the number of malware infections increased by 63 during the preceding interval. Key indicators view 153 additionally displays a histogram panel 162 that displays a histogram of notable events organized by urgency values, and a histogram of notable events organized by time intervals.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 11B illustrates an example incident review dashboard 164 that includes a set of incident attribute fields 166 that, for example, enables a user to specify a time range field 168 for the displayed events. It also includes a timeline 170 that graphically illustrates the number of incidents that occurred in time intervals over the selected time range. It additionally displays an events list 172 that enables a user to view a list of all of the notable events that match the criteria in the incident attributes fields 166. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developers' task to create various applications. One such application is SPLUNK® APP FOR VMWARE® that provides operational visibility into granular performance metrics, logs, tasks and events, and topology from hosts, virtual machines, and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and is discarded during pre-processing.

In contrast, the SPLUNK® APP FOR VMWARE® stores large volumes of minimally processed machine data (i.e., including raw data), such as performance information and log data, at ingestion time for later retrieval and analysis at search time when a live performance issue is being investigated. In addition to data obtained from various log files, this performance-related information can include values for performance metrics obtained through an application programming interface ("API") provided as part of the vSphere Hypervisor™ system distributed by VMware, Inc. of Palo Alto, Calif.

Examples of performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics.

To facilitate retrieving information of interest from performance data and log files, the SPLUNK® APP FOR VMWARE® provides pre-specified schemas for extracting relevant values from different types of performance-related event data, and also enables a user to define such schemas.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems).

Figure 11C:
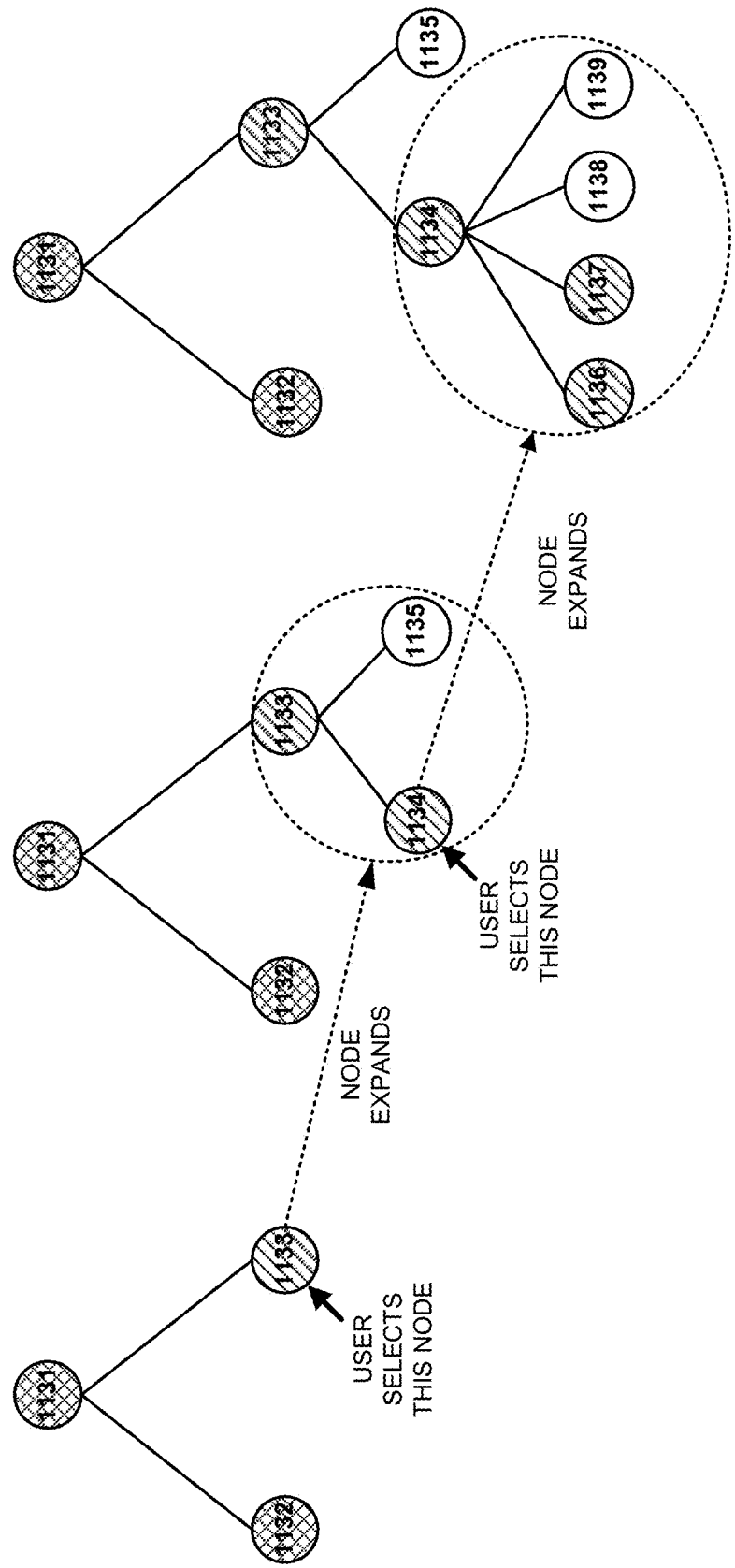
FIG. 11C illustrates a proactive monitoring tree according to same implementations of the present disclosure.

Example node-expansion operations are illustrated in FIG. 11C, wherein nodes 1133 and 1134 are selectively expanded. Note that nodes 1131-1139 can be displayed using different patterns or colors to represent different performance states, such as a critical state, a warning state, a normal state, or an unknown/offline state. The ease of navigation provided by selective expansion in combination with the associated performance-state information enables a user to quickly diagnose the root cause of a performance problem.

Figure 11D:
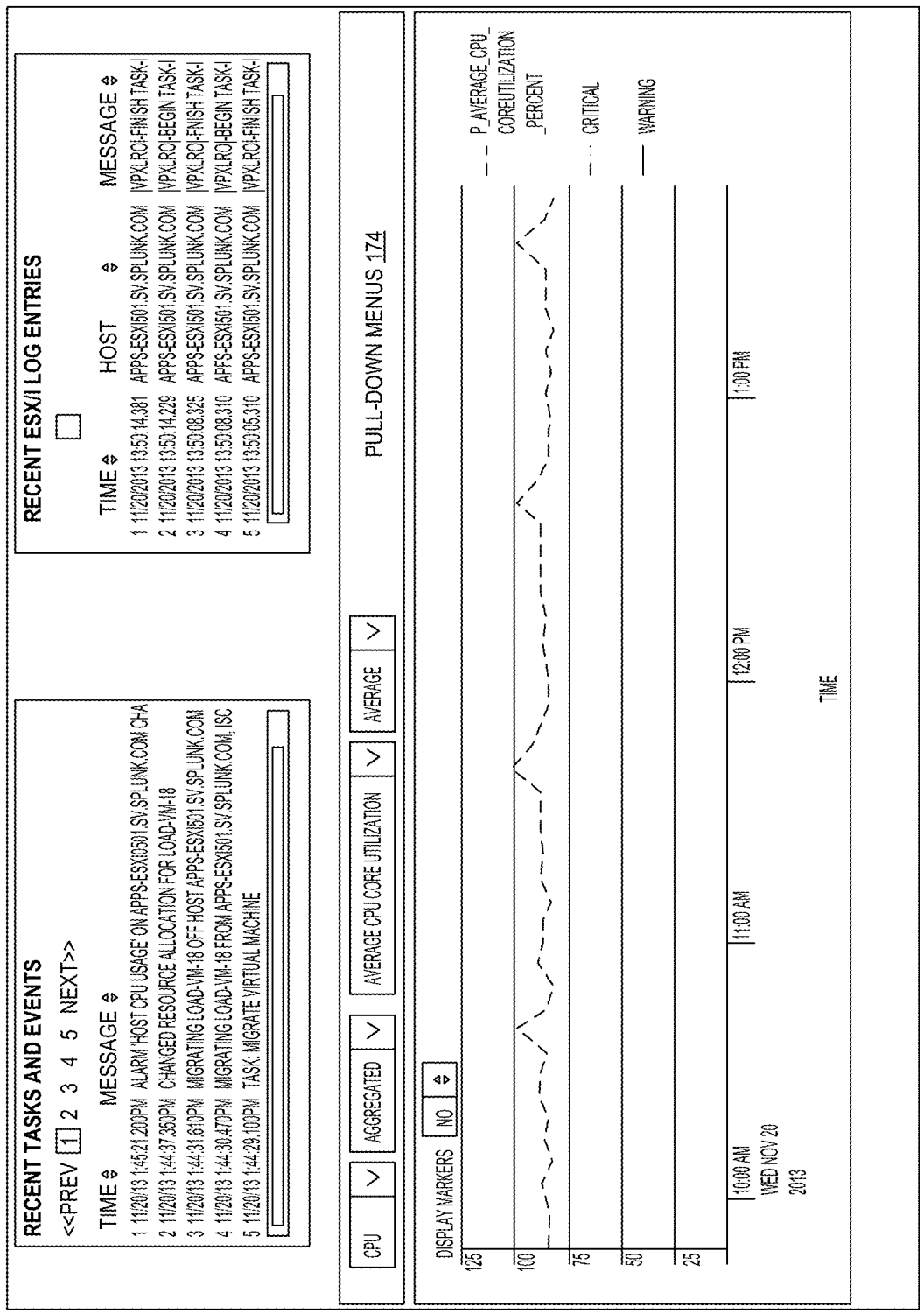
FIG. 11D illustrates a user interface screen displaying both log data and performance data according to same implementations of the present disclosure.

The SPLUNK® APP FOR VMWARE® also provides a user interface that enables a user to select a specific time range and then view heterogeneous data comprising events, log data, and associated performance metrics for the selected time range. For example, the screen illustrated in FIG. 11D displays a listing of recent "tasks and events" and a listing of recent "log entries" for a selected time range above a performance-metric graph for "average CPU core utilization" for the selected time range. Note that a user is able to operate pull-down menus 174 to selectively display different performance metric graphs for the selected time range. This enables the user to correlate trends in the performance-metric graph with corresponding event and log data to quickly determine the root cause of a performance problem.

2.13. Cloud-Based System Overview

The example data intake and query system 32 described in reference to FIG. 3 comprises several system components, including one or more forwarders, indexers, and search heads. In some environments, a user of a data intake and query system 32 may install and configure, on computing devices owned and operated by the user, one or more software applications that implement some or all of these system components. For example, a user may install a software application on server computers owned by the user and configure one or more servers to operate as one or more of a forwarder, an indexer, a search head, etc. This arrangement may generally be referred to as an "on-premises" solution. That is, the system 32 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 32 operate.

In one implementation, to provide an alternative to an on-premises environment for system 32, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 12:
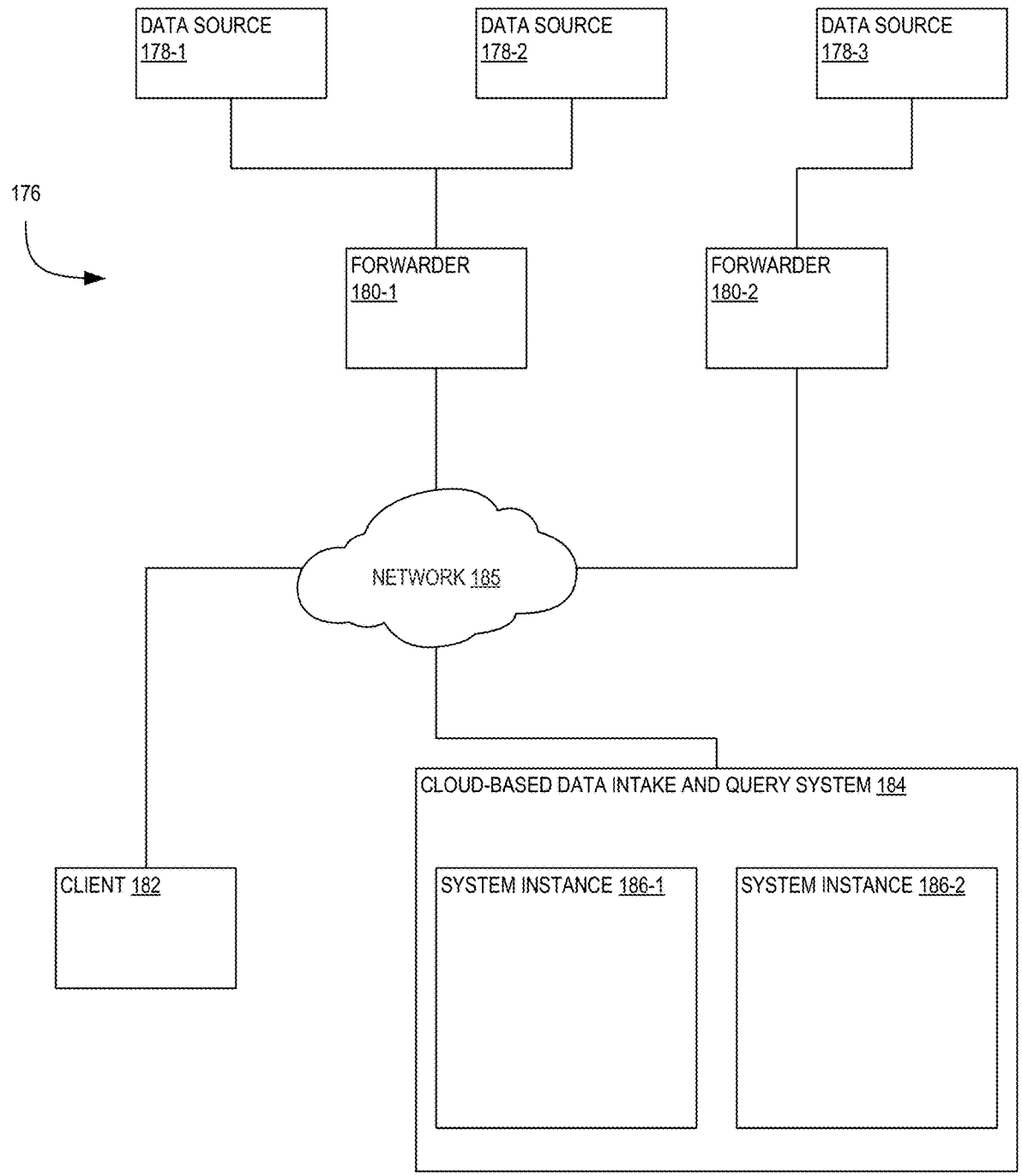
FIG. 12 illustrates a block diagram of an example cloud-based data intake and query system in which an implementation may be implemented.

FIG. 12 illustrates a block diagram of an example cloud-based data intake and query system. Similar to the system of FIG. 4, the networked computer system 176 includes input data sources 178 and forwarders 180. These input data sources 178 and forwarders 180 may be in a subscriber's private computing environment. Alternatively, they might be directly managed by the service provider as part of the cloud service. In the example system 176, one or more forwarders 180 and client devices 182 are coupled to a cloud-based data intake and query system 184 via one or more networks 185. Network 185 broadly represents one or more LANs, WANs, cellular networks, intranetworks, internetworks, etc., using any of wired, wireless, terrestrial microwave, satellite links, etc., and may include the public Internet, and is used by client devices 182 and forwarders 180 to access the system 184. Similar to the system of 32, one or more of the forwarders 180 may be configured to receive data from an input source and to forward the data to other components of the system 184 for further processing.

In an implementation, a cloud-based data intake and query system 184 may comprise a plurality of system instances 186. In general, the system instances 186-1 and 186-2 may include one or more computing resources managed by a provider of the cloud-based system 184 made available to a particular subscriber. The computing resources comprising a system instance 186 may, for example, include one or more servers or other devices configured to implement one or more forwarders, indexers, search heads, and other components of a data intake and query system, similar to system 32. As indicated above, a subscriber may use a web browser or other application of a client device 182 to access a web portal or other interface that enables the subscriber to configure an instance 186.

Providing a data intake and query system as described in reference to system 32 as a cloud-based service presents a number of challenges. Each of the components of a system 32 (e.g., forwarders, indexers and search heads) may at times refer to various configuration files stored locally at a particular component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising a system instance 186) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK® CLOUD are centrally visible).

2.14. Searching Externally Archived Data

Figure 13:
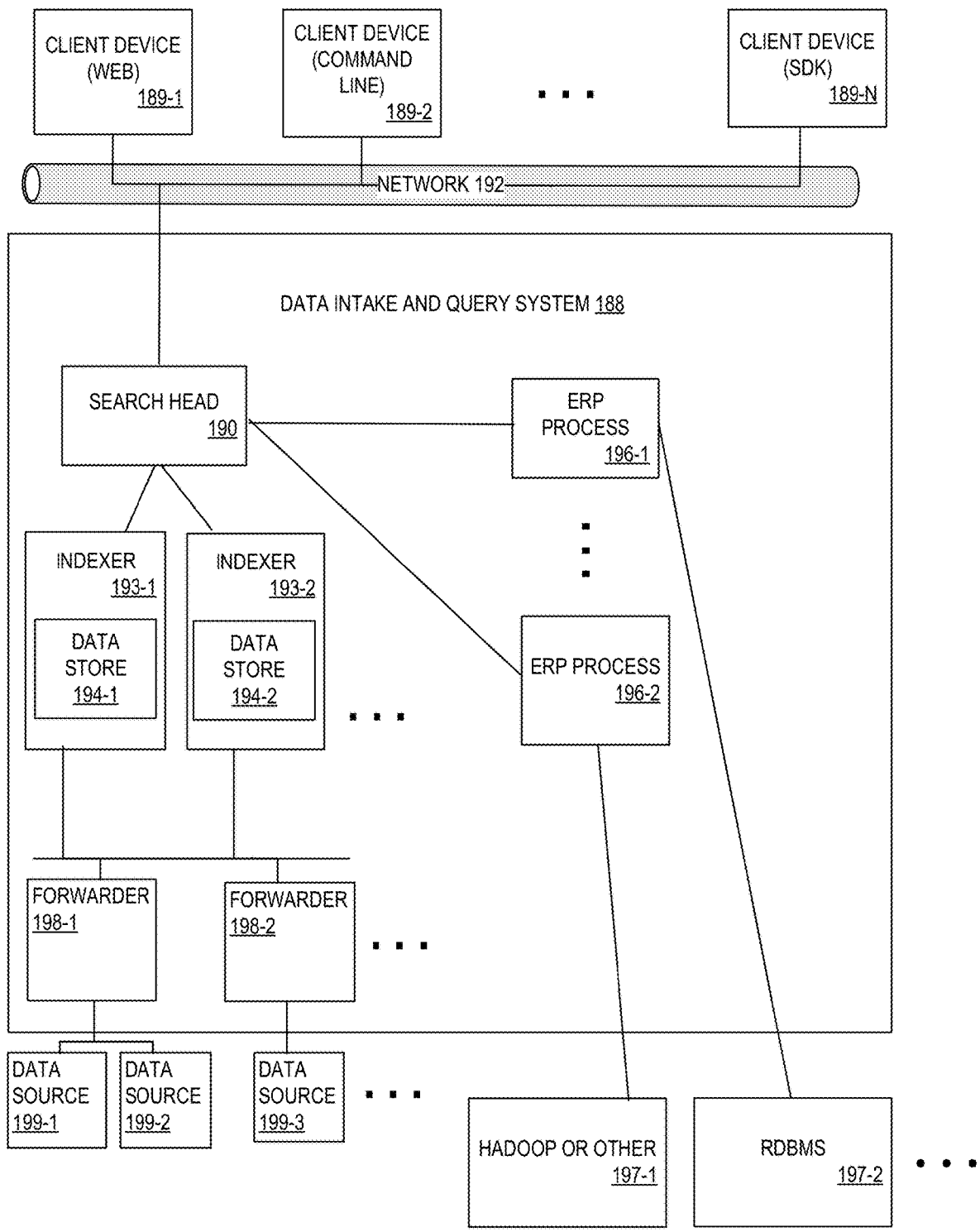
FIG. 13 illustrates a block diagram of an example data intake and query system that performs searches across external data systems according to same implementations of the present disclosure.

FIG. 13 shows a block diagram of an example of a data intake and query system 188 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 190 of the data intake and query system receives search requests from one or more client devices 189 over network connections 192. As discussed above, the data intake and query system 188 may reside in an enterprise location, in the cloud, etc. FIG. 13 illustrates that multiple client devices 189-1, 189-2, . . . , 189-N may communicate with the data intake and query system 32. The client devices 189 may communicate with the data intake and query system using a variety of connections. For example, one client device in FIG. 13 is illustrated as communicating over an Internet (Web) protocol, another client device is illustrated as communicating via a command line interface, and another client device is illustrated as communicating via a system developer kit (SDK).

The search head 190 analyzes the received search request to identify request parameters. If a search request received from one of the client devices 189 references an index maintained by the data intake and query system, then the search head 190 connects to one or more indexers 193 of the data intake and query system for the index referenced in the request parameters. That is, if the request parameters of the search request reference an index, then the search head accesses the data in the index via the indexer. The data intake and query system 188 may include one or more indexers 193, depending on system access resources and requirements. As described further below, the indexers 193 retrieve data from their respective local data stores 194 as specified in the search request. The indexers and their respective data stores can comprise one or more storage devices and typically reside on the same system, though they may be connected via a local network connection. The data is forwarded to the indexers by forwarders 198, which obtained the data from data sources 199.

If the request parameters of the received search request reference an external data collection, which is not accessible to the indexers 193 or under the management of the data intake and query system, then the search head 190 can access the external data collection through an External Result Provider ("ERP") process 196. An external data collection may be referred to as a "virtual index" (plural, "virtual indices"). An ERP process provides an interface through which the search head 190 may access virtual indices.

Thus, a search reference to an index of the system relates to a locally stored and managed data collection. In contrast, a search reference to a virtual index relates to an externally stored and managed data collection, which the search head may access through one or more ERP processes 196-1 and 196-2. FIG. 13 shows two ERP processes 196-1 and 196-2 that connect to respective remote (external) virtual indices, which are indicated as a Hadoop or another system 197-1 (e.g., Amazon S3, Amazon EMR, other Hadoop Compatible File Systems ("HCFS"), etc.) and a relational database management system ("RDBMS") 197-2. Other virtual indices may include other file organizations and protocols, such as Structured Query Language ("SQL") and the like. The ellipses between the ERP processes 196-1 and 196-2 indicate optional additional ERP processes of the data intake and query system 188. An ERP process may be a computer process that is initiated or spawned by the search head 190 and is executed by the search data intake and query system 188. Alternatively or additionally, an ERP process may be a process spawned by the search head 190 on the same or different host system as the search head 190 resides.

The search head 190 may spawn a single ERP process in response to multiple virtual indices referenced in a search request, or the search head may spawn different ERP processes for different virtual indices. Generally, virtual indices that share common data configurations or protocols may share ERP processes. For example, search query references to a Hadoop file system may be processed by the same ERP process, if the ERP process is suitably configured. Likewise, search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 190 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 196-1 and 196-2 receive a search request from the search head 190. The search head may optimize the received search request for execution at the respective external virtual index. Alternatively, the ERP process may receive a search request as a result of analysis performed by the search head or by a different system process. The ERP processes 196-1 and 196-2 can communicate with the search head 190 via conventional input/output routines (e.g., standard in/standard out, etc.). In this way, the ERP process receives the search request from a client device such that the search request may be efficiently executed at the corresponding external virtual index.

The ERP processes 196-1 and 196-2 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 196-1 and 196-2 generate appropriate search requests in the protocol and syntax of the respective virtual indices 197-1 and 197-2, which may correspond to the search request received by the search head 190. Upon receiving search results from their corresponding virtual indices, the respective ERP process passes the result to the search head 190, which may return or display the results or a processed set of results based on the returned results to the respective client device.

Client devices 189 may communicate with the data intake and query system 188 through a network interface 192, e.g., one or more LANs, WANs, cellular networks, intranetworks, and/or internetworks using any of wired, wireless, terrestrial microwave, satellite links, etc., and may include the public Internet.

2.14.1. Erp Process Features

The ERP processes described above may include two operation modes: a streaming mode and a reporting mode. The ERP processes can operate in streaming mode, in reporting mode, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real-time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing the raw data. In addition, the ERP may optionally direct another processor to do the processing.

The streaming mode of operation may not be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One example query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (e.g., to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics to respond to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it performs more processing before returning any results) and usually has relatively high bandwidth (more results can be processed per unit of time). For example, when the ERP process does begin returning report results, it returns more processed results than in the streaming mode, because, e.g., statistics are calculated to be responsive to the search request. That is, the ERP process doesn't have to take time to first return raw data to the search head. As noted, the ERP process could be configured to operate in streaming mode alone and return the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode may not process at least a portion of the raw data that is responsive to the search query request before the ERP process starts returning results; rather, the reporting mode usually performs processing of chunks of events and returns the processing results to the search head for the chunks.

For example, an ERP process can be configured to merely return the contents of a search result file verbatim, with little or no processing of results. That way, the search head performs processing (such as parsing byte streams into events, filtering, etc.). The ERP process can be configured to perform additional intelligence, such as analyzing the search request and handling the computation that a native search indexer process would otherwise perform. In this way, the configured ERP process provides greater flexibility in features while operating according to desired preferences, such as response latency and resource requirements.

2.14.2. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying the event data that pertains to the entity, whether produced by the entity itself or by another machine, and considering the many various ways the entity may be identified in raw machine data (such as by a URL, an IP address, or machine name). The service and entity definitions can organize event data around a service so that the event data pertaining to that service can be easily identified. This capability provides a foundation for the implementation of Key Performance Indicators.

One or more Key Performance Indicators ("KPIs") are defined for a service within the SPLUNK® IT SERVICE INTELLIGENCE™ application. Each KPI measures an aspect of service performance at a point in time or over a period of time (aspect KPIs). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository itself may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPIs of the service to indicate an overall health score for the service.

SPLUNK® IT SERVICE INTELLIGENCE™ facilitates the production of meaningful aggregate KPIs through a system of KPI thresholds and state values. Different KPI definitions may produce values in different ranges, so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,'

'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPIs can be processed uniformly once they are translated into the common state values using the thresholds. For example, "normal 80% of the time" can be applied across various KPIs. To provide meaningful aggregate KPIs, a weighting value can be assigned to the KPIs so that its influence on the calculated aggregate KPI value is increased or decreased relative to the other KPIs.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a graphical user interface ("GUI"), for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a comma-separated values ("CSV") file, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: upon determining that KPI values satisfy the criteria, the application indicates a notable event. A severity level for the notable event may also be specified. Furthermore, when trigger criteria are satisfied, the correlation search may additionally or alternatively cause a service ticket to be created in an IT service management ("ITSM") system, such as the systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center ("NOC"). The interface may prominently display a services health section with tiles for the aggregate KPIs indicating overall health for defined services and a general KPI section with tiles for KPIs related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPIs in parallel graph lanes. The length of a lane can correspond to a uniform time range, while the width of a lane may be automatically adjusted to fit the displayed KPI data. Data within a lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

In some examples, one or more processes and/or interfaces of a SPLUNK® ENTERPRISE SYSTEM (such as a SPLUNK® IT SERVICE INTELLIGENCE™) are configured to provide a user with an efficient system to aggregate, store, and analyze metrics for example, within a SPLUNK® IT SERVICE INTELLIGENCE™ System. In some examples, the one or more processes are configured to provide metrics solutions including selective indexing of metrics, real-time search, a metrics catalog, ingestion protocols for standard ingestion of data, storage of raw metrics data, search commands and capabilities, in memory caching, conversion of log data to metrics data during ingestion, floating point compression and timestamp compression, dedicated file formats for metric storage, and/or additional processes and/or interfaces.

3.0. MULTI-PHASED DATA EXECUTION ARCHITECTURE

Figure 20:
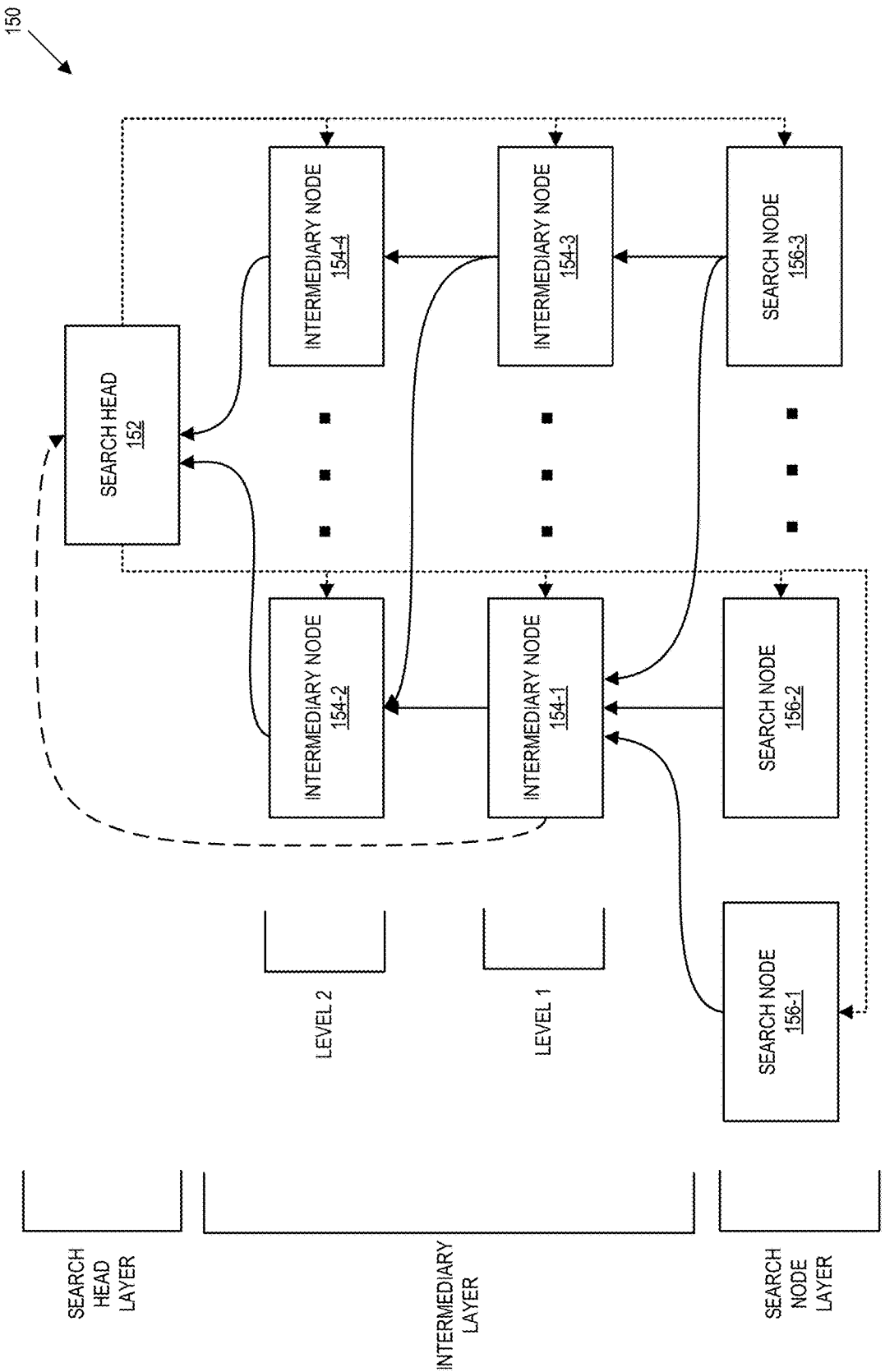
FIG. 20 is a block diagram of a multi-phased data execution system according to same implementations of the present disclosure.

FIG. 20 is a block diagram of a multi-phased data execution system as part of a data intake and query system according to some implementations of the present disclosure. The system 150 is multi-layered to implement the disclosed techniques that overcome the aforementioned drawbacks. As shown, a search head 152 of a search head layer is communicatively coupled to intermediary nodes (e.g., reducers) 154 of an intermediary layer (e.g., a reducer layer) and search nodes (e.g., indexers) 156 of a search node layer (e.g., an indexer layer). The intermediary nodes 154 are arranged in two levels. The first level includes two intermediary nodes 154-1 and 154-3, and the second level includes another two intermediary nodes 154-2 and 154-4. In some examples, the intermediary nodes 154 are logical nodes, physical hardware nodes, or combinations thereof. For example, the intermediary nodes 154 may be servers, and/or logical nodes residing on common hardware. Moreover, the intermediary nodes 154 may be homogenous or heterogeneous nodes.

The system 150 depicts data flows in two main directions: control data flows from the search head 152 to the intermediary nodes 154 and search nodes 156, and search results flow from the search nodes 156 through the intermediary nodes 154 to the search head 152. The data flows are illustrative of one possibility of a combination of data flows used to process a search query by the system 150. The data flows implemented by the system 150 can vary dynamically based on a variety of factors including the availability of intermediary nodes 154, a particular search process based on a particular search query, policies, etc. Hence, the system 150 merely illustrates a snapshot in time of data flows while processing a search query.

In the illustrated example, search results flow from a combination of the search nodes 156 to a combination of the intermediary nodes 154 at two levels, and then flow to the search head 152. The first level of intermediary nodes 154 collect partial search results output by the search nodes 156, and then combine the partial search results to produce a combination of partial search results. The combination of partial search results are output from the intermediary nodes 154 of the first level, and input to one or more combinations of intermediary nodes 154 at the second level. The intermediary nodes 154 of the second level can further combine the combined partial search results, and output the combination of combined partial search results to the search head 152. The search head 152 can then combine the combined partial search results (e.g., possibly twice combined) collected by the second level of intermediary nodes, and can then further combine the combination of partial search results to produce the final search results (e.g., possibly thrice combined). The final search results can be rendered as report data or visualizations displayed in a display device for a user.

However, the disclosed implementations are not limited to the arrangement of intermediary nodes 154 shown in FIG. 20. For example, a system that implements the disclosed techniques can have a single intermediary node, or any number of intermediary nodes arranged in any number of levels, in any hierarchical arrangement. In some examples, the intermediary nodes 154 are available to perform a search process but some are used to process a particular search query. For example, the search head 152 may intelligently determine a suitable number and configuration of intermediary nodes 154 used to process a particular search query. The configuration of intermediary nodes 154 used to process the search query may be referred to as "shuffle" functionality. The shuffle functionality may be optimized for different purposes such as, for example, to reduce the time to obtain final search results, or reduce the amount of resources to obtain final search results.

In some examples, the system 10 can implement multi-phased data execution to coordinate search operations of the search nodes 156, operations (e.g., parallel reduce) by the intermediary nodes 154, and further operations by the search head 152. For example, the search head 152 can intelligently generate a search process based on a combination of factors including policies and the search query. In some examples, the search process may include control data such as instructions for the intermediary nodes 154 and/or search nodes 156. The instructions may include phases that are executed by the intermediary nodes 154 and/or search nodes 156 in a particular order. As such, the search node 156, intermediary node 154, or the search head 152 can execute a phase of the multi-phased data execution.

For example, the policies can optimize search processing for search queries by spawning a number of phases executed on the search nodes 156, the intermediary nodes 154, and the search head 152. The search head 152 can dispatch the executable phases to orchestrate the search processing. The policies can include policies that define a number and/or scope of partitions for partial search results, and policies that define a number and type of intermediary nodes to process the partial search results. A combination of policies can be used to optimize the search processing for different search queries. For example, the policies may implement different granularities of partitions across heterogeneous or homogeneous types of intermediary nodes at the same or different levels to achieve load balancing. In some examples, the partitions are hashed, random, discrete, overlapping, or can have a range of granularities. For example, policies can designate using a certain percentage of randomly selected intermediary nodes to process a search query, or policies can designate certain high performance nodes to process certain search queries. Also, policies can be used to distribute work randomly across different intermediary nodes that would be idle otherwise.

For example, the control data may include different subsets of execution phases that are communicated to the intermediary nodes 154 and/or search nodes 156. In particular, certain execution phases can be executed by the search nodes 156 to retrieve indexed data (e.g., map operations). Certain execution phases can be executed by the first level of the intermediary nodes 154-1 and 154-3 (e.g., first reduce operations). Certain next execution phases can be executed by the second level of intermediary nodes 154-2 and 154-4 (e.g., second reduce operations on at least some of the reduced data). Yet other execution phases can be executed by the search head 152 to generate the final search results (e.g., via further reduce operations on at least some of the twice-reduced data).

In some examples, the system 150 can implement the use of keys to coordinate multiple ordered phases executed by the search nodes 156 and the intermediary nodes 154. For example, the search head 152 or the search node 156 can specify a particular key associated with particular partial search results. The partial search results from any of the search nodes 156 are sent to intermediary node 154 associated with matching keys. Hence, an intermediary node can combine the partial search results associated with a particular key for the search nodes encompassed by the search operation. The intermediary node can then send some of its combined partial search results to another intermediary node for further combining operations, and then ultimately to the search head 152 to fully combine partial search results, if necessary. The use of this ordered arrangement of phases allows the search head 152 to offload combining operations to the intermediary nodes 154 such that the search head 152 could run at or below capacity to avoid bottlenecks, regardless of the number of search nodes 156.

In the context of using map-reduce techniques, the system 150 illustrates a multi-phased data execution platform that may include three main layers of phases. A first one or more phases can encompass performing map operations by the search nodes 156 to obtain partial search results. In some examples, only a single phase of a single layer is executed to perform the mapping operation. A second one or more phases may encompass performing reduce operations by the intermediary nodes 154 on at least some of the partial search results of the first phases. Note that the second phases include two ordered sub-phases performed by intermediary nodes at different levels. Lastly, a third one or more phases may encompass performing a final reduce operation by the search head 152 based on the reduced partial search results of the second phases. In some examples, only a single phase of a single layer is executed by a single search head to perform the final reduce operation.

In some examples, searches having at least some common features can also benefit from the disclosed multi-phased execution platform. For example, some partial search results or combinations of partial search results of one search query can be reused for a second search query. An example of these types of searches can be scheduled searches that search at periodic intervals. In particular, the first and second search queries can have common portions that allow for spawning first and second search processes that reuse the same resources, to reuse partial search results or combinations of partial search results. For example, the intermediary 154 nodes can store partial search results or combinations of partial search results for subsequent searches that can reuse that data. In some examples, the stored data can be stored for a certain period and removed to avoid reusing stale data. Thus, partial search results can be temporarily stored or streamed by combinations of intermediary nodes in a manner that optimizes the search processing of search queries.

The system 150 also illustrates an optional third out-of-band data flow from the intermediary node 154-1 to the search head 152, used to provide a preview visualization that is generated based on a portion of the combined partial search results of the intermediary nodes 154. In particular, the dashed arrow from the intermediary node 154-1 to the search head 152 represents an out-of-band data flow of at least some partial search results processed by the intermediary node 154-1 prior to obtaining the final search results by the search head 152. Any combination of one or more of the intermediary nodes 154 can output at least some partial search results indicative of the progress of a particular search process performed by the system 150 to obtain final search results. For example, intermediary node 154 can send a portion of its combined results to the search head 152 before the search head 152 collects the combined partial search results of the intermediary nodes 154. The preview visualization can then be rendered on a display as feedback indicative of a status of the query processing by a data intake and query system.

3.1. Multi-Phased Data Execution Operations

Figure 21:
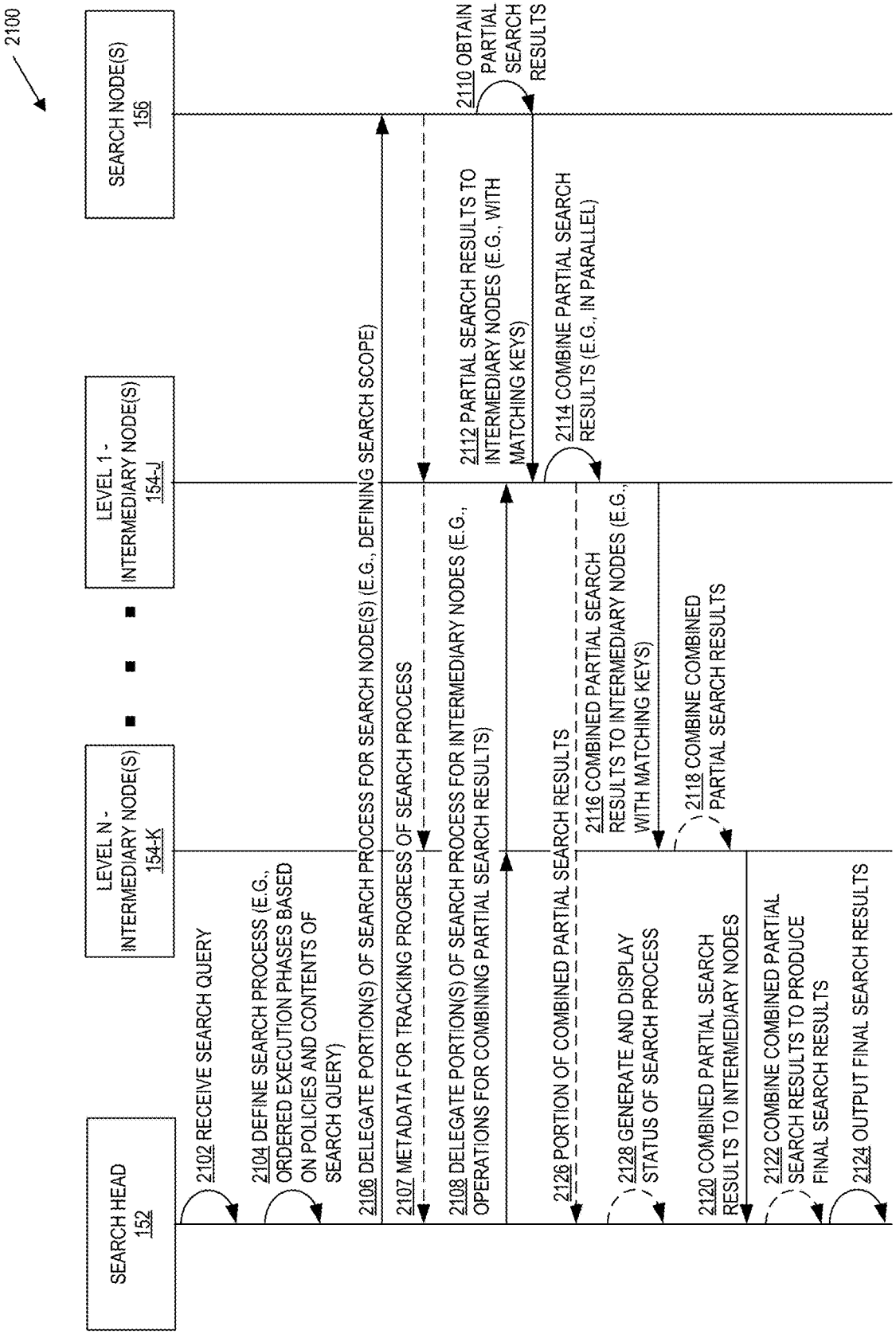
FIG. 21 is a flow diagram illustrating methods of the multi-phased data execution system according to same implementations of the present disclosure.

FIG. 21 is a flow diagram illustrating methods 2100 of the multi-phased data execution system according to same implementations of the present disclosure. As shown, the search head 152 receives a search query. For example, the search query may be input by a user using a client device or input from a scheduled search that performs the search automatically.

In step 2104, the search head 152 defines a search process to perform the disclosed techniques (e.g., parallel reduce techniques). For example, the search head 152 may generate the search process as ordered execution phases based on policies, the scope of a search query, and/or the contents of the search query. In some examples, the search process includes instructions forming a directed acyclic arrangement of executables to retrieve partial search results from the search nodes 156, combine the partial search results using a combination of the intermediary nodes 154, and/or produce the final search results by the search head 152.

In step 2106, the search head 152 delegates one or more portions of the search process to the search nodes 156. For example, the search head 152 may delegate map operations of a map-reduce process to the search nodes 156. The portions of the search process may include instructions that define the scope of a search, phases for obtaining partial search results, and phases for outputting the retrieved partial search results for the intermediary nodes 154. In some examples, the portions of the search process delegated to the search nodes 156 may include instructions for combining the retrieved partial search results before outputting the partial search results to an intermediary node. For example, the search process may include shuffling partial search results among the search nodes 156, and at least partially combining the partial search results before they are output to any of the intermediary nodes 154.

In step 2107, the search nodes 156 and/or intermediary nodes 154 may send metadata to the search head 152 at any time after receiving the delegated portions of the search process. The metadata may allow the search head 152 to track the progress of the search process executed by the search nodes 156 and/or intermediary nodes 154. For example, the search head 152 can use received metadata to track the progress of mapping operations on search nodes 156 or reduce operations on the intermediary nodes 154. In some examples, some of the intermediary nodes 154 can send metadata to the search head 152 along with partial search results while the search nodes 156 and other intermediary nodes separately send metadata back to the search head 152 without partial search results.

In step 2108, the search head 152 also delegates a portion of the search process to one or more of a combination of the intermediary nodes 154. In some examples, the portion of the search process delegated to the intermediary nodes 154 may include instructions for performing operations to combine the partial search results output by the search nodes 156. In some examples, the portion of the search process delegated to the intermediary nodes 154 may include instructions sending a combination of combined partial search results to another of N levels of intermediary nodes 154.

In step 2110, the partial search results are obtained by the search nodes 156 in accordance with the portion of the search process delegated by the search head 152. In some examples, the partial search results obtained from the search nodes 156 may be associated with a particular key. For example, the search query received by the search head 152 may have a scope that includes different data types. The search process may designate a key for a particular data type. The search nodes 156 can retrieve partial search results, and associate the retrieved partial search results with particular keys depending on the data types of the retrieved partial search results.

In step 2112, a combination of intermediary nodes 154-J receive the partial search results output by the search nodes 156. For example, the search process may designate particular ones of the intermediary nodes 154-J as being associated with particular keys, and the partial search results associated with particular keys are output by the search nodes 156 and set to the intermediary nodes 154-J having matching keys. In this manner, the search process can guide the data flow of partial search results from the search nodes 156 through a combination of the intermediary nodes 154 to the search head 152 for output of the final search results to a user.

In step 2114, the intermediary nodes 154-J combine (e.g., reduce) the partial search results output by the search nodes 156. For example, the partial search results associated with a first key and obtained from a number of the search nodes 156 can be combined by a particular intermediary node 154-J to produce a combination of partial search results associated with a key. A different of the intermediary nodes 154-J may collect and combine partial search results obtained from the same combination of peer search nodes 156, or a different combination of the search nodes 156, which are associated with a different key.

In some examples, the combination of partial search results output by the intermediary nodes 154-J can be sent to the search head 152 for final processing, and output as final search results. However, in some examples, the combination of partial search results output by the intermediary nodes 154-J can be sent to other intermediary nodes of N other levels. For example, in step 2116, the combined partial search results output by the intermediary nodes 154-J are input to intermediary nodes 154-K. In some examples, the intermediary nodes 154-K are also associated with keys used to combine particular combinations of combined partial search results output by other intermediary nodes 154-J associated with matching keys. For example, an intermediary node of the intermediary nodes 154-K may receive a combination of the combined partial search results output by the intermediary nodes 154-J having keys that match the particular intermediary node of the intermediary nodes 154-K.

In step 2118, the intermediary nodes 154-*k* at level N can further combine the partial search results output by intermediary nodes at lower levels to produce combinations of the combinations of the partial search results. In step 2120, the combination of the combination of partial search results are input to the search head 152 from the intermediary nodes 154-K. The search process may include any number of combinations of operations (e.g., reduce operations) in any combination of N levels that is suitable or optimal for the system 150, search query, policies, other factors, or combinations thereof.

In step 2122, the search head 152 can further combine the combinations of partial search results to obtain final search results. In some examples, the search head 152 can offload the combining operations to the intermediary nodes 154 such that the search head 152 receives the final search results from the intermediary nodes 154. Lastly, in step 2124, the search head 152 can output the final search results for the search query. For example, the final search results can be output in a report or visualization rendered on a display of a display device. A user can then view and use controls to manipulate the search results.

In some cases, an operator of the data intake and query system may want to see the progress of a search process running to obtain search results for a submitted search query. By seeing an indication of the progress of the search process, the time taken to complete the search process may seem shorter or, at least, it allows the user to maintain a reasonable perspective about how long it will take to complete the search process. In some examples, the current progress may be provided as a preview visualization rendered on a display of a display device. For example, the preview visualization may include a status bar indicating the completed amount of the search process and/or how much of the search process is remaining to obtain final search results. This feature is particularly beneficial when processing takes a long time.

For example, in step 2126, an intermediary node of the intermediary nodes 154-J may output preview data out-of-band including some data indicative of partial search results that it is currently processing. In some examples, the preview data may be collected from intermediary nodes 154 at the same or different levels, from the same or different intermediary nodes. As such, the preview data may be received out-of-band by the search head 152 periodically or randomly before the final search, results are available. Moreover, the preview data may be collected from random intermediary nodes 154 or from the same intermediary nodes 154 according to a schedule or pattern. Then, in step 2128, the search head 152 can render the preview visualization indicative of the status of the search process.

3.2. Parallel Branching Operations

As described herein, the data intake and query system 188 can execute queries in a parallelized way. For example, a search head 152 can communicate a received query to multiple search nodes 156. The search nodes 156 can concurrently generate partial results and communicate the partial results in parallel to the search head 152. Further, in some cases, prior to the search node receiving the partial results, intermediary nodes 154 can process the partial results in parallel and communicate their results to the search head 152 for final processing.

In some cases, a received query may include a branching operation that includes the combination of two data sets or the combination of results from two subqueries. In some scenarios, the search head 152 linearly executes the search query. For example, the search head 152 provides the first subquery to the search nodes 156 and receives the first search results. The search head 152 subsequently provides the second subquery to the search nodes 156 and receives the second search results. Based upon receiving the first search results and the second search results, the search head 152 performs the branching operation to join the first search results and the second search results. However, such a linear execution can result in delays to the processing of the search query as the search head 152 may wait for the search nodes 156 to first, perform the first subquery and second, perform the second subquery before executing the join command at the search head 152. Further, execution of the join command at the search head 152 can imply computation overhead on the search head 152.

Thus, although the data intake and query system 188 includes distributed components, such as the search nodes 156 and the search head 152, the linear execution of the subqueries results in a slower execution time of the join operation and the search as a whole. Consider an instance involving the linear execution of the subqueries in which the first subquery in the search query executes on a dataset that returns ~380,000 different results and the second subquery in the search query executes on a dataset that returns ~497,000 different results. Since the search nodes 156 may first execute the first subquery, the search nodes 156 may not execute the second subquery until the search nodes 156 have executed the first subquery. Further, the linear execution of the first subquery and the second subquery may delay the completion of the search query.

To increase parallelization and decrease search time, the data intake and query system 188 can send (concurrently) subqueries to the search nodes 156 for concurrent execution. In this way, the data intake and query system 188 can take advantage of the bandwidth of the distributed search nodes 156 to obtain and process search results in less time. Advantageously, the data intake and query system 188, as described below, employs intermediary nodes 154 and search nodes 156 developed to speed up analysis operations performed at search time. These techniques include: (1) performing search operations in parallel across multiple search nodes 156; (2) performing branching operations in parallel across multiple intermediary nodes 154; and (3) accelerating the process of combining two or more sets of data. These novel techniques are described in more detail below. Although described as performed by intermediary nodes 154 and search nodes 156, it will be understood that various components can be used to perform similar functionality. For example, nodes can perform any one or any combination of the search operations or the branching operations described herein. In some cases, the nodes perform the search operations or the branching operations based on instructions received from a search head 152 (e.g., a query coordinator).

To facilitate faster query processing, a search head 152 can parse a received search query to determine that the search query includes a branching operation as part of the search query. In order to increase the speed of analysis operations performed at search time, a search node 156 may perform search operations associated with the first subquery and the second subquery in parallel (e.g., concurrently) or linearly. Further, the search node 156 may provide the search results of the first subquery and the second subquery to an intermediary node 154 that performs at least a portion of the branching operation on the search results of the first subquery and the search results of the second subquery. Therefore, the search head 152 may receive combined partial search results from the intermediary nodes 154, the combined partial search results representing at least a partial execution of the branching operation. As at least part of the branching operation is performed by the search nodes 156 and/or the intermediary nodes 154, the search head 152 is able to more efficiently determine results of the search query.

For example, consider the following search query which includes a branching operation to combine a first set of data (the results of a first subquery) with a second set of data (the results of a second subquery):

"search index=dogfood2007|stats count by time, source-|join time [|search index=dogfood2008|stats count by time, processor]|stats count"

The search query includes a first subquery "search index=dogfood2007|stats count by time, source," a second subquery "search index=dogfood2008|stats count by time, processor," and a branching operation "join time," to combine the results of the first subquery with the results of the second subquery. The first subquery and the second subquery each include the name of an index that the system is to search as part of the particular subquery and search commands indicating how to process the data from the index. Specifically, the first subquery indicates that the system is to search the index dogfood2007 for the number of entries with a matching value for a time field and a matching value for a source field. The results from the first subquery can include a number of data entries for each particular pair of a time field value and a source field value. The second subquery indicates that the system is to search the index dogfood2008 for the number of data entries with a matching value for a time field and a matching value for a processor field. The results from the second subquery can include a number of data entries for each particular pair of a time field value and a processor field value. The branching operation indicates that the system is to combine the results of the first subquery and the results of the second subquery using a "join" operation based on the field "time." Therefore, the search query includes a first subquery and a second subquery and a branching operation to join the results of the first subquery and the second subquery.

Although the above example includes two subqueries, a search query may include more, less, or a different number of subqueries. Further, the search query may include more, less, or different search commands. For example, the search query may include multiple branching operations.

To improve the execution of search queries that include a branching operation that combines two sets of data, the system can determine the first subquery and the second subquery of the search query. Further, the system can provide the first subquery and the second subquery to one or more search nodes 156 concurrently. The one or more search nodes 156 can concurrently execute the first subquery and the second subquery. In some cases, the one or more search nodes 156 may be unaware of the relationship between the first subquery and the second subquery. For example, the one or more search nodes 156 may be unaware that the first subquery and the second subquery relate to the same search query or that a search head 152 may combine the results of the first subquery and the second subquery. Thus, by providing the subqueries to the search nodes 156 concurrently and having the search nodes 156 execute the subqueries concurrently, the system can increase the parallelization of the query execution and decrease search time.

In some cases, given the amount of data generated from a branching operation, the data intake and query system 188 can include a set of intermediary nodes 154. The set of intermediary nodes 154 can perform additional processing corresponding to the branching operation. For example, the system may include multiple intermediary nodes 154 and multiple search nodes 156. The intermediary node 154 may receive a set of partial results corresponding to the first subquery and the second subquery, the intermediary nodes 154 may generate a set of combined partial results by performing a portion of the branching operation on the set of partial results received from the search nodes 156. The intermediary nodes 154 may provide the set of combined partial results to the search head 152 or a subsequent level of intermediary nodes 154. Multiple levels of intermediary nodes 154 may process the partial results before providing the partial results to the search head 152 for generation and provision of the final search results.

Figure 22:
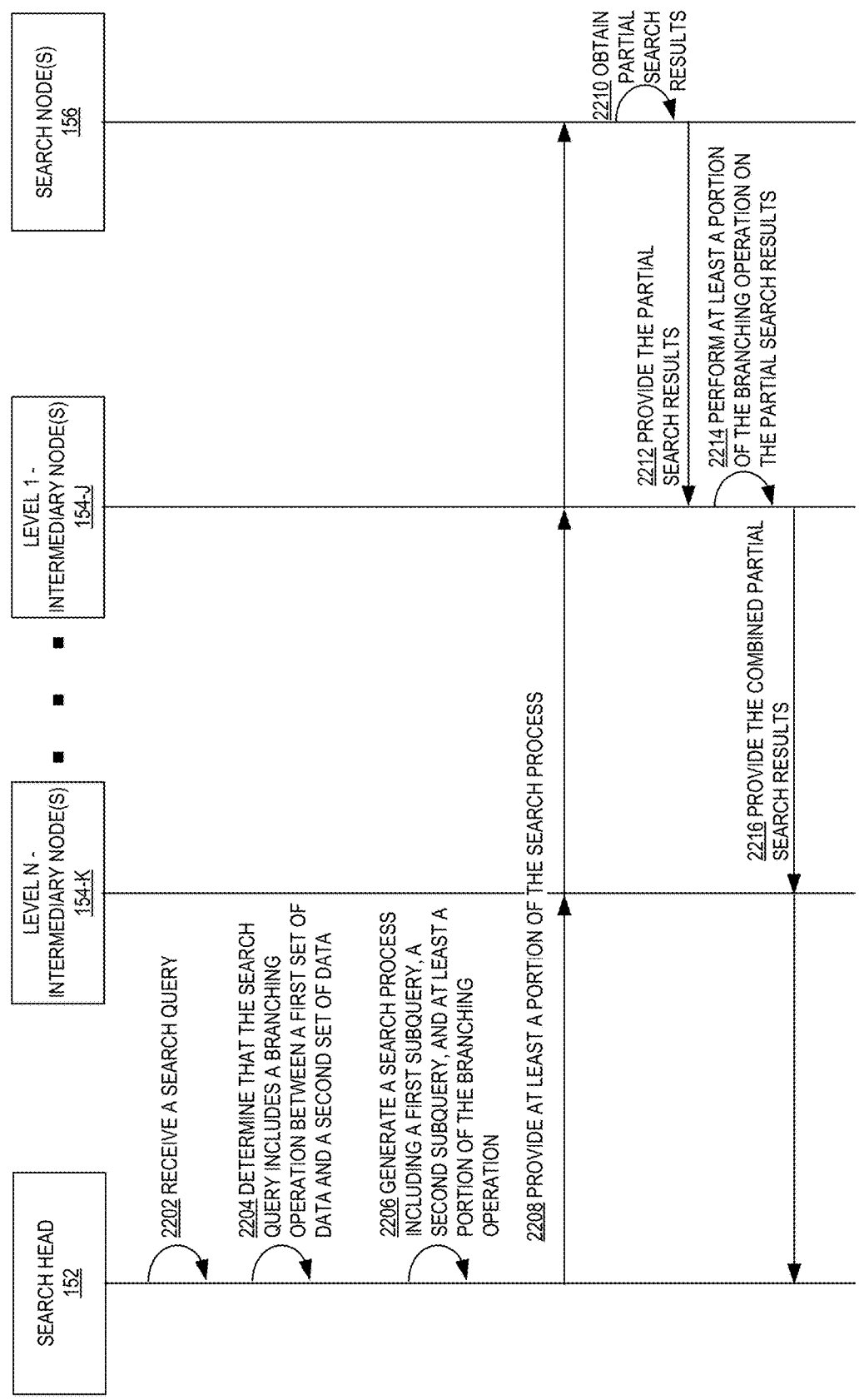
FIG. 22 is a flow diagram illustrating how a search head, intermediary nodes, and search nodes perform a search query including a branching operation according to same implementations of the present disclosure.

FIG. 22 is a data flow diagram illustrating the interactions between various components of the data intake and query system 188 according to same implementations of the present disclosure. As shown, at step 2202, the search head 152 receives a search query. For example, a user may input the search query using a client device or a scheduled search may perform the search automatically.

At step 2204, the search head 152 determines that the search query includes a branching operation between a first set of data and a second set of data. For example, the search query may include a join operation between the results of a first subquery and the results of a second subquery. The search head 152 may determine that the search query includes a branching operation based at least in part on the syntax of the query. For example, the search head 152 may parse the query for certain terms/commands/fields (e.g., "join," "union," "append," etc.) that are associated with a branching operation. In some examples, the search head 152 may receive an indication with the search query, the indication indicating that the search query includes a branching operation. Therefore, the search head 152 determines that the search query includes a branching operation between a first set of data and a second set of data.

As described, a branching operation may include any operation that is performed on multiple sets of data (e.g., the results of multiple subqueries) and/or combines results of multiple sets of data (e.g., a join command that joins the results of two subqueries or an append command that appends results of one subquery to another subquery). Other examples of a branching operation include an inner join (i.e., a join that returns the results shared by the first subquery and the second subquery), a left join or a right join (i.e., a join that returns the results of the first subquery or the second subquery), a full join (i.e., a join that returns the results of the first subquery and the second subquery), a union, an intersect, an except, etc. In some examples, a search query may include a branching operation for more than two sets of data (e.g., a branching operation for five sets of data). In such a case, the branching operation may include multiple branching operations that each perform an operation on two sets of data or a singular branching operation that performs an operation on more than two sets of data.

At step 2206, the search head 152 generates a search process to execute the search query using the disclosed techniques (e.g., a parallel branching operation). For example, the search head 152 may generate the search process as ordered execution phases and/or a directed acyclic graph based on policies, the scope of a search query, and/or the contents of the search query. As described herein, in some cases, the search process may comprise instructions to: execute a first subquery to obtain first partial results, execute a second subquery to obtain second partial results, and combine the first partial results and second partial results as part of a branching operation. For example, the search process can include instructions to perform a first subquery and a second subquery and instructions to join the results of the first subquery and the results of the second subquery. In certain cases, the search process can include different instructions for different nodes. For example, the search process may include instructions for search nodes 156 to execute first and second subqueries to obtain first and second partial search results, and include additional instructions for intermediary nodes 154 to combine the first and second partial search results according to a branching operation.

In some cases, the search process may not include instructions for intermediary nodes 154 to combine the first and second partial search results. In some such cases, the search head 152 may receive the search query containing the branching operation and generate a search process including instructions to execute a first subquery and a second subquery and provide the partial results to the search head 152.

The search head 152 may concurrently send the first subquery and the second subquery to search node(s) 156 for execution. The search node(s) 156 may execute the first subquery and the second subquery and provide the first and second partial search results to the search head concurrently.

At step 2208, the search head 152 provides at least a portion of the search process to one or more intermediary nodes 154 and/or search nodes 156. In some cases, the search head 152 may designate nodes as intermediary nodes 154 and/or search nodes 156. In certain cases, the nodes themselves self-determine or collectively determine their role for a particular query or for different portions of the query. In some cases, any one of the search nodes 156 can act as an intermediary node 154 for a given query. For example, a node can execute one or more subqueries (as a search node 156) and/or perform at least a portion of the branching operation (as an intermediary node 154). In some cases, the search nodes 156 may not be capable of performing at least a portion of the branching operation and/or the intermediary nodes 154 may not be capable of executing the one or more subqueries.

In some cases, whether a node is used as an intermediary node 154 can depend on the capacity of the node. For example, if the node satisfies a threshold capacity (e.g., based on processing capacity, memory usage, network information, etc.), the search head 152 can designate the node as an intermediary node 154 for a query. In some cases, the search head 152 can determine the capacity of the node (and its designation as an intermediary node 154) prior to query execution or during query execution (e.g., before the branching operation phase of the query begins).

In certain cases, the search head 152 can designate a particular node as an intermediary node 154 and/or a search node 156. For example, for a given search query, the search head 152 may select/designate a first node as an intermediary node 154 and a second node as a search node 156. The search head 152 may update the selection of an intermediary node 154 and a search node 156 based on a subsequently received search query. In some examples, the search head 152 may use the selection of an intermediary node 154 and a search node 156 for multiple search queries. Further, a search head 152 may designate an intermediary node 154 and a search node 156 based on receipt of an initial search query and reuse the designation for subsequent queries. In some examples, the search head 152 may obtain a designation indicating the search nodes 156 and the intermediary nodes 154. Therefore, the search head 152 may determine intermediary nodes 154 and search nodes 156 to provide at least a portion of the search query.

In certain cases, the role of a node can change from one query to the next, or even, within a query. For example, a particular node is a search node 156 for a first search query and an intermediary node 154 for a second search query, or may act as a search node 156 for a first phase of a query (e.g., first and second subquery execution phase) and then act as an intermediary node 154 for a second phase of the query (e.g., branch operation phase).

Depending on its role for a particular query, a given node may receive different portions of the search process. For example, a search node 156 may receive a first subquery and a second subquery and instructions to execute the subqueries in parallel, and an intermediary node 154 may receive instructions to combine the results of the first subquery and the second subquery according to a branching operation included in the search query and/or instructions to communicate the first and second subqueries to the search node(s)

156. In some such cases, the intermediary node 154 may not be aware that one or more search nodes 156 are executing subqueries.

In certain cases, the intermediary node 154 and the search node 156 may receive the entire search process and instructions to execute a certain portion of the search process. For example, the intermediary node 154 and the search node 156 may receive the entire search process, including instructions to perform the first subquery, instructions to perform the second subquery, and branching instructions. Each node may also receive a designation of its role in the search process and/or which instructions it is to execute.

In some cases, the search head 152 can communicate the search process to a plurality of nodes. In response, the plurality of nodes may self-identify and/or self-organize to designate nodes as intermediary nodes 154 and/or search nodes 156. Each node of the plurality of nodes may communicate a status (e.g., an availability, a capacity, or another characteristic of the node) to other nodes based upon a communication protocol (e.g., a gossip protocol). Based on the status of the nodes, the plurality of nodes can identify one or more nodes as intermediary nodes 154 and one or more nodes as search nodes 156. Further, based upon its designation, a particular node may execute the search node instructions of the search process (e.g., perform the first subquery and the second subquery) and/or the intermediary node instructions (e.g., combining the results of the first subquery and the second subquery as part of a branching operation). In certain cases, all nodes of the data intake and query system 188 are search nodes 156 and a subset of the search nodes 156 are designated as intermediary nodes 154.

In some cases, the search head 152 may communicate with the intermediary nodes 154 but not the search nodes 156. For example, the search head 152 may provide the search process to the intermediary node 154 without communicating with the search node 156. In some such cases, the search process may include instructions for the intermediary node 154 to provide relevant instructions to the search node 156. For example, the search process may indicate that an intermediary node 154 is to provide the first subquery and/or the second subquery to the search node(s) 156, receive the results, and combine the results as part of a branching operation. The search process may further indicate search nodes 156 to receive the instructions. In some cases, the intermediary nodes 154 may select the search nodes 156 based at least in part on a characteristics of the search nodes 156 (e.g., capacity, availability, etc.).

At any time during the execution of the search query, the search nodes 156 and/or the intermediary nodes 154 may send metadata and/or updates to the search head 152 (e.g., heartbeats). The updates may allow the search head 152 to track the progress of the search process executed by the search node 156 and/or the intermediary node 154. For example, the search head 152 can use received updates to track the progress of the first subquery and the second subquery on the search node 156 or the at least a portion of the branching operation on the intermediary node 154.

At step 2210, the search node(s) 156 obtain the partial search results. As described herein, the search node(s) 156 can obtain the partial search results by executing subqueries on data in one or more data stores. For example, a search node 156 can obtain first partial results by executing a first subquery and obtain second partial results by executing a second subquery. In some cases, the subqueries are received from an intermediary node 154 and/or a search head 152. In certain cases, the search node 156 is not aware of any relationship between the two subqueries. For example, the search node 156 may be unaware that the subqueries relate to the same search query or that a search head may combine the results of the two subqueries.

At step 2212, the search node(s) 156 provide the partial search results to intermediary node(s) 154. As described herein, in some cases, the search process can include instructions for the search node(s) 156 to communicate their results to an intermediary node 154. Accordingly, based on the instruction, the search node(s) 156 communicate their results to a particular intermediary node 154. In some cases, the search process can include instructions to distribute the results to different intermediary nodes 154 based on one or more field-value pairs, hashes of the results, and/or keys. In some such cases, the search node(s) 156 can send partial results with the same field-value pair, hash, and/or key to the same intermediary node 154. As such, the search nodes 156 can aid in sorting the results between different intermediary nodes 154 so that the intermediary nodes 154 can further process the results.

In some cases, the data intake and query system 188 may include multiple levels of intermediary nodes 154 such as a first level of intermediary nodes 154-J and a second level of intermediary nodes 154-K. Further, the one or more intermediary nodes 154-J may correspond to specific search nodes 156 such that particular intermediary nodes 154-J receive partial search results from corresponding search nodes 156. In some cases, each of the one or more intermediary nodes 154-J may receive a specific set of partial search results. For example, the search process may designate particular nodes of the one or more intermediary nodes 154-J as associated with particular keys, and the partial search results associated with particular keys are output by the search nodes 156 and sent to the intermediary nodes 154-J having matching keys.

Although not illustrated in FIG. 22, in some cases, the data intake and query system 188 may not include intermediary nodes 154-J and the search nodes 156 may provide the partial search results to the search head 152. In this manner, the search process can guide the data flow of partial search results from the search nodes 156 to the search head 152 for output of the final search results to a user.

At step 2214, the intermediary nodes 154-J perform at least a portion of the branching operation on the partial search results. For example, in the event that the branching operation is a join operation, a particular intermediary node 154-J may join the partial search results that it receives from one or more search nodes 156. For example, the data intake and query system 188 may include twenty search nodes 156 that collectively obtain forty partial search results based on a first subquery and a second subquery (e.g., the search nodes 156 may generate twenty partial search results for the first subquery and twenty partial search results for the second subquery). In this example, the data intake and query system 188 may include ten intermediary nodes 154-J. Each intermediary node 154-J can receive a limited number of the partial search results (e.g., each intermediary node 154-J can receive two partial search results) and perform the branching operation on the limited number of partial search results. In some cases, a particular intermediary node 154-J can combine the sorted partial search results (e.g., partial search results associated with a particular key and obtained from a number of the search nodes 156) to produce a combined partial search results associated with the key. As described herein, different intermediary nodes 154-J may collect and combine partial search results from different combinations of search nodes 156, based on the key associated with the search nodes 156. Therefore, the intermediary nodes 154 may reduce the complexity and number of operations required by the search head 152 as the intermediary nodes 154 perform at least a portion of the branching operation on the partial search results.

At step 2216, the intermediary nodes 154 can communicate the results of processing the partial search results to the search head 152 for final processing (and output as final search results). The search head 152 may perform additional processing on the combined partial search results output by the intermediary nodes 154-J. For example, where the branching operation is a join operation, the search head 152 may join the combined partial search results provided by multiple intermediary nodes 154-J.

In certain cases, however, the intermediary nodes 154 can complete the branching operation on the partial search results before sending the combined partial search results to the search head 152. In some cases, one level of intermediary nodes 154-J can complete the branching operation. In certain cases, multiple levels of intermediary nodes 154 (e.g., intermediary nodes 154-J, 154-K, etc.) are used to complete the branching operation. For example, the intermediary nodes 154-J can provide the combined partial search results to other levels of intermediary nodes 154 (e.g., intermediary nodes 154-K) in the data intake and query system 188 and each level can perform additional processing on the partial results or combined partial results. In some examples, the intermediary nodes 154-K are also associated with keys used to combine particular combinations of combined partial search results output by other intermediary nodes 154-J associated with matching keys. For example, an intermediary node 154 of the intermediary nodes 154-K may receive a combination of the combined partial search results output by the intermediary nodes 154-J having keys that match the particular intermediary node 154 of the intermediary nodes 154-K.

The intermediary nodes 154-K at level N can further perform at least a portion of the branching operation on the combined partial search results output by intermediary nodes 154 at lower levels to produce further combined partial search results. The intermediary nodes 154-K may further provide the further combined partial search results to the search head 152 or another level of intermediary nodes 154. The search head 152 can further perform a portion of the branching operation on the combined partial search results received from the intermediary nodes 154 to obtain final search results. The combined partial search results can correspond to results received from the intermediary nodes 154-K, the results received from the intermediary nodes 154-J, or an Nth level of results received from an Nth level of intermediary nodes 154 to obtain final search results.

Figure 23:
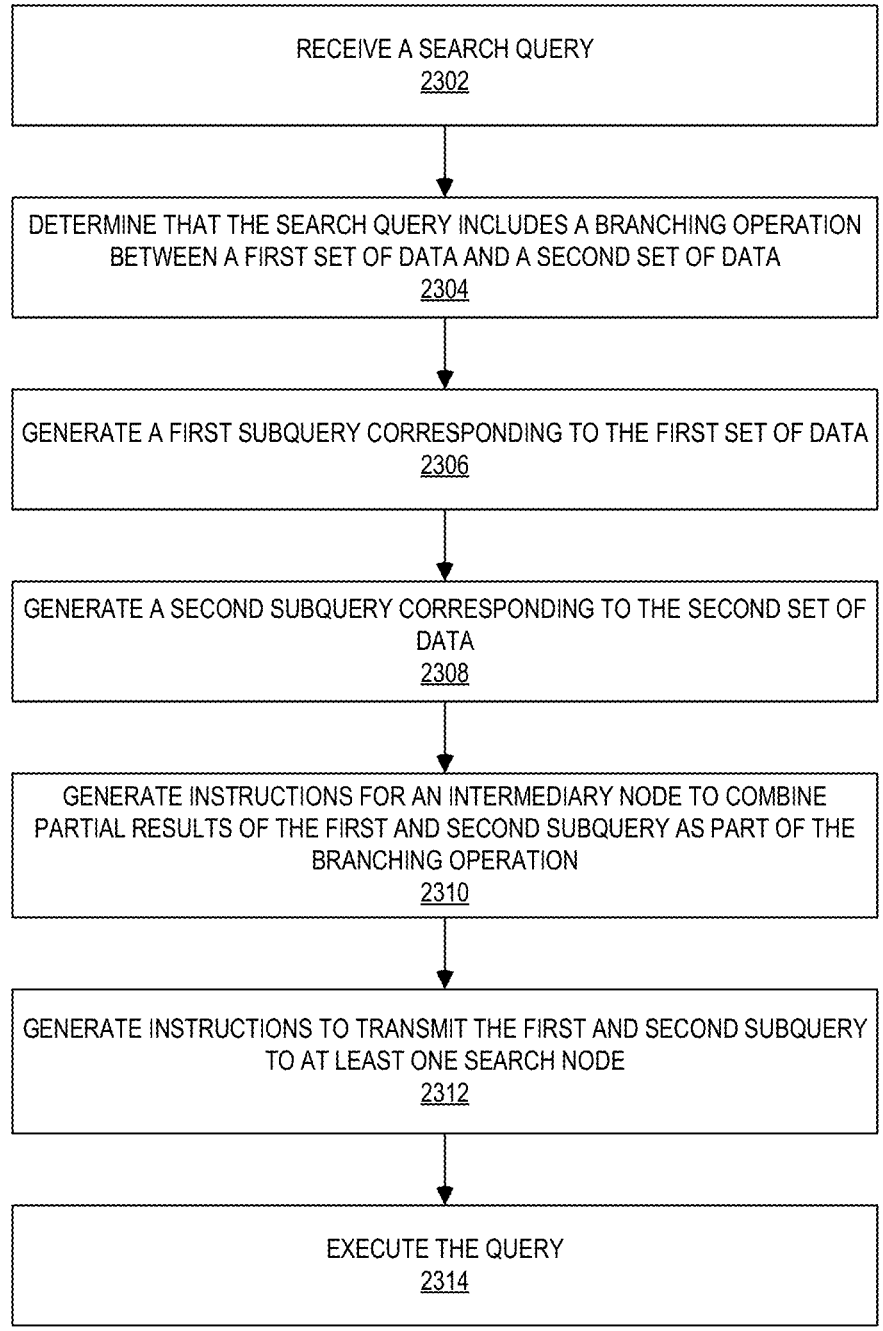
FIG. 23 is a flow diagram illustrating methods of the data intake and query system executing the parallel branching operation according to same implementations of the present disclosure.

FIG. 23 is a flow diagram illustrative of an example of a routine 2300 implemented by a computing device to execute a branch operation in parallel. Although described as being implemented by the search head 152, it will be understood that the elements outlined for routine 2300 can be implemented by any one or a combination of computing devices/components of the data intake and query system 188, such as a search nodes 156 or intermediary node 154. Thus, the following illustrative embodiment should not be construed as limiting.

At step 2302, the search head 152 receives a search query from a client. Based on receiving the search query, the search head 152 may perform one or more operations of the search query. In performing the operations on the search query, the search head 152 may parse the search query based on a syntax language. The search head 152 may parse the search query for search commands (e.g., subqueries, branching operations, etc.). The search head 152 may further parse the search query for potential errors. For example, the search head 152 may validate that the search commands of the search query are valid and that the search query corresponds to valid data sources. Further, the search head 152 may authenticate the search query based on the parsing of the search query to authenticate the syntax of the query, the client, etc. Therefore, the search head 152 receives a search query and may parse the search query for various information about the search query.

At step 2304, the search head 152 determines that the search query includes a branching operation between a first set of data and a second set of data. The determination that the search query includes a branching operation may be based at least in part on the parsing of the query at step 2302. The determination that the search query includes a branching operation may be based at least in part on a syntax of the search query or an identity of the branching operation. The search head 152 may parse the search query based on branching operations (e.g., "join") to determine that the search query includes a branching operation between a first set of data and a second set of data. The search head 152 may also identify a particular operation that corresponds to the branching operation identified in the search query. For example, where the search query includes a join operation, the search head 152 may determine that two sets of data are to be joined. Further, as part of determining that the search query includes a branching operation, the search head 152 may identify sets of data to combine as part of the branching operation. For example, the sets of data to combine as part of the branching operation may correspond to the results of subqueries of the search query. Therefore, the search head 152 may determine that the search includes the branching operation between the first set of data and the second set of data.

At step 2306, the search head 152 generates a first subquery corresponding to the first set of data. The search head 152 may generate the first subquery based at least in part on the parsing of the search query at step 2302. For example, the search head 152 may generate the first subquery from a portion of the search query (e.g., a first half of the branching operation). In some cases, generating the first subquery can include extracting a portion of the query and identifying the extracted portion as the subquery. In certain cases, generating the first subquery can include extracting a portion of the query, generating one or more additional commands, adding the additional commands to the extracted portion of the query, and identifying the result as the first subquery. In certain cases, generating the first subquery can include identifying data to be queried, identifying one or more operations to be performed on the data, and generating the first subquery to include the data and the one or more operations to be performed on the data. In some cases the first subquery may include filter criteria that identifies the data to be processed as part of the first subquery and processing criteria indicating how to process the data. Therefore, the search head 152 may generate a first subquery corresponding to the first set of data.

At step 2308, the search head 152 generates a second subquery corresponding to the second set of data. The search head 152 may generate the second subquery based at least in part on the parsing of the search query at step 2302, similar to the generation of the first subquery. For example, the search head 152 may generate the second subquery from a portion of the search query (e.g., a second half of the branching operation). The second subquery may include filter criteria that identifies data to be processed as part of the second subquery and how to process the data. Therefore, the search head 152 may generate a second subquery corresponding to the second set of data.

At step 2310, the search head 152 generates execution instructions for an intermediary node 154 to combine partial results of the first subquery and second subquery as part of the branching operation. The execution instructions for the intermediary node 154 may further include instructions to further process the results of the branching operation, send the combined partial results to the search head 152 or to another intermediary node 154, etc. In some cases, the instructions may designate an intermediary node 154 to receive the instructions. In other cases, the instructions may not designate an intermediary node 154 and the transmitting node (e.g., the search head 152) may select the intermediary node 154 to receive the instructions. In certain cases, the execution instructions for the intermediary node(s) 154 can be included as part of a directed acyclic graph, etc.

At step 2312, the search head 152 generates instructions to transmit the first and second subquery to the search node(s) 156. The instructions may further indicate to transmit the first and second subquery concurrently to the at least one search node 156 of the data intake and query system 188. The instructions to transmit the first and second subqueries to the search node(s) 156 may be part of the instructions for the intermediary node 154 such that the intermediary node 154 receives the instructions and transmits the first and second subqueries to the search node(s) 156. In some cases, the instructions to transmit the first and second subqueries are retained by the search head 152 such that the search head communicates the first and second subqueries to the search node(s) 156.

In addition to generating the instructions to transmit the first and second subqueries to the search node(s) 156, the search head 152 can generate additional execution instructions to: execute the first and second subqueries, communicate partial search results to the intermediary node(s) 154 (or to the search head 152), complete the processing of the query results, and other execution instructions as described herein at least with reference to step 2310, etc. As described herein, the execution instructions can be included as part of a directed acyclic graph, etc.

At step 2314, the search head 152 executes the search query. In some cases, to execute the query, the search head 152 communicates the execution instructions to one or more intermediary nodes 154 and/or one or more search nodes 156. As described herein, in some cases, the search head 152 communicates the execution instructions to the intermediary nodes 154 and/or to the search nodes 156. In certain cases, the search head 152 communicates the execution instructions to only the intermediary nodes 154. As described herein, in some cases, the search head 152 selects the intermediary nodes 154. In certain cases, the search nodes 156 communicate with each other to select the intermediary nodes 154.

In some cases, the instructions to transmit the first and second subquery to at least one search node 156 can be included in the execution instructions communicated to the intermediary nodes 154 and/or the search nodes 156. When communicated to the intermediary nodes 154, the intermediary nodes 154 can, in accordance with the instruction, communicate the first and second subqueries to the search nodes 156 for concurrent execution. In addition, in some such cases, the intermediary nodes 154 can communicate additional execution instructions to the search nodes 156 to enable the search nodes 156 to execute the portion of the query that they are assigned to execute.

In some cases, the instructions to transmit the first and second subquery to at least one search node 156 are executed by the search head 152 such that the search head 152 communicates the first and second subqueries to the search nodes 156 for concurrent execution.

In certain cases, such as when the nodes determine amongst themselves which nodes are to be intermediary nodes 154 and which are to be search nodes 156, rather than an explicit instruction to communicate the first and second subqueries to the search nodes 156, the execution instructions can include instructions that whatever nodes are designated as search nodes 156 are to execute the first and second subqueries concurrently.

In response to concurrently receiving the first subquery and the second subquery, the at least one search node 156 may concurrently execute the first subquery and the second subquery to generate first partial results of the first subquery and second partial results of the second subquery. The at least one search node 156 may transmit the first partial results and the second partial results to an intermediary node 154.

The intermediary node 154 may concurrently receive the first partial results and the second partial results from the at least one search node 156 and may perform at least a portion of the branching operation on the partial results to generate combined partial results. For example, where the branching operation is a join operation, the intermediary node 154 may join the first partial results and the second partial results to generate the combined partial results. The intermediary node 154 may communicate the combined partial results to a second intermediary node 154 and/or the search head 152. In such cases where the intermediary node 154 communicates the combined partial results to a second intermediary node 154, the second intermediary node 154 may perform an additional portion of the branching operation. As noted above, the data intake and query system 188 may include any number of levels of intermediary nodes 154 that each perform at least a portion of the branching operation. Upon receiving combined partial results from an intermediary node 154, the search head 152 may perform a final portion of the branching operation to generate a final search query output. The data intake and query system 188 may output the final search query output to a user in response to the search query.

It will be understood that the data intake and query system 188 may include fewer, more, or different components. For example, in certain cases, the data intake and query system 188 may not include intermediary nodes 154. Fewer, more, or different blocks can be used as part of the routine 2300. In some cases, one or more blocks can be omitted. For example, in some embodiments, the search head 152 does not generate instructions for the intermediary node 154. Based on the partial results received from the at least one search node 156, the search head 152 can perform the branching operation.

3.3. Multi-Phased Data Execution Previews

The disclosed implementations can include a mechanism to collect a preview of forthcoming search results and provide that preview information to a user of the data intake and query system. The preview information can be computed from one or more portions of reduced partial search results produced by one or more intermediary nodes before the final search results are provided to a user. For example, one or more intermediary nodes can send portions of their reduced partial search results out-of-band to the search head before the search head collects the reduced partial search results. The preview information may include a computation based on the obtained reduced partial search results. The results of the computation can be rendered on a display as feedback that is indicative of a status of the query processing by the data intake and query system. The preview to the user may include the actual portions of the combinations of partial search results or visualizations derived from those portions.

This technology is referred to as a "preview" because it is provided to a user of the data intake and query system before the final search results are provided to the user, as insights related to the final search results. For example, the preview can provide a user of the data intake and query system with insights of the progress of the search query processing. This information provides early feedback that allows a user to modify a query before the query runs in full (e.g., if the user determines, based on the early feedback that the query is not producing the desired results, the user may modify the query before it is run in full). Further, this allows a user to preview the status of the processing to estimate the amount of time remaining to complete the processing and/or preview the results that may be presented as part of the final search results. The preview may include reports displayed as combinations of partial search results generated by the intermediary nodes and/or visualizations indicative of the combinations of the partial search results or the progress made towards completion of the search processing.

The amount of the portions of the combinations of partial search results may be determined based on policies, the scope of the search query processing, etc. For example, policies can cause one or more intermediary nodes processing combinations of partial search results to send 5 or 10% of these combinations to the search head while they are being produced. In another example, the amount of the portions can depend on the scope of the search query. For example, a broader search scope may cause more or less of the total portions to be sent to the search head to generate the preview. In another example, the content of a search query can invoke certain policies used to determine the amounts of the portions sent to the search head by the intermediary nodes. In some examples, the amount may be consistent or change dynamically, or can be determined randomly or semi-randomly.

The frequency of sending the portions of combinations of partial search results out-of-band may also be determined based on policies or the scope of the search query processing. For example, policies can include a schedule causing one or more intermediary nodes processing combinations of partial search results to send portions of these combinations to the search head at certain time intervals until the search query processing has completed. In another example, the frequency of sending the portions can depend on the scope of the search query. For example, a broader search scope may cause one or more intermediary nodes to send potions more or less frequently. In another example, the context of the search query can invoke certain policies used to determine the frequency for sending the portions to the search head by the intermediary nodes. The frequency may be static or can change dynamically and can be periodic, random, or semi-random. For example, the frequency may depend on the preview execution (e.g., if the preview takes too long to execute, the frequency may be modified). Further, the time associated with the execution of the preview may maintain a certain, predetermined relationship with the time associated with the execution of the query.

The preview information or data indicative of the preview information collected by the search head can be presented to a user in real-time or near real-time while it is being generated and/or collected out-of-band. For example, the data intake and query system can generate a status bar that fills as the amount of preview information being collected reaches the estimated total amount of information to produce the final search results.

4.0. COMPUTING SYSTEM ARCHITECTURE

Figure 24:
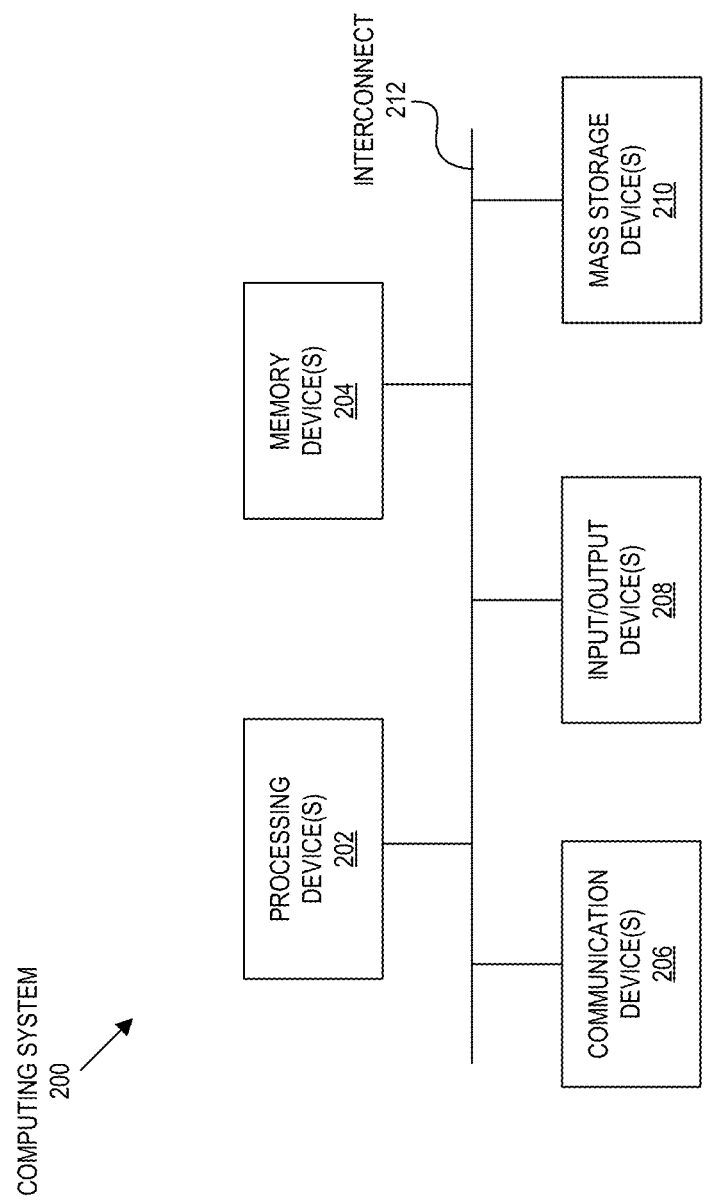
FIG. 24 is a block diagram illustrating a high-level example of hardware architecture of a computing system in which an implementation may be implemented.

FIG. 24 is a block diagram illustrating a high-level example of a hardware architecture of a computing system in which an implementation may be implemented. For example, the hardware architecture of a computing system 200 can be used to implement any one or more of the functional components described herein (e.g., the intermediary nodes 154). The computing system 200 can also be used to implement any of a forwarder, search node, search head, data store, or any computing resource. In some examples, one or multiple instances of the computing system 200 can be used to implement the technologies described herein, where multiple such instances can be coupled to each other via one or more networks.

The processes and logic flows described in this specification can be performed by one or more programmable processors executing one or more computer programs to perform functions by operating on input data and generating output. For example, the computing system 200 includes one or more processing devices 202, one or more memory devices 204, one or more communication devices 206, one or more input/output ("I/O") devices 208, and one or more mass storage devices 210, coupled to each other through an interconnect 212.

The interconnect 212 may be or include one or more conductive traces, buses, point-to-point connections, controllers, adapters, and/or other conventional connection devices. Each of the processing devices 202 controls, at least in part, the overall operation of the processing of the computing system 200 and can be or include, for example, one or more general-purpose programmable microprocessors, digital signal processors ("DSPs"), mobile application processors, microcontrollers, special purpose logic circuitry, e.g., a field programmable gate array ("FPGA") or an application specific integrated circuit ("ASIC"), or the like, or a combination of such devices.

Each of the memory devices 204 can be or include one or more physical storage devices, which may be in the form of random access memory ("RAM"), read-only memory ("ROM") (which may be erasable and programmable), flash memory, miniature hard disk drive, or other suitable type of storage device, or a combination of such devices. Each mass storage device 210 can be or include one or more hard drives, digital versatile disks ("DVDs"), flash memories, or the like. Each memory device 204 and/or mass storage device 210 can store (individually or collectively) data and instructions that configure the processing device(s) 202 to execute operations to implement the techniques described above.

Processors suitable for the execution of a computer program include, by way of example, both general and special purpose microprocessors, and any one or more processors of any kind of digital computer (e.g., processing devices 202). Generally, a processor will receive instructions and data from a read-only memory or a random access memory or both. The essential elements of a computer are a processor for performing instructions and one or more memory devices for storing instructions and data. Generally, the computer system 200 will also include, or be operatively coupled to receive data from or transfer data to, or both, one or more mass storage devices for storing data, e.g., magnetic, magneto optical disks, or optical disks. However, a computer may not necessarily have such devices.

The communication device 206 may be or include, for example, an Ethernet adapter, cable modem, Wi-Fi adapter, cellular transceiver, baseband processor, Bluetooth or Bluetooth Low Energy ("BLE") transceiver, or the like, or a combination thereof. Depending on the specific nature and purpose of the processing devices 202, the I/O device 208 can be or include a device such as a display (which may be a touch screen display), audio speaker, keyboard, mouse or other pointing device, microphone, camera, etc. Note, however, that such I/O devices 208 may be unnecessary if the processing device 202 is embodied solely as a server computer.

The computing system 200 can include a client or server. A client and server are generally remote from one another and typically interact through a communication network. The relationship of client and server arises by virtue of computer programs running on the respective computers and having a client-server relationship to one another. In the case of a client device, the communication devices(s) 206 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 206 can be or include, for example, any of the aforementioned types of communication devices, a wired Ethernet adapter, cable modem, digital subscriber line ("DSL") modem, or the like, or a combination of such devices.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

A software program or algorithm, when referred to as "implemented in a computer-readable storage medium," includes computer-readable instructions stored in a memory device (e.g., memory device(s) 204). A processor (e.g., processing device(s) 202) is "configured to execute a software program" when at least one value associated with the software program is stored in a register that is readable by the processor. In some examples, routines executed to implement the disclosed techniques may be implemented as part of OS software (e.g., MICROSOFT WINDOWS® or LINUX®) or a specific software application, algorithm component, program, object, module, or sequence of instructions referred to as "computer programs."

The computer readable medium can be a machine readable storage device, a machine readable storage substrate, a memory device, a composition of matter effecting a machine readable propagated signal, or a combination of one or more of them. The term "data processing apparatus" encompasses apparatuses, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a data store management system, an operating system, or a combination of one or more of them, a propagated signal is an artificially generated signal, e.g., a machine generated electrical, optical, or electromagnetic signal, that is generated to encode information for transmission to suitable receiver apparatus.

A computer program (also known as a program, software, software application, script, or code) typically includes one or more instructions set at various times in various memory devices of a computing device, which, when read and executed by at least one processor (e.g., processing device(s) 202), will cause a computing device to execute functions involving the disclosed techniques. In some examples, a carrier containing the aforementioned computer program product is provided. The carrier is one of an electronic signal, an optical signal, a radio signal, or a non-transitory computer-readable storage medium (e.g., the memory device(s) 204).

A computer program can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The computer system 200 can be embedded in another device, e.g., a mobile telephone, a personal digital assistant ("PDA"), a mobile audio player, a Global Positioning System ("GPS") receiver, etc. Computer readable media suitable for storing computer program instructions and data including forms of nonvolatile memory, media, and memory devices, including by way of example semiconductor memory devices, e.g., erasable programmable ROM ("EPROM"), electrically erasable programmable ROM ("EEPROM"), and flash memory devices; magnetic disks, e.g., internal hard disks or removable disks; magneto optical disks; and CD ROM and DVD ROM disks. The processor (e.g., processing devices 202) and the memory (e.g., memory device 204) can be supplemented by, or incorporated in, special purpose logic circuitry.

To provide for interaction with a user, architecture provider or reviewer, implementations of the subject matter described in this specification can be implemented with a display device of the I/O devices 208, e.g., a cathode ray tube ("CRT") to liquid crystal display ("LCD") monitor, for displaying information to the user and a keyboard and a pointing device, e.g., a mouse or a trackball, by which the user can provide input to the computer. Other kinds of I/O devices 208 can be used to provide for interaction with a user, architecture provider or reviewer as well; for example, feedback provided to the user can be any form of sensory feedback, e.g., visual feedback, auditory feedback, or tactile feedback; and input from the user, architecture provider or reviewer can be received in any from, including acoustic, speech, or tactile input.

In some examples, the computing system 200 can include a back end component (not shown), e.g., as a data server, or that includes a middleware component, e.g., an application server, or that includes a front end component, e.g., a client computer having a graphical user interface (e.g., metrics-aware UI) or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a LAN and a WAN, e.g., the Internet.

Any or all of the features and functions described above can be combined with each other, except to the extent it may be otherwise stated above or to the extent that any such implementations may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective implementations may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

While this specification contains many specifics, these should not be construed as limitations on the scope or of what may be claimed, but rather as descriptions of features specific to particular implementations. Certain features that are described in this specification in the context or separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations have been described. Other implementations are within the scope of the following claims. For example, the actions recited in the claims can be performed in a different order and still achieve desirable results.

What is claimed is:

1. A method, comprising:
    receiving a query at a search head of a data intake and query system;
    parsing the query;
    based on parsing the query:
        determining that the query includes a join command to join a first set of data and a second set of data, and
        in response to determining that the query includes the join command, identifying a first portion of the query as a first subquery and a second portion of the query as a second subquery, wherein the first subquery corresponds to the first set of data and the second subquery corresponds to the second set of data;
    identifying at least a first search node and a second search node of a plurality of search nodes instantiated within the data intake and query system based on determining that the query includes the join command;
    generating instructions for a first intermediary node of the data intake and query system to combine partial results of the first subquery and the second subquery as at least part of a join operation;
    generating instructions to concurrently transmit each of the first subquery and the second subquery to each of the first search node and the second search node;
    executing the query, wherein executing the query includes communicating the instructions for the first intermediary node to the first intermediary node and concurrently transmitting each of the first subquery and the second subquery to each of the first search node and the second search node,
        wherein each of the first search node and the second search node concurrently executes each of the first subquery and the second subquery,
        wherein each of the first search node and the second search node identifies respective first partial results based on execution of the first subquery and respective second partial results based on execution of the second subquery,
        wherein each of the first search node and the second search node provides the respective first partial results and the respective second partial results to the first intermediary node,
        wherein the first intermediary node concurrently receives the respective first partial results and the respective second partial results from each of the first search node and the second search node, and combines the respective first partial results and the respective second partial results from each of the first search node and the second search node as at least part of the join operation, and communicates results of the join operation to at least one of a second intermediary node or the search head; and
    receiving, at the search head, results of the query from at least one of the first intermediary node, the second intermediary node, or another intermediary node.

2. The method of claim 1, wherein the first intermediary node is a search node.

3. The method of claim 1, wherein the second intermediary node receives the results of the join operation from the first intermediary node and combines the results of the join operation as at least part of the join operation.

4. The method of claim 1, wherein the first subquery and the second subquery include instructions for each of the first search node and the second search node to provide the respective first partial results and the respective second partial results to the first intermediary node.

5. The method of claim 1, wherein the first intermediary node obtains the instructions to concurrently transmit each of the first subquery and the second subquery to each of the first search node and the second search node, wherein the first intermediary node concurrently transmits each of the first subquery and the second subquery to each of the first search node and the second search node.

6. The method of claim 1, wherein the search head obtains the instructions to concurrently transmit each of the first subquery and the second subquery to each of the first search node and the second search node, wherein the search head concurrently transmits each of the first subquery and the second subquery to each of the first search node and the second search node.

7. The method of claim 1, wherein the search head communicates the instructions for the first intermediary node, the first subquery, and the second subquery to each of the first search node and the second search node, wherein the first search node and the second search node:
- select the first intermediary node to combine the respective first partial results and the respective second partial results from each of the first search node and the second search node; and
- communicate the instructions for the first intermediary node, the respective first partial results from each of the first search node and the second search node, and the respective second partial results from each of the first search node and the second search node to the first intermediary node.

8. The method of claim 1, further comprising selecting the first intermediary node based at least in part on one or more of a capacity of the first intermediary node or an availability of the first intermediary node.

9. Non-transitory computer readable media comprising computer-executable instructions that, when executed by a computing system of a data intake and query system, cause the computing system to:
- receive a query at a search head of a data intake and query system;
- parse the query;
- based on parsing the query:
  - determine that the query includes a join command to join a first set of data and a second set of data, and
  - in response to determining that the query includes the join command,
- identify a first portion of the query as a first subquery and a second portion of the query as a second subquery, wherein the first subquery corresponds to the first set of data and the second subquery corresponds to the second set of data;
- identify at least a first search node and a second search node of a plurality of search nodes instantiated within the data intake and query system based on determining that the query includes the join command;
- generate instructions for first intermediary node of the data intake and query system to combine partial results of the first subquery and the second subquery as at least part of a join operation;
- generate instructions to concurrently transmit each of the first subquery and the second subquery to each of the first search node and the second search node;
- execute the query, wherein executing the query includes communicating the instructions for the first intermediary node to the first intermediary node and concurrently transmitting each of the first subquery and the second subquery to each of the first search node and the second search node,
  - wherein each of the first search node and the second search node concurrently executes each of the first subquery and the second subquery,
  - wherein each of the first search node and the second search node identifies respective first partial results based on execution of the first subquery and respective second partial results based on execution of the second subquery,
  - wherein each of the first search node and the second search node provides the respective first partial results and the respective second partial results to the first intermediary node,
  - wherein the first intermediary node concurrently receives the respective first partial results and the respective second partial results from each of the first search node and the second search node, and combines the respective first partial results and the respective second partial results from each of the first search node and the second search node as at least part of the join operation, and communicates results of the join operation to at least one of a second intermediary node or the search head; and
- receive, at the search head, results of the query from at least one of the first intermediary node, the second intermediary node, or another intermediary node.

10. The non-transitory computer readable media of claim 9, wherein the first intermediary node is a search node.

11. The non-transitory computer readable media of claim 9, wherein the second intermediary node receives the results of the join operation from the first intermediary node and combines the results of the join operation as at least part of the join operation.

12. The non-transitory computer readable media of claim 9, wherein the first subquery and the second subquery include instructions for each of the first search node and the second search node to provide the respective first partial results and the respective second partial results to the first intermediary node.

13. The non-transitory computer readable media of claim 9, wherein the first intermediary node obtains the instructions to concurrently transmit each of the first subquery and the second subquery to each of the first search node and the second search node, wherein the first intermediary node concurrently transmits each of the first subquery and the second subquery to each of the first search node and the second search node.

14. The non-transitory computer readable media of claim 9, wherein the search head obtains the instructions to concurrently transmit each of the first subquery and the second subquery to each of the first search node and the second search node, wherein the search head concurrently transmits each of the first subquery and the second subquery to each of the first search node and the second search node.

15. The non-transitory computer readable media of claim 9, wherein the search head communicates the instructions for the first intermediary node, the first subquery, and the second subquery to each of the first search node and the second search node, wherein the first search node and the second search node:
- select the first intermediary node to combine the respective first partial results and the respective second partial results from each of the first search node and the second search node; and
- communicate the instructions for the first intermediary node, the respective first partial results from each of the first search node and the second search node, and the respective second partial results from each of the first search node and the second search node to the first intermediary node.

16. The non-transitory computer readable media of claim 9, wherein the computer-executable instructions, when executed by the computing system of the data intake and query system, further cause the computing system to select the first intermediary node based at least in part on one or more of a capacity of the first intermediary node or an availability of the first intermediary node.

17. A computing system, comprising:
memory; and
one or more processing devices coupled to the memory and configured to:
  receive a query at a search head of a data intake and query system;
  parse the query;
  based on parsing the query:
    determine that the query includes a join command to join a first set of data and a second set of data, and
    in response to determining that the query includes the join command, identify a first portion of the query as a first subquery and a second portion of the query as a second subquery, wherein the first subquery corresponds to the first set of data and the second subquery corresponds to the second set of data;
  identify at least a first search node and a second search node of a plurality of search nodes instantiated within the data intake and query system based on determining that the query includes the join command;
  generate instructions for a first intermediary node of the data intake and query system to combine partial results of the first subquery and the second subquery as at least part of a join operation;
  generate instructions to concurrently transmit each of the first subquery and the second subquery to each of the first search node and the second search node;
  execute the query, wherein executing the query includes communicating the instructions for the first intermediary node to the first intermediary node and concurrently transmitting each of the first subquery and the second subquery to each of the first search node and the second search node,
    wherein each of the first search node and the second search node concurrently executes each of the first subquery and the second subquery,
    wherein each of the first search node and the second search node identifies respective first partial results based on execution of the first subquery and respective second partial results based on execution of the second subquery,
    wherein each of the first search node and the second search node provides the respective first partial results and the respective second partial results to the first intermediary node,
    wherein the first intermediary node concurrently receives the respective first partial results and the respective second partial results from each of the first search node and the second search node, and combines the respective first partial results and the respective second partial results from each of the first search node and the second search node as at least part of the join operation, and communicates results of the join operation to at least one of a second intermediary node or the search head; and
  receive, at the search head, results of the query from at least one of the first intermediary node, the second intermediary node, or another intermediary node.

18. The system of claim 17, wherein the search head obtains the instructions to concurrently transmit each of the first subquery and the second subquery to each of the first search node and the second search node, wherein the search head concurrently transmits each of the first subquery and the second subquery to each of the first search node and the second search node.

19. The system of claim 17, wherein the search head communicates the instructions for the first intermediary node, the first subquery, and the second subquery to each of the first search node and the second search node, wherein the first search node and the second search node:
  select the first intermediary node to combine the respective first partial results and the respective second partial results from each of the first search node and the second search node; and
  communicate the instructions for the first intermediary node, the respective first partial results from each of the first search node and the second search node, and the respective second partial results from each of the first search node and the second search node to the first intermediary node.

20. The system of claim 17, wherein one or more processors are further configured to select the first intermediary node based at least in part on one or more of a capacity of the first intermediary node or an availability of the first intermediary node.

* * * * *